United States Patent
Piontkowski

(10) Patent No.: US 10,678,209 B2
(45) Date of Patent: *Jun. 9, 2020

(54) ADJUSTABLE HEIGHT SOLE

(71) Applicant: Shlomo Piontkowski, New York, NY (US)

(72) Inventor: Shlomo Piontkowski, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,684

(22) Filed: Jan. 1, 2018

(65) Prior Publication Data

US 2018/0164777 A1    Jun. 14, 2018

Related U.S. Application Data

(63) Continuation of application No. 15/138,830, filed on Apr. 26, 2016, now Pat. No. 9,857,788, which is a
(Continued)

(51) Int. Cl.
| | |
|---|---|
| A43B 7/14 | (2006.01) |
| G05B 19/402 | (2006.01) |
| A43B 3/00 | (2006.01) |
| A43B 13/14 | (2006.01) |
| A43B 7/38 | (2006.01) |

(Continued)

(52) U.S. Cl.
CPC .......... *G05B 19/402* (2013.01); *A43B 1/0054* (2013.01); *A43B 3/0005* (2013.01); *A43B 3/24* (2013.01); *A43B 3/26* (2013.01); *A43B 7/142* (2013.01); *A43B 7/144* (2013.01); *A43B 7/1425* (2013.01); *A43B 7/1435* (2013.01); *A43B 7/16* (2013.01); *A43B 7/24* (2013.01); *A43B 7/38* (2013.01); *A43B 13/10* (2013.01); *A43B 13/141* (2013.01); *A43B 13/145* (2013.01);
(Continued)

(58) Field of Classification Search
CPC .. A43B 3/24; A43B 3/246; A43B 3/26; A43B 7/16; A43B 7/38; A43B 21/42
USPC ...................... 36/100, 142, 143, 144, 81, 97
See application file for complete search history.

(56) References Cited

U.S. PATENT DOCUMENTS

| 1,542,460 A | 6/1925 | Legge |
| 1,671,713 A | 5/1928 | Glass |

(Continued)

FOREIGN PATENT DOCUMENTS

| EP | 1545255 B1 | 9/2013 |
| EP | 2358225 B1 | 5/2014 |

OTHER PUBLICATIONS

International Search Report dated Dec. 22, 2015 from PCT/US2015/41791.
(Continued)

*Primary Examiner* — Marie D Bays
(74) *Attorney, Agent, or Firm* — Brad M. Behar & Associates, PLLC

(57) ABSTRACT

The present invention is a sole having an adjustable height mechanism along at least one of the longitudinal axis and the lateral axis whereby the height of the sole can be adjusted creating one or more angles of inclination in the sole. The sole includes, in one embodiment, slidable spacing blocks. In a preferred embodiment, the sole further includes a motor connected to at least one block, the motor connected to a controller communicating wirelessly to a processor providing instructions to the controller for positioning the one or more blocks.

8 Claims, 51 Drawing Sheets

Anterior Cruciate Stabilizing Shoes

Related U.S. Application Data continuation-in-part of application No. 14/961,250, filed on Dec. 7, 2015, now Pat. No. 9,872,534, which is a continuation of application No. 14/619,782, filed on Feb. 11, 2015, now Pat. No. 9,204,687, which is a continuation-in-part of application No. 14/458,548, filed on Aug. 13, 2014, now Pat. No. 8,984,770, which is a continuation of application No. 14/340,151, filed on Jul. 24, 2014, now abandoned.

(51) Int. Cl.
| | |
|---|---|
| A43B 3/24 | (2006.01) |
| A43B 7/16 | (2006.01) |
| A43B 21/42 | (2006.01) |
| A43B 1/00 | (2006.01) |
| A43B 3/26 | (2006.01) |
| A43B 7/24 | (2006.01) |
| A43B 13/10 | (2006.01) |
| A43B 13/20 | (2006.01) |

(52) U.S. Cl.
CPC .............. *A43B 13/20* (2013.01); *A43B 21/42* (2013.01); *G05B 2219/50264* (2013.01)

(56) References Cited

U.S. PATENT DOCUMENTS

| | | | |
|---|---|---|---|
| 1,698,003 | A | 1/1929 | Rieke |
| 1,698,635 | A | 1/1929 | Joyce |
| 2,095,488 | A | 10/1937 | Cobb |
| 2,111,666 | A | 3/1938 | Hubbard |
| 2,184,209 | A | 12/1939 | Burger |
| 2,212,414 | A | 8/1940 | Burger |
| 2,390,416 | A | 12/1945 | Bettmann |
| 2,717,462 | A | 9/1955 | Goin |
| 2,779,110 | A | 1/1957 | Howell |
| 2,884,717 | A | 5/1959 | Goldberg |
| 3,693,269 | A | 9/1972 | Guarrera |
| 3,922,800 | A | 12/1975 | Miller |
| 4,120,102 | A | 10/1978 | Kenigson |
| 4,232,457 | A | 11/1980 | Mosher |
| 4,259,792 | A | 4/1981 | Halberstadt |
| 4,372,058 | A | 2/1983 | Stubblefield |
| 4,372,059 | A | 2/1983 | Ambrose |
| 4,492,046 | A | 1/1985 | Kosova |
| 4,494,320 | A | 1/1985 | Davis |
| 4,494,321 | A | 1/1985 | Lawlor |
| 4,507,879 | A | 4/1985 | Dassler |
| 4,541,184 | A | 9/1985 | Leighton |
| 4,550,510 | A | 11/1985 | Stubblefield |
| 4,571,852 | A | 2/1986 | Lamarche et al. |
| 4,653,206 | A | 3/1987 | Tanel |
| 4,697,361 | A | 10/1987 | Ganter |
| 4,741,114 | A | 5/1988 | Stubblefield |
| 4,843,737 | A | 7/1989 | Vorderer |
| RE33,066 | E | 9/1989 | Stubblefield |
| 4,879,821 | A | 11/1989 | Graham et al. |
| 4,897,937 | A | 2/1990 | Misevich |
| 4,910,884 | A | 3/1990 | Lindh et al. |
| 4,941,273 | A | 7/1990 | Gross |
| 4,942,677 | A | 7/1990 | Flemming |
| RE33,648 | E | 7/1991 | Brown |
| 5,079,856 | A | 1/1992 | Truelsen |
| 5,279,051 | A | 1/1994 | Whatley |
| 5,319,866 | A | 6/1994 | Foley et al. |
| 5,345,701 | A | 9/1994 | Smith |
| 5,367,790 | A | 11/1994 | Gamow et al. |
| 5,373,650 | A | 12/1994 | Dananberg et al. |
| 5,435,079 | A | 7/1995 | Gallegos |
| 5,437,110 | A | 8/1995 | Goldston et al. |
| 5,469,639 | A | 11/1995 | Sessa |
| 5,509,218 | A | 4/1996 | Arcan |
| 5,621,985 | A | 4/1997 | Frost |
| 5,625,963 | A | 5/1997 | Miller et al. |
| 5,628,128 | A | 5/1997 | Miller et al. |
| 5,655,315 | A | 8/1997 | Mershon |
| 5,701,686 | A | 12/1997 | Herr et al. |
| 5,729,916 | A | 3/1998 | Vorobiev et al. |
| 5,771,606 | A | 6/1998 | Litchfield et al. |
| 5,797,199 | A | 8/1998 | Miller et al. |
| 5,822,886 | A | 10/1998 | Luthi et al. |
| 5,896,679 | A | 4/1999 | Baldwin |
| 5,916,071 | A | 6/1999 | Lee |
| 5,918,385 | A | 7/1999 | Sessa |
| 5,924,219 | A | 7/1999 | Healy et al. |
| 6,009,636 | A | 1/2000 | Wallerstein |
| 6,029,374 | A | 2/2000 | Herr et al. |
| 6,065,229 | A | 5/2000 | Wahrheit |
| 6,098,319 | A | 8/2000 | Epstein |
| 6,199,302 | B1 | 3/2001 | Kayano |
| 6,269,554 | B1 | 8/2001 | Silvestrini |
| 6,393,735 | B1 | 5/2002 | Berggren |
| 6,550,160 | B2 | 4/2003 | Miller, II |
| 6,557,271 | B1 | 5/2003 | Weaver, III |
| 6,609,314 | B1 | 8/2003 | Dubner |
| 6,640,465 | B1 | 11/2003 | Burgess |
| 6,745,499 | B2 | 6/2004 | Christensen et al. |
| 6,763,613 | B2 | 7/2004 | Brown |
| 6,860,034 | B2 | 3/2005 | Schmid |
| 7,246,454 | B2 | 7/2007 | Kramer |
| 7,272,900 | B1 | 9/2007 | Epstein |
| 7,603,794 | B2 | 10/2009 | Oh |
| 7,621,057 | B1 | 11/2009 | Julian et al. |
| 7,779,557 | B2 | 8/2010 | Teteriatnikov et al. |
| 7,788,824 | B2 | 9/2010 | Hann |
| 7,793,437 | B2 | 9/2010 | Chapman et al. |
| 7,832,119 | B2 | 11/2010 | Gilmore |
| 7,849,612 | B2 | 12/2010 | Epstein |
| 8,069,583 | B1 | 12/2011 | Simchuk |
| 8,112,905 | B2 | 2/2012 | Bemis et al. |
| 8,186,081 | B2 | 5/2012 | Wilson, III et al. |
| 8,225,534 | B2 | 7/2012 | Mueller et al. |
| 8,272,149 | B2 | 9/2012 | Cooper et al. |
| D677,455 | S | 3/2013 | Pizzuti |
| 8,434,244 | B2 | 5/2013 | Litchfield et al. |
| 8,495,825 | B2 | 7/2013 | Goldston et al. |
| 8,522,454 | B2 | 9/2013 | Schindler et al. |
| 8,522,457 | B2 | 9/2013 | Scholz et al. |
| 8,567,097 | B2 | 10/2013 | Edy et al. |
| 8,578,630 | B2 | 11/2013 | Diepenbrock |
| 8,601,722 | B2 | 12/2013 | Frye |
| 8,677,651 | B2 | 3/2014 | Cross |
| 8,707,586 | B2 | 4/2014 | Adair et al. |
| 8,800,174 | B2 | 8/2014 | Banach |
| 8,984,770 | B1 | 3/2015 | Piontkowski |
| 9,095,190 | B2 | 8/2015 | Kohatsu et al. |
| 9,204,687 | B1 | 12/2015 | Piontkowski |
| 9,392,842 | B2 | 7/2016 | Piontkowski |
| 9,857,788 | B2 * | 1/2018 | Piontkowski ........ A43B 1/0054 |
| 2001/0027616 | A1 | 10/2001 | Silvestrini |
| 2001/0049888 | A1 | 12/2001 | Krafsur et al. |
| 2002/0078591 | A1 | 6/2002 | Morrone |
| 2002/0157279 | A1 | 10/2002 | Matsuura |
| 2004/0237165 | A1 | 12/2004 | Holden |
| 2005/0126040 | A1 | 6/2005 | LeVert et al. |
| 2005/0241187 | A1 | 11/2005 | Johnson |
| 2005/0268488 | A1 | 12/2005 | Hann |
| 2005/0278980 | A1 | 12/2005 | Berend et al. |
| 2006/0026865 | A1 | 2/2006 | Grisoni et al. |
| 2006/0053664 | A1 | 3/2006 | Tager |
| 2006/0059726 | A1 | 3/2006 | Song et al. |
| 2006/0137228 | A1 | 6/2006 | Kubo |
| 2007/0107264 | A1 | 5/2007 | Meschter et al. |
| 2007/0107265 | A1 | 5/2007 | Mueller |
| 2007/0180732 | A1 | 8/2007 | Oh |
| 2007/0193065 | A1 | 8/2007 | Nishiwaki et al. |
| 2008/0060229 | A1 | 3/2008 | Epstein |
| 2008/0098621 | A1 | 5/2008 | Tzeng et al. |
| 2009/0007455 | A1 | 1/2009 | Montgomery |
| 2009/0165333 | A1 | 7/2009 | Litchfield et al. |
| 2009/0307925 | A1 | 12/2009 | Pfister |
| 2010/0050472 | A1 | 3/2010 | Tzeng et al. |
| 2010/0251571 | A1 | 10/2010 | Woodard |

(56) References Cited

U.S. PATENT DOCUMENTS

| | | |
|---|---|---|
| 2011/0010964 A1 | 1/2011 | Hardy et al. |
| 2011/0214313 A1 | 9/2011 | James |
| 2012/0005921 A1 | 1/2012 | Diepenbrock |
| 2012/0036739 A1 | 2/2012 | Amos |
| 2012/0042539 A1 | 2/2012 | Miner |
| 2012/0047770 A1 | 3/2012 | Dean et al. |
| 2012/0227284 A1 | 9/2012 | Adair et al. |
| 2012/0317835 A1 | 12/2012 | Raysse et al. |
| 2013/0000152 A1 | 1/2013 | Cooper et al. |
| 2013/0199056 A1 | 8/2013 | Li |
| 2014/0047740 A1 | 2/2014 | Tucker et al. |
| 2014/0059883 A1 | 3/2014 | Adeagbo et al. |
| 2014/0259786 A1 | 9/2014 | Heard |
| 2014/0366401 A1 | 12/2014 | Cavaliere |
| 2016/0015124 A1 | 1/2016 | Grell |

OTHER PUBLICATIONS

International Search Report dated Dec. 28, 2016 from PCT/US16/58894.

* cited by examiner

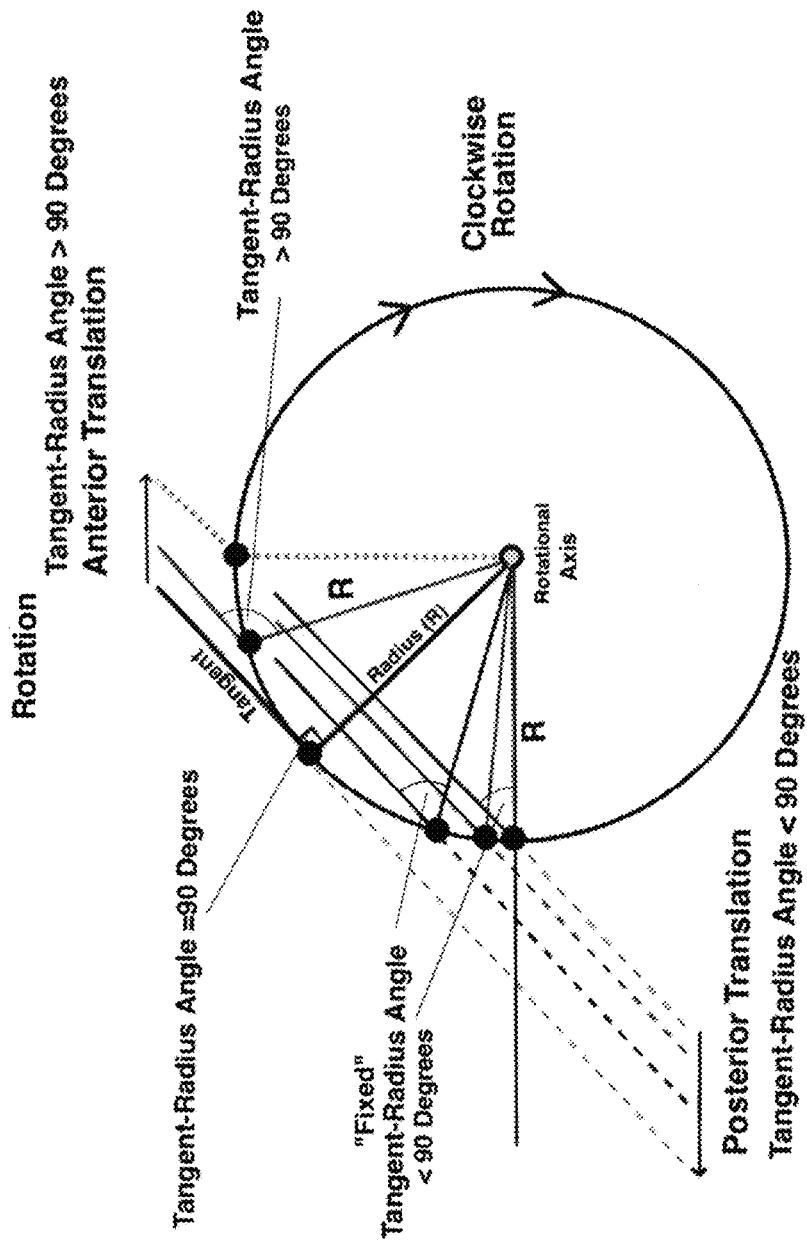

ADJUSTABLE HEIGHT SOLE

CROSS REFERENCE

This application is a continuation of, and claims the benefit of, U.S. application Ser. No. 15/138,830 filed on Apr. 26, 2016, which is a continuation-in-part of, and claims the benefit of, U.S. application Ser. No. 14/961,250 filed Dec. 7, 2015, which is a continuation of, and claims the benefit of, U.S. application Ser. No. 14/619,782 filed on Feb. 11, 2015, which is a continuation-in-part of, and claims the benefit of, U.S. application Ser. No. 14/458,548 filed on Aug. 13, 2014, which is a continuation of, and claims the benefit of, U.S. application Ser. No. 14/340,151 filed on Jul. 24, 2014, each which is expressly incorporated herein in its entirety by reference thereto.

FIELD OF THE INVENTION

The present invention relates to footwear, including sneakers, shoes, and socks, and more specifically to footwear configured to improve support of the user's foot and foot arches. The present invention also relates to devices used to increase foot comfort when footwear is worn. The present invention further relates to footwear configured to improve and assist with walking and/or running.

BACKGROUND OF THE INVENTION

Conventional footwear (e.g., shoes and sneakers) comprises a sole and an upper secured to the sole on a lower portion of the upper. The top of the upper includes an opening, typically near the back part of the upper, where the foot enters the cavity formed by the upper and the sole. The entire structure functions to support the foot. The sole is the portion between the foot and the ground. The sole is intended to provide traction, support and cushioning for the user. Many soles have a multi-part construction including an outsole, a midsole, and an insole. The insole is located on the upper most portion of the sole, typically with an upper surface exposed inside the footwear where the user's foot contacts the sole. The outsole is located on the bottom most portion of the sole of the footwear. The underside of the outsole contacts the surface on which the user walks or runs (the bottom of the sole contacts the ground and provides traction against the surface on which the user walks) and is designed for durability and traction. The midsole is located between the insole and the outsole and it is commonly designed to absorb the forces commonly encountered when walking or running in the footwear. One or more parts of the sole, including each the insole, midsole, and outsole, may include padding/cushioning and/or be made of materials that create cushioning for comfort and for shock absorption properties.

For most footwear the sole also includes a passive medial arch support. The passive medial arch support is a raised part/portion of the sole positioned in the location where the medial arch of the user's foot rests on the insole. In most footwear, the passive medial arch support is located on the medial side (inside) of the footwear in a lateral direction and about midway between the front and the back of the footwear in a longitudinal direction. Passive medial arch supports are typically convex in at least two directions to complement and conform to the shape of the user's medial foot arch. To achieve the shape of the passive medial arch support, the sole of the footwear can be shaped to form the passive medial arch support and/or the footwear can include padding/cushioning as part of the sole (typically the insole) to create the passive medial arch support. The flexibility of the passive arch support cushion and its ability to compress when the foot's medial arch contacts the passive arch support cushion allows, to some extent, for use by people with different arch heights, widths and shapes, although not every user's medial arch is comfortably supported by the standard passive arch supports inside footwear. Accordingly, it is not uncommon for users to add to the passive medial arch support inside footwear with inserts or to modify the passive arch support and/or the insole shape using orthotics for improved comfort.

With the foot inside the footwear, the foot rests on top of the insole and contacts at least some parts of the inside of the upper. For footwear having a passive medial arch support, the medial arch of the user's foot rests upon the passive medial arch support causing upward forces on the user's medial arch when weight is applied onto the footwear.

There are many different types of soles. Some footwear uses a very rigid sole intended to provide resistance to penetration, such as, for example, steel plated construction boots/shoes. Some footwear includes a less rigid sole which provides rigidity but with also provides some flexibility, such as, for example, in athletic footwear with spikes (e.g., soccer shoes, baseball spikes/cleats, football cleats, etc.). Still further there is footwear with a strong and durable sole which provides some flexibility but also provides a different appearance more appealing for formal use, the sole intended to last for an extended period of time, such as, for example, dress shoes. Footwear also exists with a light and flexible sole intended to provide comfort and improve balance, typically when exercising but also during daily use (walking), such as, for example, sneakers and running sneakers. Sneaker soles are typically made for motion during use and include padding to absorb impact forces associated with foot strike.

Some footwear has a split sole design with a front sole portion/section and a back sole portion/section, without a middle sole portion/section. In split sole footwear, the front sole portion/section and the back sole portion/section are connected to each other using the upper. Split sole footwear also often includes a heel pad and a toe pad made from a rough material, such as leather or suede, to offer traction. The middle section of the split sole footwear (sometimes both over and under the foot) is covered and protected only by the material used for the upper. Split sole footwear usually provides less arch support to the user (along the user's medial arch as well as the lateral arch) than full sole footwear and thus those arches of the foot may be vulnerable to injury during use. An advantage of split sole footwear is that it may provide more traction in certain environments, such as, for example, for rock climbing where the split sole allows for greater flexibility of the footwear which assists with contact with uneven or rocky terrain. As another example, hunters may use split sole footwear for quieter movement than full sole footwear. In addition, split sole shoes are considered aesthetically pleasing, especially in the dance industry, because they make the line of the foot appear more flattering. A split sole shoe is particularly useful for dancers who need to bend their foot and/or point their toes, such as, for example, in ballet. Such footwear, however, does not provide support for the foot, particularly in the midsection where there is no sole.

Still further, there is footwear designed to improve/assist the user with walking/running through the use of mechanical devices located in the footwear. For example, some footwear includes one or more springs within the sole, typically located in the heel region, to create lift during a push off phase (of the Gait Cycle) or when jumping. Other footwear includes encapsulated air pockets within the sole, also typically in the back portion of the sole to create increased cushioning. Mechanical devices such as springs or air pockets in the sole provide shock absorption properties that relieve some of the stress and fatigue of walking or running.

Some recent footwear marketed for running includes channels or grooves in the outsole to increase outsole flexibility between the forefoot section and the heel section of the sole, such as, for example in the Nike® Free 3.0 Flyknit. The segmented sole may benefit the user by strengthening the muscles in the foot. The outsole is made of lightweight material to try to give the feeling of running barefoot while still giving a cushioned support to the user's foot. Some segmented outsoles are also configured with a ratio of the heel-to-toe height smaller than in a traditional sneaker or running shoe to encourage forefoot strike as opposed to a heel strike when running.

Many runners, especially those who wear traditional running shoes, strike the ground heel first while running. Due to this reason, traditional running shoes usually have added height and cushion in the midsole and outsole of the heel portion of the shoe, causing a larger heel-to-toe height ratio. The added cushioning seeks to provide comfort to runners by reducing the impact of the heel strike phase on the foot and skeletal system. In heel striking, as understood in the context of the gait cycle (the conventional six phases/steps of the gait cycle are 1) heel strike, 2) foot flat, 3) mid-stance, 4) heel-off (also called push off), 5) toe-off, and 6) swing) the collision of the heel on the ground generates a significant impact force on the skeletal system, whereas in forefoot striking, the collision of the forefoot with the ground causes less effect on the skeletal system.

Applicant has discovered that the existing footwear impedes the natural shock absorptive and cushioning capabilities of the human foot. Existing footwear with passive arch support(s) limits the foot's natural ability to achieve superior arch compression of the foot structure (including bones, muscles and ligaments) which provides shock absorption and cushioning for the user's foot and body. Similarly, the structure of existing footwear with passive arch support(s) limits the energy absorbing and dissipation characteristics of the foot. In addition, most existing footwear causes splaying of the foot along at least one of the medial arch, the lateral arch and the transverse arch, which causes discomfort for some including the feeling of a tight shoe or sneaker.

Throughout the gait cycle, the arches of the foot experience fluctuation of compressive forces due to the different placement of body weight forces at each stage and the reaction of the foot's biomechanics. Spacing and the shapes of the bones in the human foot enable the human foot to achieve two different types of compression of the bones depending on the position of the foot and the direction of the forces.

As used herein, the phrase "inferior compression" refers to the state of the human foot when compressive forces are applied along inside arch(es) of the foot causing the parts of the bones of the foot along the inside of the arch(es) to touch together. FIG. 12 shows a side view of the human foot depicting inferior compression along the medial arch with the bones touching along the inside of the arch and separated along the outside of the arch. Inferior compression of the medial foot arch typically occurs during the heel-off phase of the gait cycle when the foot is plantar flexed and the big toe is dorsiflexed causing a longitudinal stretching of the plantar fascia tissue shortening the distance between the calcaneus and metatarsals (arch base decreases) to elevate the medial longitudinal arch (arch height increases), as seen in FIGS. 13, 12, 2 and 2A. The plantar shortening that results from plantarflexion of the foot and dorsiflexion of the big toe is the essence of the "Windlass Mechanism" of the foot that helps with propulsion by creating a stable arch and hence a more rigid level for push off. Notably, with footwear having a passive medial arch support, the footwear limits the ability of the longitudinal arch base to shorten preventing inferior compression and thus decreasing the effect from the windlass mechanism of the foot. In some cases for footwear, when in a heel-off stage, the passive medial arch support in the footwear pushes against the plantar fascia forcing it in another direction (e.g., upwards towards the top of the user's foot) which can cause pain and discomfort.

As used herein, the phrase "superior compression" refers to the state of the human foot when compressive forces are applied along the outside arch(es) of the foot causing the parts of the bones of the foot along the outside of the arch(es) to touch together. FIGS. 13, 11, and 2 show a side view of the human foot in the flat foot phase depicting superior compression along the medial longitudinal arch with the bones touching along the outside of the arch and separated along the inside of the arch. Splaying occurs in an arch, such as, for example in the foot arch(es), when weight is applied on the outside of the arch causing the arch height to decrease and causing the arch base to increase (widen) as shown in FIG. 2 where $y_2 < y < y_1$ and $x_2 > x > x_1$. For the transverse arch of the foot, the forefoot flattens and the arch height decreases, causing widening of the forefoot as well as potential damage or irritation to the nerve under the ball of the foot. Splaying can also be caused by applying too much pressure to the foot, for example by wearing high heels or by being overweight. Injury or disease, such as diabetes, may also cause splaying by compromising bone and soft tissue integrity. Morton's neuroma is a painful condition that is often associated with splayfoot as it may be caused by irritation or damage to the intermetatarsal plantar nerve.

A passive medial arch support such as the arch pads commonly found inside footwear, provides a filler of arch concavity. It supports the medial longitudinal arch of the user during weight bearing (at the flat foot stage of the gait cycle) when walking and/or running keeping the foot arch structure in a middle position (between a state of inferior compression and a state of superior compression) and thus not rigid. The uncompressed position hinders normal foot biomechanics of arches splaying. Since ground forces dissipate through the passive arch support, force fluctuation is restricted, there are no arch compressive forces either inferior or superior and thus the natural arch neutralizing and shock absorption properties of the foot are diminished. Passive arch supports also have a long term deleterious effect on the foot; they passively hold the foot as if in a cast sometimes causing osteoporosis, muscle and ligaments atrophy, with a loss of ligament integrity which maintains the architectural structure of the foot. Consequently, when walking barefoot without a passive arch support after experiencing these deleterious effects, the foot effectively "Hyper-Splays" due to the loss of ligament integrity without achieving arch rigidity (Flat Foot) and is weak and unstable.

None of the existing footwear is capable of providing a user with a dynamic arch support system that increases the users' medial arch rigidity when the user pushes down on the insole (e.g., during the flat foot and mid-stance stages of the gait cycle), an arch support system that increases footwear comfort and also provides assistance with walking and/or running through propulsion. None of the existing footwear lessens the splaying of the user's foot along the medial longitudinal arch and/or the transverse arch for increased comfort. None of the existing footwear increases the rigidity of the arch support(s) when loading to help achieve an inferior compression of the user's foot (as opposed to superior arch compression which occurs during arch splaying) creating improved shock absorption and cushioning effects. None of the exiting footwear provides a convex shaped outsole with opposing wedge shaped configurations in the bottom of the forefoot sole section and the heel sole section which provide rotation of the forefoot sole section and the heel sole section in opposite directions when weight is applied.

None of the exiting footwear provides a convex shaped, split sole (in the longitudinal direction) with an outsole having opposing wedge shaped configurations in the bottom of the forefoot sole section and the heel sole section that provide rotation of the forefoot sole section and the heel sole section in opposite directions when weight is applied.

None of the exiting footwear provides a convex shaped outsole transversely across the width of the footwear in the forefoot section with opposing wedge shaped configurations which provide rotation of the medial side and the lateral side of the forefoot sole section in opposite directions when weight is applied.

None of the exiting footwear provides a convex shaped outsole transversely across the width of the footwear with a split sole and with opposing wedge shaped configurations in the forefoot sole section which provide rotation of the medial side and the lateral side of the forefoot sole section in opposite directions when weight is applied.

None of the exiting footwear provides a flexible, elastic, member between the forefoot sole section and the heel sole section configured to increase cushioning effects, store and dissipate energy thereby assisting with propulsion, and which increases foot comfort by reducing splaying. None of the existing footwear provides a split sole with a flexible, elastic, member between the forefoot sole section and the heel sole section configured to increase cushioning effects, store and dissipate energy thereby assisting with propulsion, and which increases foot comfort by reducing splaying.

None of the existing footwear provides a flexible, elastic, member transversely positioned in the forefoot sole to increase cushioning effects and comfort by reducing splaying. None of the exiting footwear provides a split sole with a flexible, elastic, members longitudinally and transversely in the forefoot sole section to increase cushioning effects and comfort by reducing splaying.

No existing footwear provides a dynamic arch support comprising an elastic member connected at opposing ends to rotatable wedges which, when force is applied on the wedges, causes the wedges to rotate and in some cases slide thereby bending the elastic member, increasing the energy stored in the elastic member, and creating arch support.

No existing footwear includes at least one pair of rotatable wedges positioned in a location in the footwear such that they are along at least one of the medial arch, the lateral arch, and the transverse arch of the user's foot when worn, wherein the wedges rotate and slide thereby reducing splaying and pronation of the user's foot.

None of existing footwear provides a mechanism to help the user's foot achieve inferior compression of the medial arch during the flat foot phase which relaxes the plantar fascia tissue due to a decrease in distance between the calcaneus and metatarsals.

Existing footwear also attempts to cushion the impact forces on the body during walking or running. The impact of the heel during walking or running (the heel strike (HS) phase of the walking Gait cycle) generates a ground reaction force on the foot and thus the body of the user which is proportional to the force of impact. There are also forces on the user's foot and body during other phases of the Gait cycle, e.g., at the stance phase where the foots arches and the forefoot have ground forces on them. Existing footwear uses cushioning systems and methods to reduce the resulting forces on the user's body such as, for example, padded insoles, elastic and compressible midsoles and/or outsoles (e.g., rubber compounds), and/or soles with air pockets of springs or the like. The shock absorption properties of most footwear is achieved by variation in the material composition and/or thickness of the footwear at the heel, the arch support, and/or the forefoot. Materials such as rubber, plastic, air or liquids are used in various degrees and combinations. Ideally, the footwear seeks to achieve shock absorption without compromising foot and heel stability while also providing comfort style and enhance athletic performance when desired. Unfortunately, existing technologies achieve some goals while compromising others—increased stability with less shock absorption or increased shock absorption with less stability or more comfort and less a style or more style and less comfort.

An effective cushioning method or system needs to supplement the inherent force dissipating properties of the foot's bones and soft tissue and biomechanics. The higher shock absorption capacity of the footwear (and the user's heel, arch and forefoot) the less ground force transmission transmitted to toward the user's body and therefore, the less likelihood of injury and/or aggravation of pathology state of the foot, leg or spine.

There is a need for footwear with a shock absorbent, spring-like effect. There is a need for improved footwear capable of storing and releasing energy generated by gravity (weight). There is a need for footwear that can store energy generated by gravitational forces and can release the energy in the form of kinetic energy at the desired stage of walking or running (of the Gait Cycle) thereby assisting forward propulsion.

None of the exiting footwear provides 1) a convex shaped, split sole (in the longitudinal direction) with an outsole having opposing wedge shaped configurations in the bottom of the forefoot sole section and the heel sole section that provide rotation of the forefoot sole section and the heel sole section in opposite directions when weight is applied, and 2) a concave shaped outsole transversely across the width of the footwear at the forefoot sole section and/or the heel sole section.

None of the existing footwear provides an outsole having a plurality of wedge shaped segments in each of the forefoot sole section and the heel sole section, where each segment in the each of the forefoot sole section and the heel sole section are sloped downward (away from the upper) from an innermost portion of the segment located at an indentation central to the segments, wherein each segment slopes downward (away from the upper) to an outermost portion of the segment, thereby providing downward movement of the indentations in forefoot sole section and the heel sole section when weight is applied.

SUMMARY OF THE INVENTION

Applicant has invented footwear with an improved arch support, footwear configured to improve comfort and to assist with walking and/or running that overcomes the foregoing and other shortcomings. Applicant has invented footwear using at least one pair of wedges on the outsole, midsole, and/or innersole which provide footwear having improved arch support, configured to improve comfort and to assist with walking and/or running. While the invention will be described in connection with certain embodiments, it will be understood that the invention is not limited to those embodiments. To the contrary, the invention includes all alternatives, modifications and equivalents as may be included within the spirit and scope of the present invention.

The present invention includes an article of footwear comprising an upper and a sole structure secured to the upper having a front at the toe area and a back at the heel area, a medial side and a lateral side, a longitudinal length from the front to the back and a transverse width from the medial side to the lateral side. The sole structure according to the invention comprises an outsole with a generally convex shape along the longitudinal length of the footwear when the footwear is in a non-weight bearing position having a front end region and a back end region. The front end region is located along the entire front sole region of the sole with a connecting portion in the front of the midfoot sole region. The back end region is located along the entire rear sole region of the sole with a connecting portion in the back of the midfoot sole region. There is a raised portion of the sole between the front end region and the back end region in the midfoot sole region of the footwear. Accordingly, the front end region of the outsole is curved upward toward the upper from the innermost portion in the midfoot sole region to the front of the footwear and the back end region of the outsole is curved upward toward the upper from the innermost portion in the midfoot sole region to the back of the footwear. The outsole has a place of contact defined as at the innermost portion of the front end region of the outsole and a place of contact defined as at the innermost portion of the back end region of the outsole. When the footwear is worn and weight is placed down onto the sole, the front end and the back end of the outsole each bend about the respective places of contact bending in opposite directions causing the outsole of the footwear to flatten in the forefoot sole region and the rear sole region.

Preferably, the footwear according to the invention has no passive medial arch support. Preferably, the raised portion of the sole between the front end region and the back end region has no outsole or a raised outsole. In other embodiments, the raised portion of the sole between the front end region and the back end region has no midsole and/or insole.

In the embodiment shown in FIG. 3C, a flexible and elastic member is positioned across the middle section into the outsole in the front end section and in the back end section. As seen in Position B, the rotation and flattening of the bottoms of the front end section and the back end section when weight is applied to the footwear causes the elastic member to bend/arch.

The flexible and elastic member may be, for example, a metal strip/rod or a plastic strip/rod connecting the front end section and the back end section. The metal or plastic strip/rod spans across the middle section. The metal or plastic strip/rod stores energy when bent and the energy is released when the metal or plastic strip/rod flexes back to its original form/position. The invention also includes embodiments where the metal strip is removable and replaceable with a metal strip having different elasticity so that the propulsive force created by the footwear can be modified. In another embodiment, instead of a metal strip between the front end section and the back end section, both the front end section and the back end section can include magnets having similar polarity such that the magnets cause the front end section and the back end section to repel each other when they bend and the magnets move toward each other. As for the metal strip, the invention includes embodiments where the magnets are removable and replaceable with magnets having different magnetic strength.

The invention also includes embodiments where the front end section and/or the back end section of the sole is removable and replaceable with an component having a different configuration (e.g., slope and/or height) to modify the amount of arch support created by the invention. Such embodiments include devices where the sole adjustments are made in the factory during manufacturing, post-manufacture in the factory as a customization, in stores, and/or post-purchase. The invention also includes embodiments where air and/or water can be added to or removed from the sole to change its shape/configuration, including alteration of the angle(s) of inclination of the front end section and/or the back end section. The invention further includes embodiments where the spacing between the front end section and the back end section of the sole can be adjusted for a greater or smaller spacing.

The invention further includes embodiments where the underside of the outsole in the front end section and/or the back end section of the footwear is concave in at least one of the longitudinal direction and the transverse direction when in a non-weight bearing position. When concave shaped in both the longitudinal direction and the transverse direction the underside of the front end section (and/or the back end section) is sloped upwards around its perimeter towards an inner area within the front end section (and/or back end section) creating an indentation therein. Preferably, there are a plurality of grooves from the outer perimeter of the outsole to the inner area of the indentation creating segments. The resulting segments formed on the underside of the outsole in the front end section (and/or the back end section) bend (flatten) when weight is applied to the footwear which caused the area(s) at the indentation to move downward away from the upper. A cushioning effect results due to the elastic properties of the outsole. The kinetic energy in the movement of the outsole is converted into potential energy stored in the outsole which is composed of elastic materials. When the weight is removed, the elasticity of the outsole in the front end section and the back end section causes a "spring-like" effect releasing the potential energy helping to propel the user.

The present invention also includes footwear having a sole with variable heel and toe heights and/or variable medial side and lateral side heights allowing for adjustment of the heel to toe height ratio and/or the medial side to lateral side height ratio. Such height adjustments to either the front toe height, the back heel height, the medial side height, and/or the lateral side height can be accomplished using removable and replaceable sole segments and/or can be accomplished using adjustable height mechanisms in the sole. Adjustments to sole heights in any one or more of the aforementioned sole locations can be achieved manually such as, for example, a moveable wedge within the sole and/or using a motorized (battery operated) mechanism preferably, but not necessarily, automatically through a connection to a level gauge. Alternatively, the motorized adjustment of sole heights may be done using other sensory devices and/or equipment affixed to the individual at one more locations (including the foot, the ankle, the leg (tibia and/or femur) etc.

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIG. 1 shows the general locations of the medial arch, the lateral arch, and the transverse arch in a foot and thus in footwear when footwear is worn. The medial arch is located along the inside of the foot (the medial side from the 1st metatarsal head to the heel) from front (toes) to back (heel) longitudinally along the foot. The lateral arch is located along the outside of the foot (opposite the medial side) longitudinally along the foot. The transverse arch is located across the foot in the forefoot area under the metatarsals and formed by the metatarsals from the medial side to the lateral side of the foot. FIG. 2 shows the changes in the foot during movement (e.g., walking and different stages of the gait cycle) including changes in the height (y) and length (x) of the medial arch and changes in the plantar fascia tissue. FIG. 2 shows the foot and the foot arches in 1) a neutral position (e.g., a non-weight bearing position) with a medial arch height y and a medial arch base x, 2) in a position during the heel-off stage with the windlass effect shown where the medial arch height (and the arch height in the bones (designated as dimension $y_1$)) increases, the medial arch base length (and the arch base length in the bones (designated as dimension $x_1$)) decreases, and the plantar fascia tissue tightens, and 3) in a weight bearing position during the mid-stance stage of the Gait cycle where the medial arch height (and the arch height in the bones designated as $y_2$) decreases as compared to a non-weight bearing position, the medial arch base length (and the arch base length in the bones designated as $x_2$) increases as compared to a neutral position, and the plantar fascia tissue stretches as compared to a non-weight bearing position. FIG. 2 also shows schematics of the human foot and the bones of the foot in different positions depicting inferior compression along the medial arch with the bones touching along the inside of the arch and separated along the outside of the arch and depicting superior compression along the medial arch with the bones touching along the outside of the arch and separated along the inside of the arch

FIGS. 3A-3C show the footwear worn and in each figure in two positions: 1) a non-weight bearing position A (the swing stage of the gait cycle) and 2) a weight bearing position B (the mid-stance stage of the gait cycle).

FIG. 3A shows the modified outsole configuration according to the invention with a pair of wedge shaped portions one near the back end of the front end section of the sole (shown only on the medial side of the foot) and the other near the front end of the back end section of the sole transversely across the width of the outsole.

FIG. 3B shows the modified outsole configuration according to the invention similar to the embodiment in FIG. 3A with a pair of wedge shaped portions one near the back end of the front end section (this time shown transversely across the outsole) and the other near the front end of the back end section transversely across the width of the outsole.

FIG. 3C shows the modified outsole configuration according to the invention similar to the embodiment in FIG. 3B with a pair of wedge shaped portions one near the back end of the front end section of the sole (transversely across the width of the outsole) and the other near the front end of the back end section of the sole transversely across the width of the outsole, along with an elastic member connected to (joining) each wedge shaped portion at the front end section and the back end section.

FIG. 7A shows an embodiment located on the insole of footwear, FIG. 7B shows an embodiment in the form of a sock, and FIG. 7C shows an embodiment in the form of an insert into footwear or in the form of a stick on pad that adheres to the user's foot.

FIG. 9 shows the human foot and the contact locations for the foot along the longitudinal direction when weight is applied on a flat surface. It demonstrates that with the invention, once inferior arch compression is established, it brings about diffusions and direction change of weight force vectors such that a lesser force per unit area travels through a thicker padding (P+). Therefore, more pressure, more padding.

FIG. 11 shows the human foot with a neutral arch and in a condition with superior arch compression. FIG. 12 shows inferior arch compression occurring in the foot during the heel-off phase without the invention and during mid-stance phase with the invention according to the embodiment shown in FIG. 3A with the wedges on the outsole along the medial arch.

FIG. 17 shows opposing wedges with a flexible and elastic member between and connecting them in three positions, Position A, Position B, and Position C which shows multiple positions between Position A and Position B. Position A shows the structure in a non-weight bearing position. When weight is applied to the elastic member causing the elastic member to bend and the wedges to rotate, as shown in Position B, the elastic member reaches a point of equalization where it stops moving storing the energy as potential energy. In Position B, the wedges have rotated to a position with the hypotenuse flat on the ground. As the weight is removed, as shown in Position C, the elastic member releases energy as it bends back towards its initial configuration (straight) and the wedges rotate back towards their initial position on a corner (edge). The energy is released in a spring like fashion when the weight/force is removed assisting with propulsion and an upward vector force. A stable system is created when in Position B due to the flattening of the wedges. It is noted that the wedges in FIG. 17 could also deform and bend is made from a bendable material, such as, for example, rubber.

FIGS. 18A-18D show the footwear worn and in each figure in two positions: 1) a non-weight bearing position A (the swing stage of the gait cycle) and 2) a weight bearing position B (the mid-stance stage of the gait cycle). FIGS. 18A, C and D show a bottom plan view, a section view taken longitudinally down the middle, and section views taken transversely in the front end section and in the back end section, each position A and position B. FIG. 18B shows a bottom plan view and a section view taken longitudinally down the middle for each position A and position B.

FIG. 18A shows an embodiment of the invention comprising an outsole with wedge-like segments forming a concave underside of the front end section and a concave underside of the back end section.

FIG. 18B shows the modified outsole configuration according to the invention similar to the embodiment in FIG. 18A with adjustable elastic members in the front end section, the middle section and the back end section.

FIG. 18C shows an embodiment of the invention comprising an insole with wedge-like segments forming a concave underside in the front end section and a concave underside in the back end section allowing for the movement of the insole within the footwear.

FIG. 18D shows an embodiment an insole (and/or midsole) incorporated into footwear with wedge-like segments forming a concave underside in the front end section and a concave underside in the back end section allowing for the movement of the insole within the footwear.

FIGS. 19A and 19B show the footwear worn and in each figure in two positions: 1) a non-weight bearing position A (the swing stage of the gait cycle) and 2) a weight bearing position B (the mid-stance stage of the gait cycle). FIGS. 19A and 19B show a bottom plan view, a section view taken longitudinally down the middle, and a sectional view taken at the front end section and the back end section, respectively, in each position A and position B.

FIG. 19A shows an embodiment with segments and grooves on just the front end section of the outsole.

FIG. 19B shows an embodiment with segments and grooves on just the back end section of the outsole.

FIG. 20 shows the human foot and the contact locations for the foot along the longitudinal direction when weight is applied on a flat surface. It demonstrates that with the embodiment of the invention including the concave wedge segments, once inferior arch compression is established, it brings about diffusions and direction change of weight force vectors such that a lesser force per unit area travels through a thicker padding (P+). Therefore, more pressure, more padding.

In FIG. 21B, the toe height h2 is greater than the heel height h1.

FIG. 25 shows the geometry for the tibia during the HO, PO, and TO phases of the Gait Cycle. During walking and running Gait Cycle, the tibial ground angle (TGA) is set at heel off (HO) and stays at that angle until TO, FIG. 26 shows footwear according to the invention with an upward inclined (uphill) anterior base wedge increasing TGA at HO and therefore leg muscle generated power projectile angle (Fw) at TO.

FIG. 27 shows footwear according to the invention with a downward inclined (downhill) posterior wedge decreasing TGA at HO and therefore projectile vector angle (Fw) at TO.

FIG. 28a also shows the anatomical limits (range of motion (ROM)) for the ankle joint.

FIG. 29a shows that according to accepted Geometry Law, a tangent to a circle is at right angle (90 degrees) to the radius at the point of intersection. When tangent-radius angle is fixed, as the radius (R) rotates clockwise the tangent translates (moves) anteriorly (to right). If tangent-radius angle is less than 90 degrees and is fixed, the tangent translates posteriorly (to left).

DETAILED DESCRIPTION OF THE INVENTION

Reference is being made in detail to presently preferred embodiments of the invention. Selective embodiments are provided by way of explanation of the invention, which is not intended to be limited thereto. In fact, those of ordinary skill in the art may appreciate upon reading the present specification and viewing the present drawings that various modifications and variations can be made.

The present invention is footwear with an improved arch support, footwear configured to improve comfort and to assist with walking and/or running. The invention includes footwear with a convex shaped outsole bottom along at least one of the arches (the medial arch, the lateral arch and the transverse arch of the footwear). The footwear according to the invention uses at least one pair of wedges on the outsole, or an outsole shaped and configured in such a manner, which provide for improved arch support, improve comfort, and assist with walking and/or running. The footwear according to the invention also includes midsoles and insoles with the wedge configuration(s).

Figure 1:
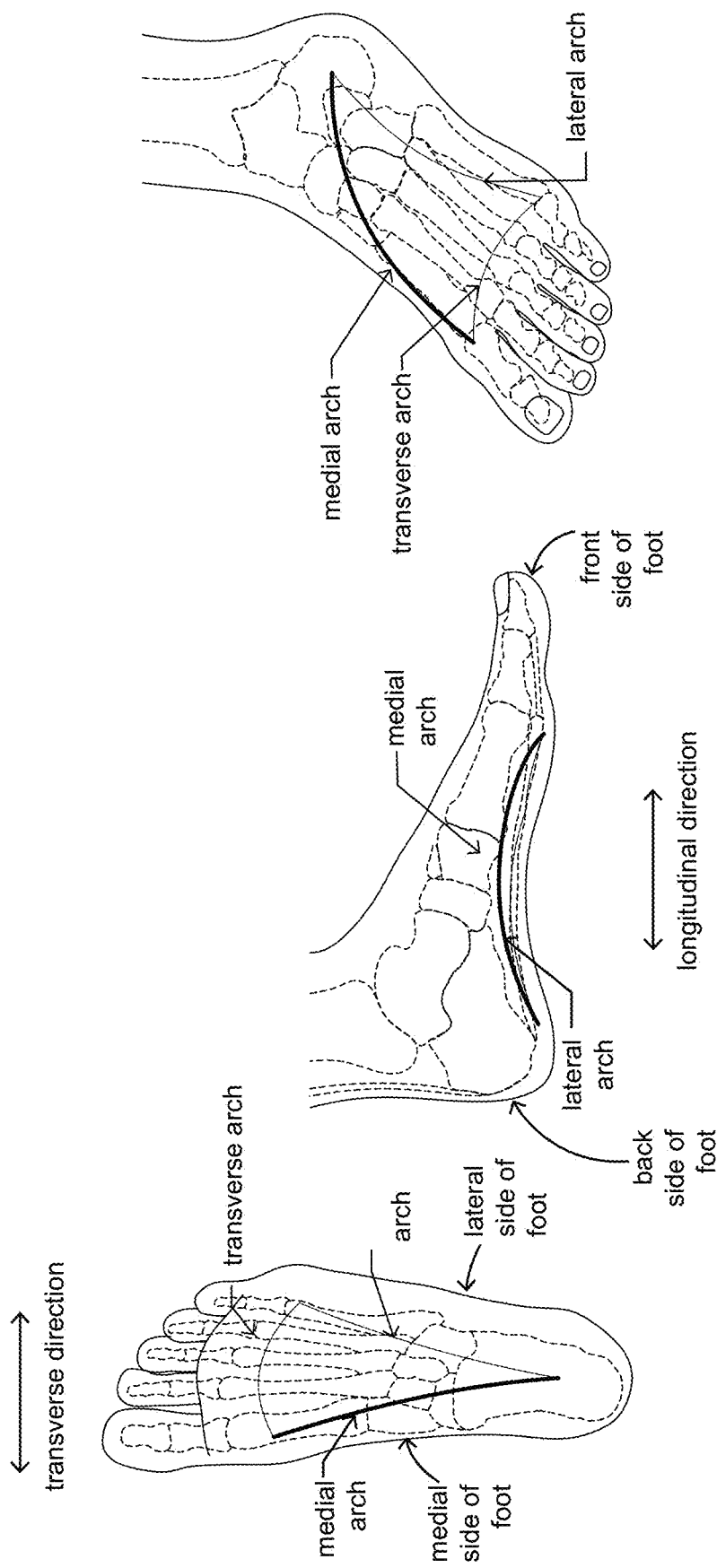
FIGS. 1 and 2 are schematics of the human foot in different views and positions with a partial showing of the bones in the foot.
Figure 2:
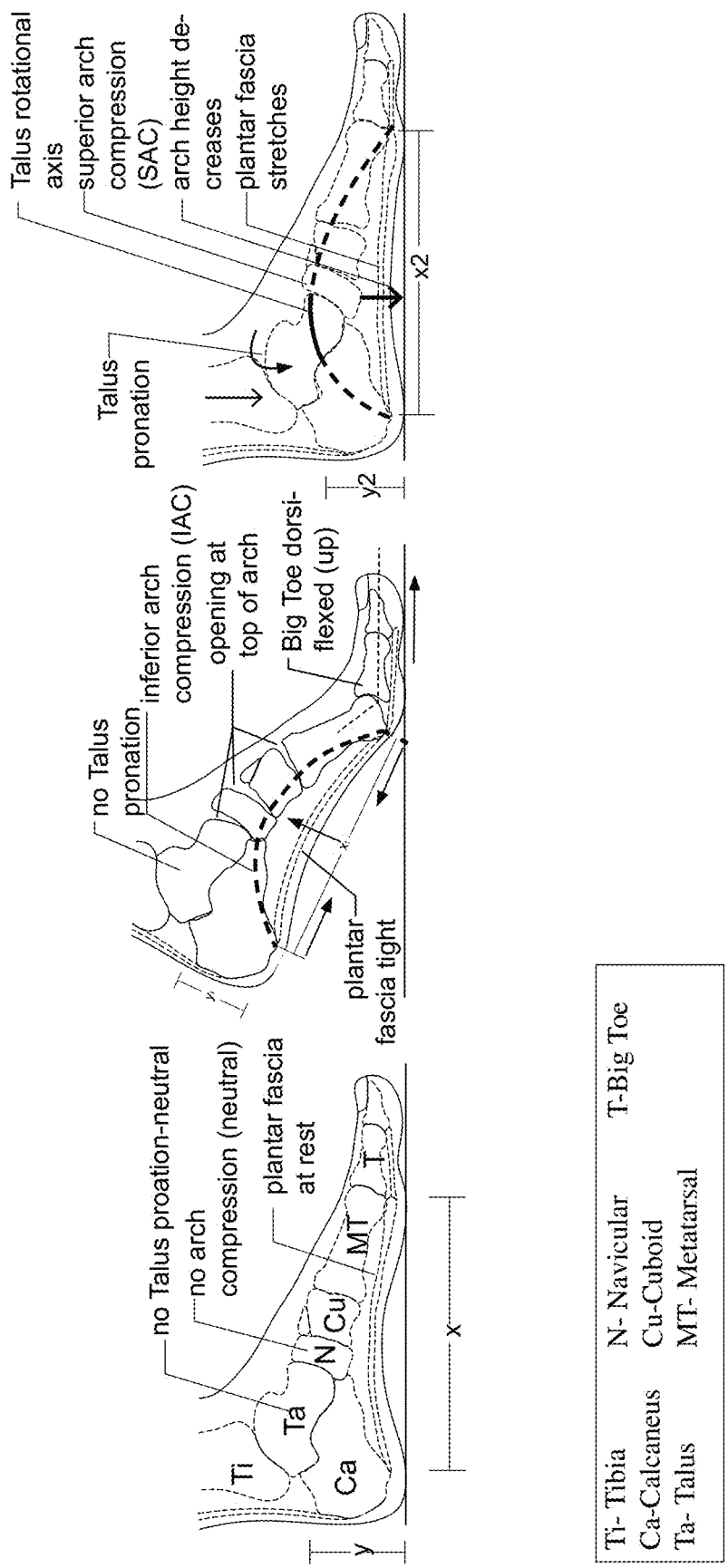
Figure 2A:
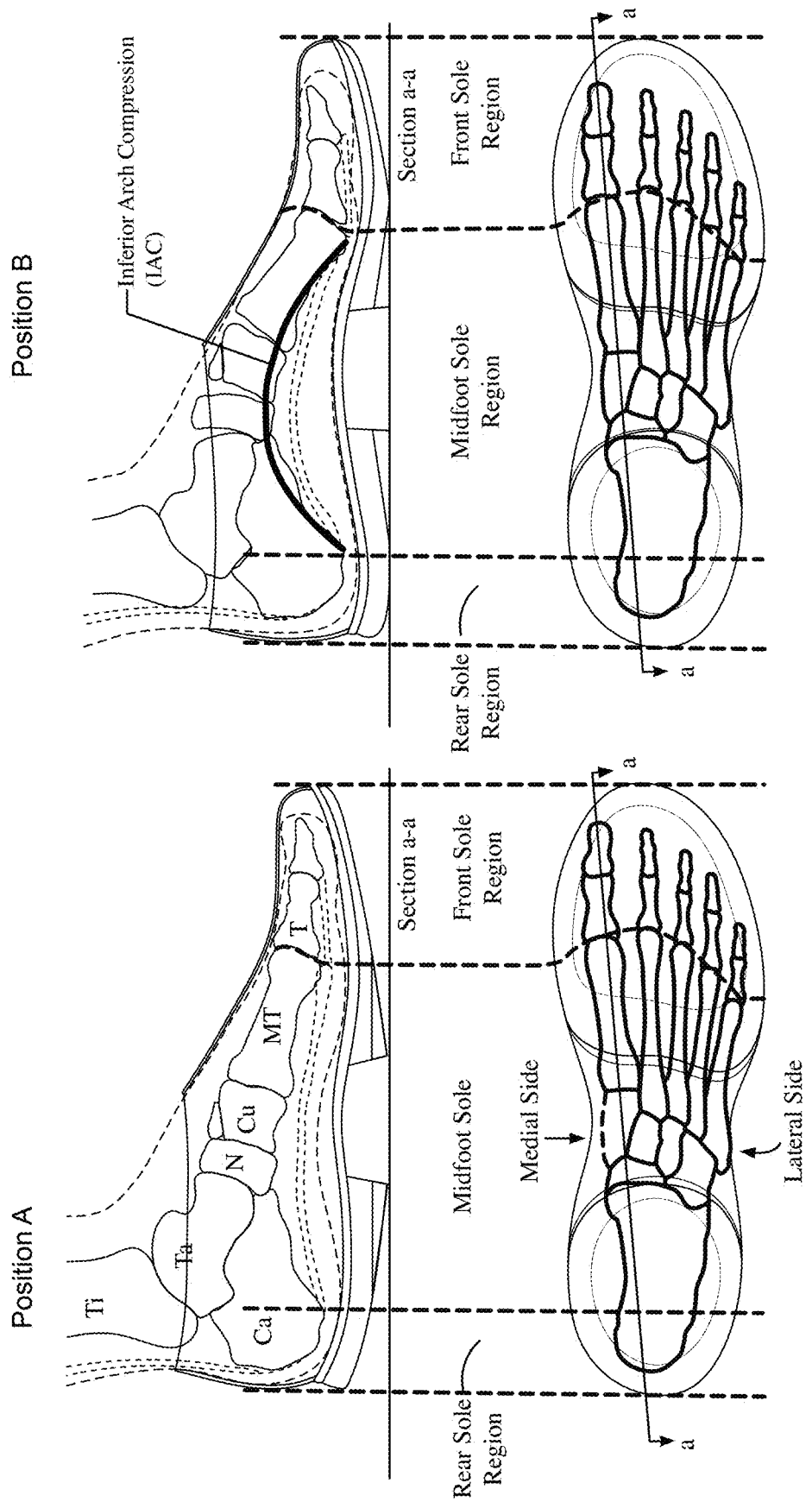
FIG. 2A illustrates a bottom plan view and a sectional side view of a sole showing predetermined sections, regions or portions substantially corresponding to the anatomy of a human foot with the skeletal structure of the human foot.

For a better understanding of the present invention, FIG. 2A illustrates a side view and a bottom plan view of a foot and sole showing predetermined regions or portions substantially corresponding to the anatomy of a human foot. The footwear according to the present invention comprises three major divisions, a front sole region, a midfoot sole region and a rear sole region. The front sole region is the location where the user's toes are positioned including the front of the toes to the point where the phalanges connect to the metatarsal bones. The midfoot sole region is the location where the user's medial longitudinal arch is located including the metatarsal bones (also the location for passive arch supports in conventional footwear) and the several interconnecting bones that form the medial arch including the cuboid, the navicular and the talus. The midfoot sole region is further defined by what would be considered the base locations of the medial longitudinal arch, that is, the section between the places where the user's foot, when outside the footwear, would contact a flat surface. Typically, a human foot makes contact at the joints between each of the phalanges and corresponding metatarsal bones and at the heel. The rear sole region is defined as the location behind where the user's heel bone, when outside the footwear, would contact a flat surface, and thus includes a portion of the location of the heel bone. It is understood that the human foot also includes interconnecting muscles, ligaments, and other tissue which are not shown for clarity. The front sole region, midfoot sole region and a rear sole region shown in FIG. 2A represent general areas of footwear that will vary in size and proportion depending upon the user.

Figure 3A:
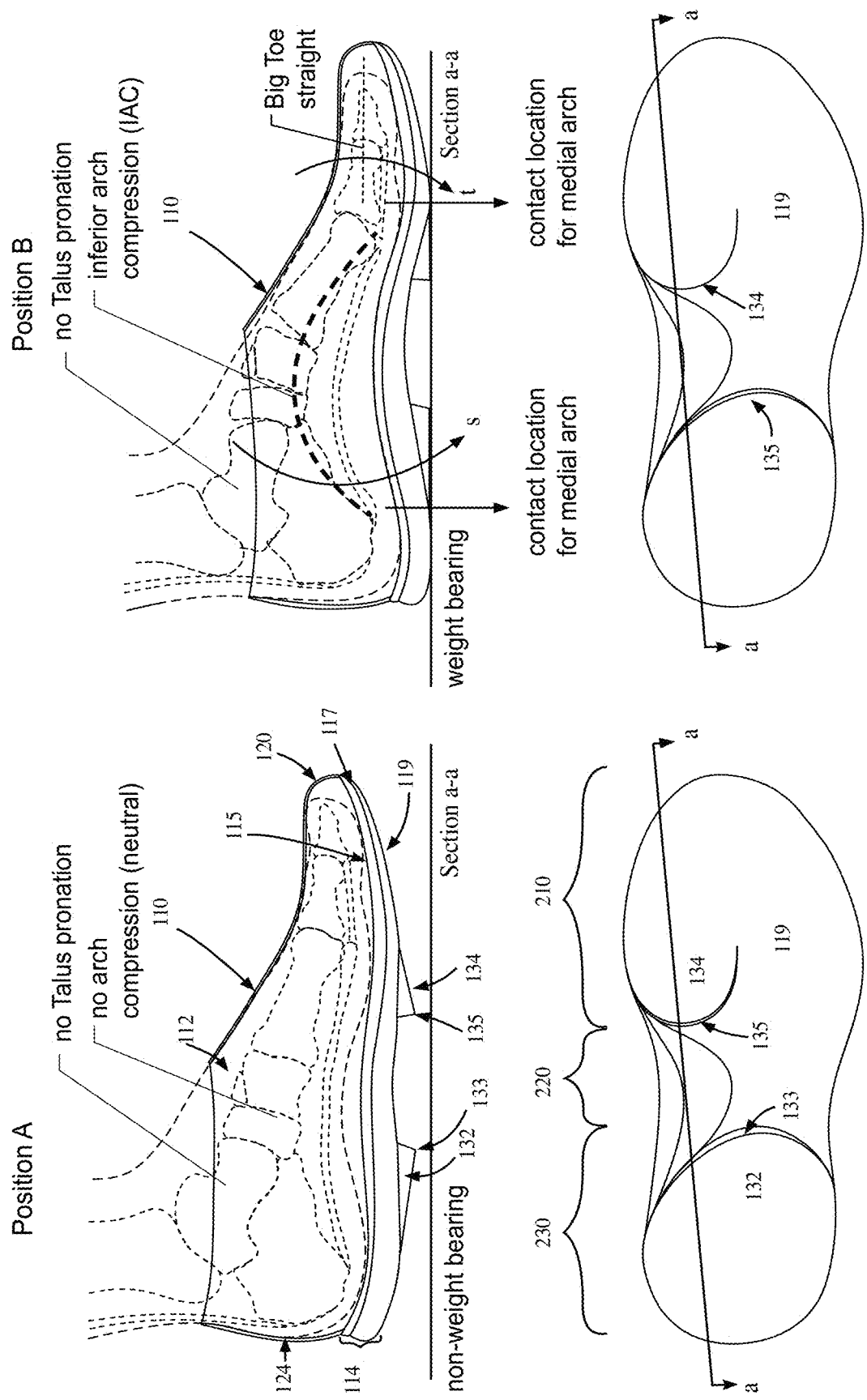
FIGS. 3A-3C show several embodiments of the invention in the form of a shoe or sneaker comprising a modified outsole.

As shown in FIG. 3A, the invention is an outsole with a generally convex shape (or angled) along the longitudinal length of the footwear when in a non-weight bearing position/condition (Position A). The footwear according to the invention further comprises a wedge shaped rear end section of the outsole and a wedge shaped front end section of the outsole. The footwear according to the invention further comprises a portion of the outsole in the midfoot sole region connected to the outsole in the front end section and a portion of the outsole in the midfoot sole region connected to the outsole in the rear end section. The footwear according to the invention has a raised outsole in a part of the midfoot section. The invention also includes a split sole configuration where there is no outsole in at least a part of the midfoot sole region and/or the midsole and/or the insole.

The underside of the outsole in the front end section of the footwear according to the invention is thus curved upward from the lowest location in the midfoot sole region of the footwear to the front of the footwear 120, including the portion in the forefoot sole region. Likewise, the underside of the outsole in the rear end section of the footwear according to the invention is curved upward from the lowest location in the midfoot sole region of the footwear to the rear of the footwear 124, including the portion in the rear sole region. The footwear thus has two places of contact for the outsole on the surface it is placed located in the midfoot sole region that are spaced apart from each other such that when the footwear is worn, the two places of contact will be inside the contact locations for the medial arch of a user's foot. The footwear is also configured such that when worn and weight is placed down onto the footwear and the outsole, the outsole bends about the two places of contact in opposite directions causing the outsole of the footwear to flatten in the rear sole region and in the forefoot sole region. The footwear according to the invention preferably has no passive medial arch support that would otherwise limit the user's foot's ability to achieve inferior arch compression along the medial arch during a flat foot position. It is understood that the outsole of the footwear according to the invention in the front end section of the footwear and/or in the back end section of the footwear can be configured in other shapes with or without curves, such as, for example, a straight outsole sloped upward from the place of contact to the front of the sole and/or from the place of contact to the back of the sole.

The sole according to the invention is flexible preferably made from—plastic, rubber, metal, opposing magnets, leather, air pockets, etc.

Figure 3B:
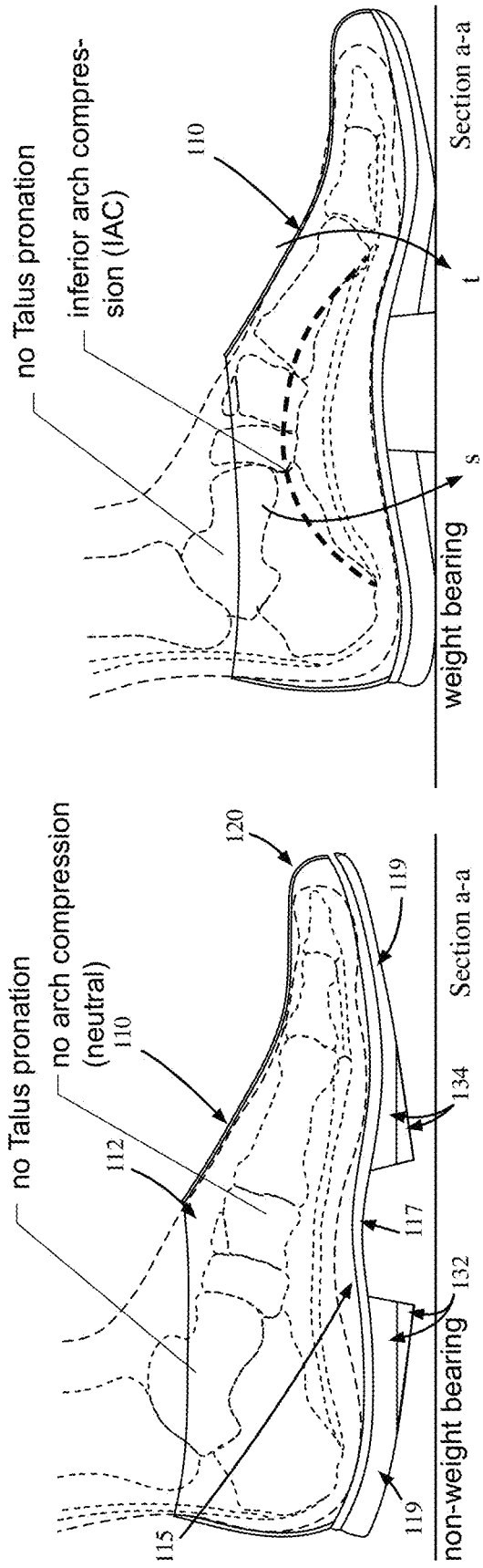
Figure 3B:
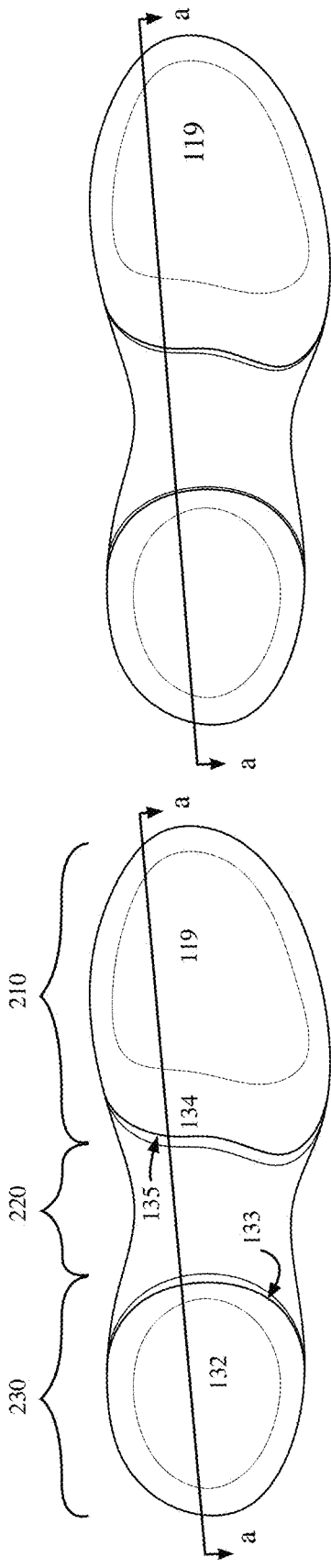
Figure 3C:
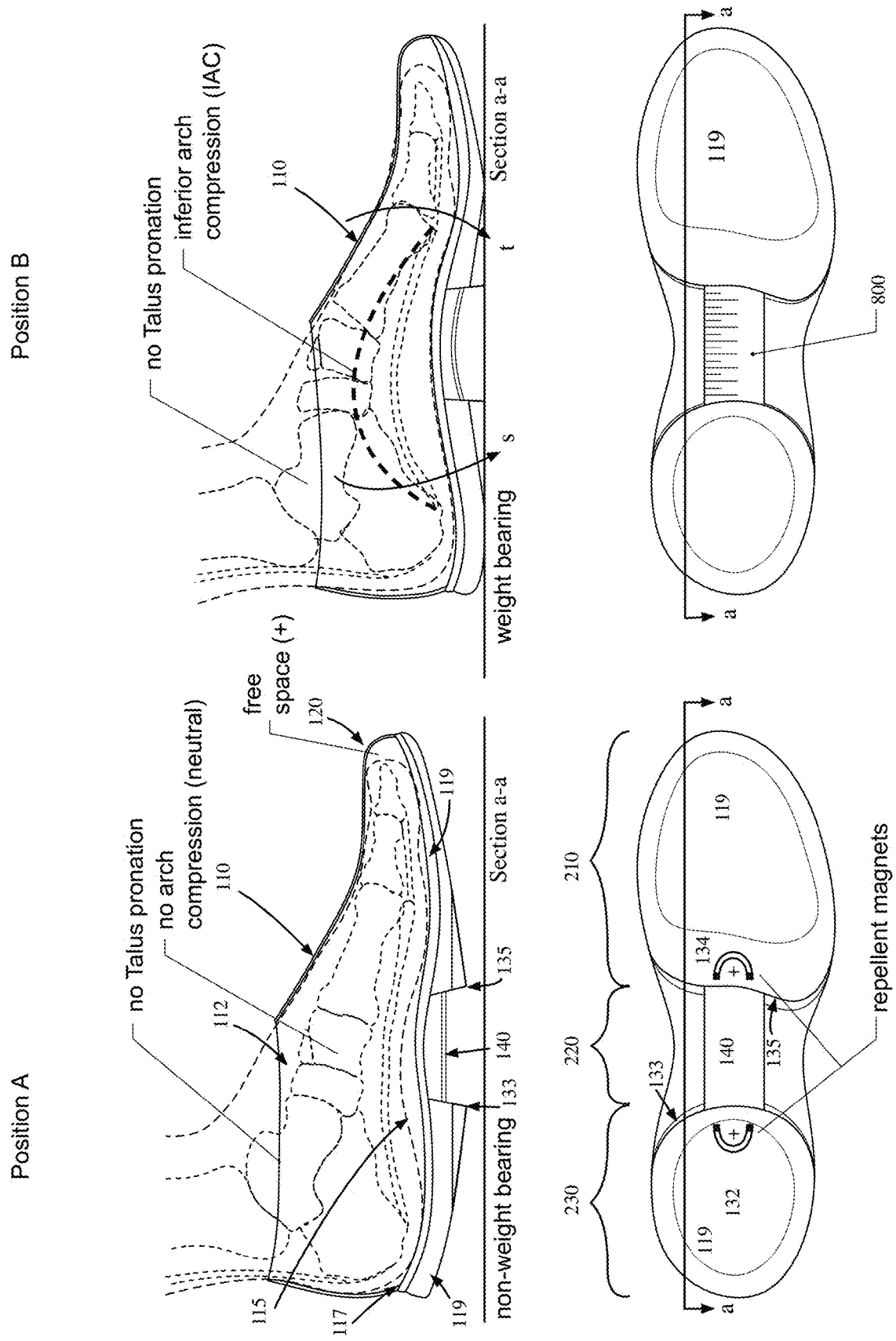

As shown in FIG. 3A, a cross-sectional side view of footwear according to the invention with a foot shown inside, the invention's outsole configuration creates two locations 133 and 135 where the sole hinges and bends when weight is applied. Because the contact locations for the foot (the locations forming the base of the medial foot of the arch) are located outside of the locations of the points of contact for the footwear 133 and 135, the front end section 210 and the back end section 230 of the footwear each rotate down in opposite directions. The initial points of contact on the outsole when the footwear is placed straight down onto the ground identifies those locations about which the rotation occurs, e.g., the apex of the wedge like shape. In FIGS. 3A-C, the locations of rotation are identified by numerals 133 and 135. These locations may be a small (e.g., a small line) or the locations may be small areas. For stability, the locations are preferably bigger than a single point of contact and consist of a small area on the sole. According to the invention, for most footwear having a longitudinal length L from the toe to the heel, the point of contact 133 for the footwear is located at about ⅓L from the back of the footwear. The point of contact 135 for the footwear is also located at about ⅓L from the front of the footwear, although the invention includes larger distances including distances between about ⅓L and ½L.

When weight is placed on the footwear, as shown in Position B, the front end section of the sole 210 of the footwear comprising the sole in the forefoot sole region and a part of the outsole located in the front of the midfoot sole region connected to the sole in the forefoot region rotates around the place of contact 135 for the front wedge 134 in a direction t. The back end section of the footwear 230 comprising the sole in the rear sole region and a part of the outsole located in the rear of the midfoot region and connected to the sole in the rear sole region rotates around the place of contact 133 for the rear wedge 132 in a direction s. The direction of rotation t of the front end of the sole 210 is about opposite to the direction of rotation s of the back end of the sole 230. The invention includes the ability for the sole to rotate (each the front end section 210 and/or the back end section 230) in the transverse direction (e.g., a twisting like pronation of the foot).

The rotation of the front and back ends of the sole 210 and 230 in opposite directions stabilizes the outsole 119 on the ground (or another surface on which the footwear is placed). The front end section 210 and back end section 230 rotation causes the middle section of the sole in between the two 220 (within the midfoot sole region) to arch. When the footwear is worn, the weight of the user comes down on the contact locations for the medial arch which are outside of the places of contact 133 and 135. The footwear consequently shortens the base of the user's medial foot arch, raising the medial arch of the user's foot, thereby increasing the rigidity along the medial arch with inferior arch compression. The user's foot is placed into the condition it would normally be in during the heel-off windlass stage of the gait cycle (but without toe dorsiflexion and its consequence of tighter plantar fascia) with an increased arch height and decreased arch base length, and the plantar fascia tissue shortens (and it therefore loosens) instead of the foot being placed into the mid-stance stage where the user's foot is splayed with a decreased arch height and increased arch base length and with the plantar fascia tissue lengthened (stretched longitudinally). The user's foot is pushed into a state where the bones of the foot experience inferior arch compression (the same state as during the windlass effect during the heel-off stage of the gait cycle) instead of superior compression. Particularly for user's with tight footwear (shoes), with the invention, in this position, the user's foot fits more comfortably inside the footwear because it does not "spread out" (splay) as much as without the invention.

Figure 10:
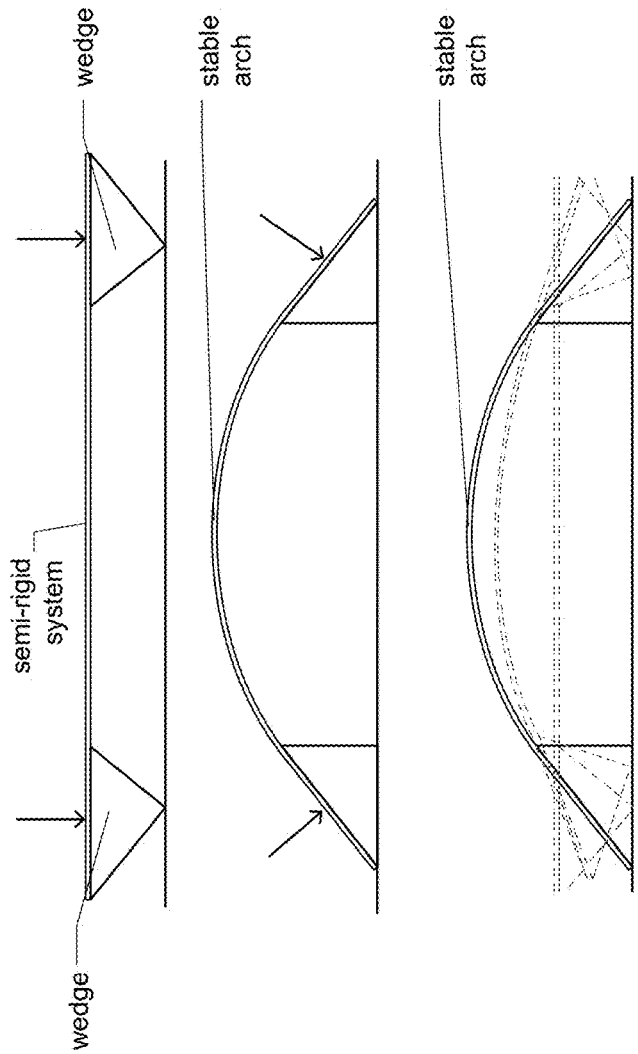
FIG. 10 shows the theory behind the present invention and how a dynamic arch works. The combination of sliding and rotating opposing wedges with a flexible and elastic member between them (external to the human foot or the arch(es) within the foot itself) changes the direction of the resultant forces on the wedges causing a more stable structure when the wedges rotate to a flat position. The forces cause the middle section connecting the two wedges to bend into an arch like shape storing potential energy in the middle section when an elastic member is used. The energy is released in a spring like fashion when the force is removed from at least one of the wedges which has a forward force vector assisting with forward propulsion and an upward vector force which augments body center of gravity shift. A stable arch system is created due to the resulting forces on the arch which become directed inward at the bases of the arch as opposed to distractive outward directed forces in a splaying arch.
Figure 10:
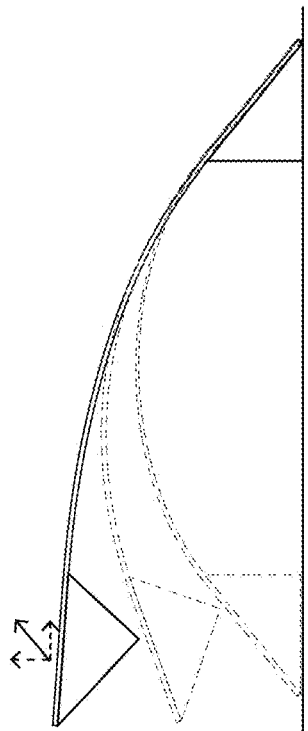
Figure 11:
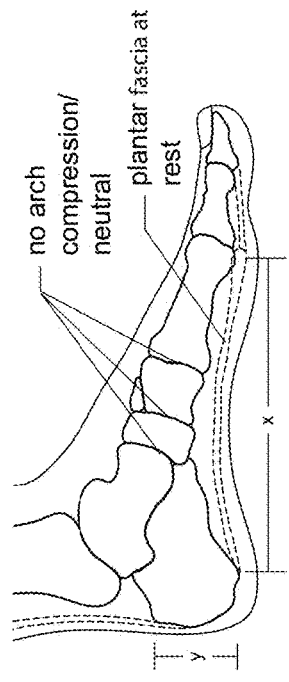
FIGS. 11-12 further show how the principles of a dynamic arch work with the invention.
Figure 11:
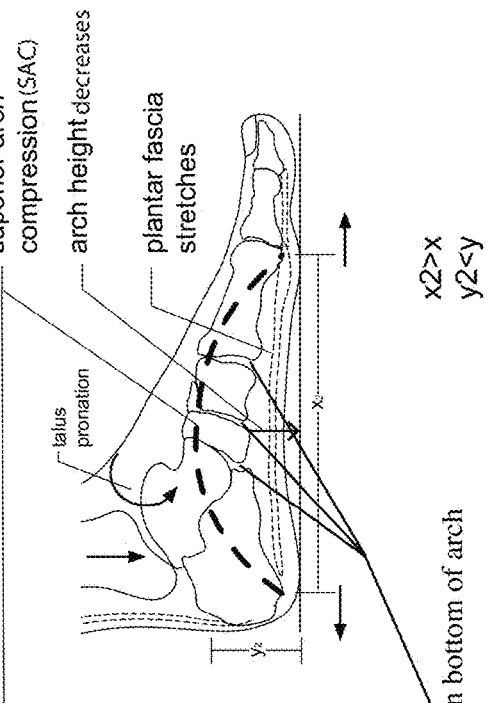
Figure 11:
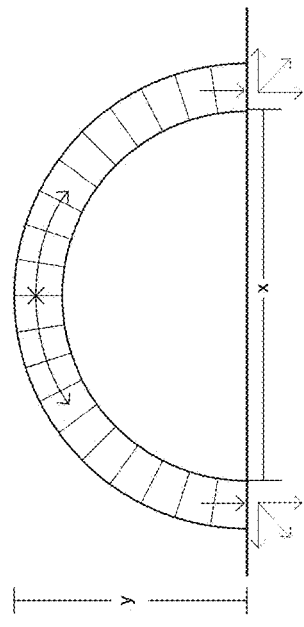
Figure 11:
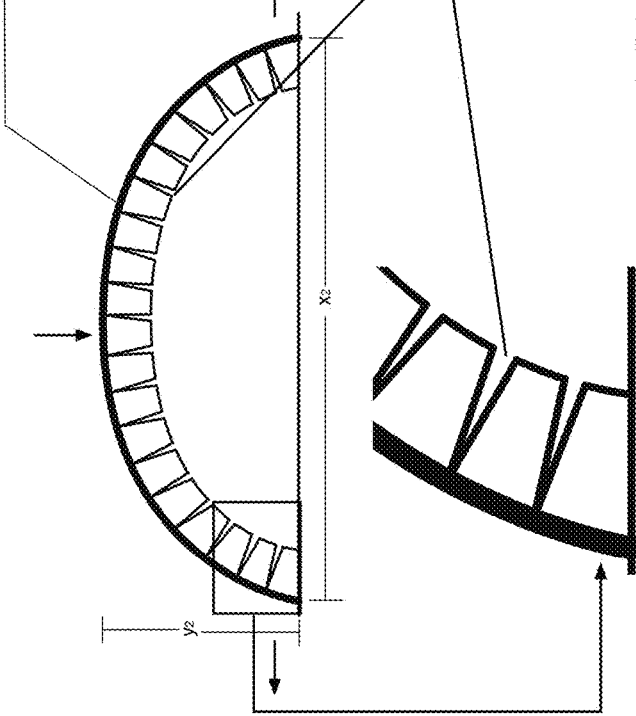
Figure 12:
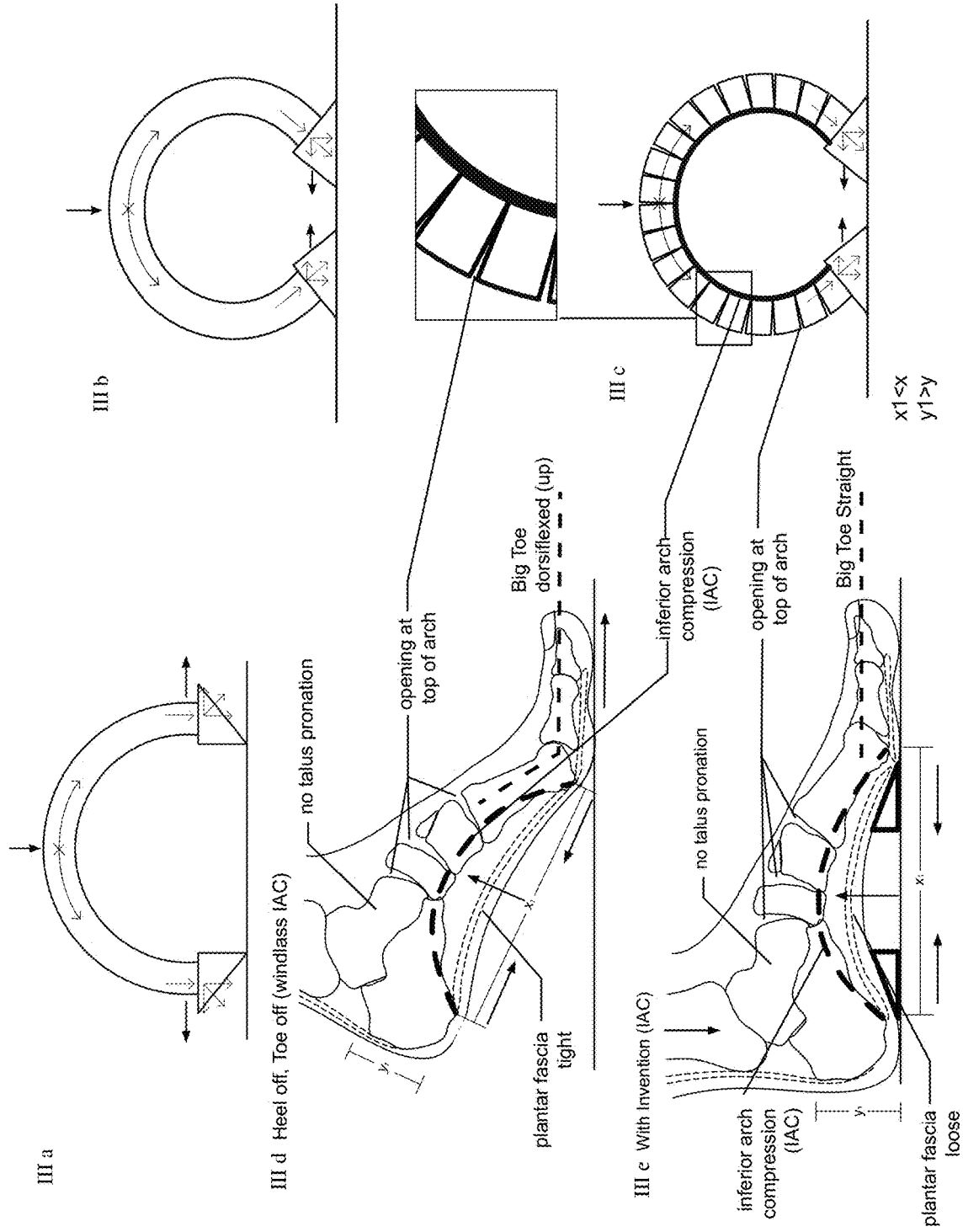
Figure 13:
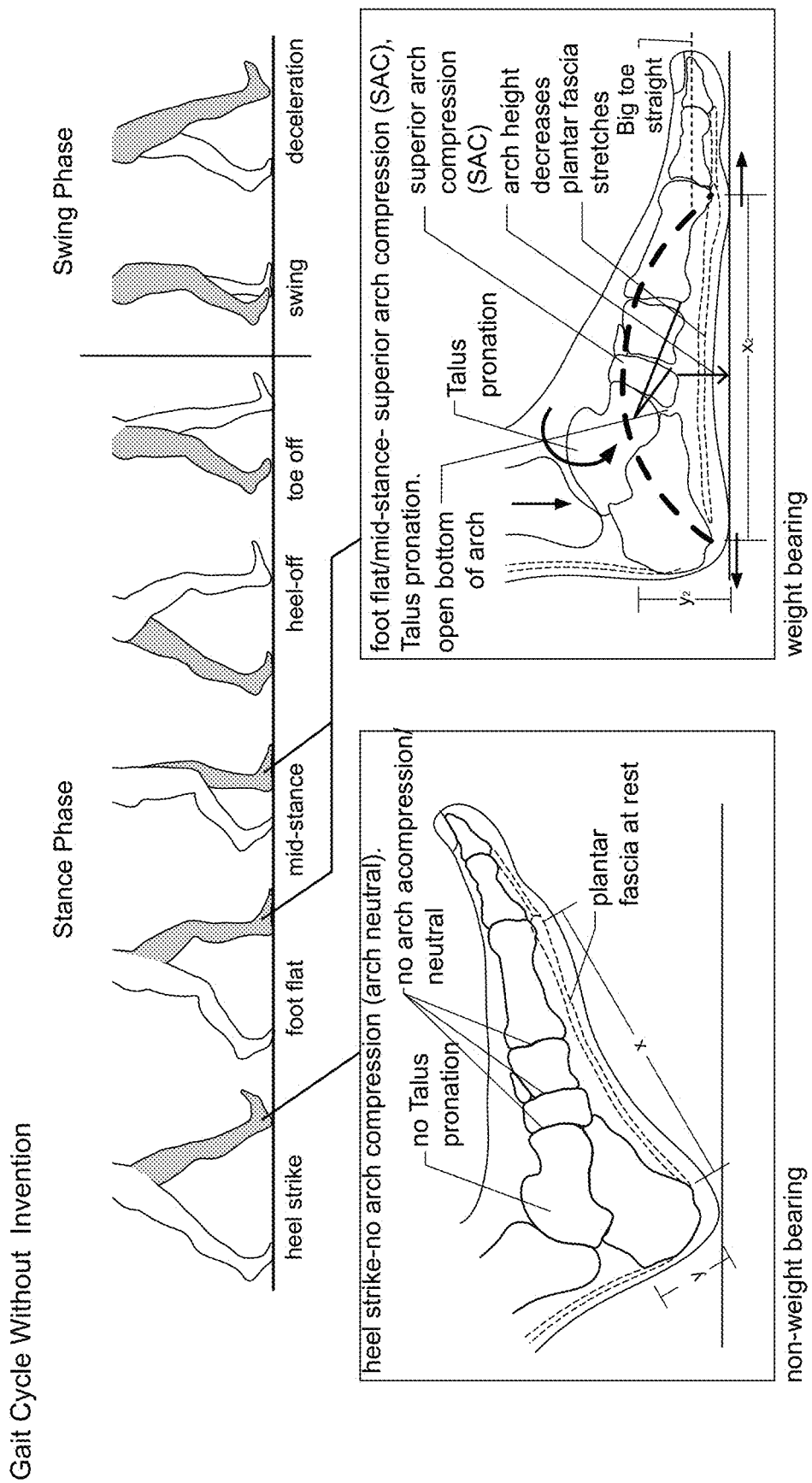
FIGS. 13-16 show the various phases of the gait cycle and the condition of the foot during each phase. The figures include images showing the foot without the invention on top. On bottom, the figure shows the effects of the invention on the foot during the phases of the gait cycle. In the flat-foot and midstance phases, with the invention, the foot achieves inferior arch compression without talus pronation instead of superior arch compression with talus pronation.
Figure 14:
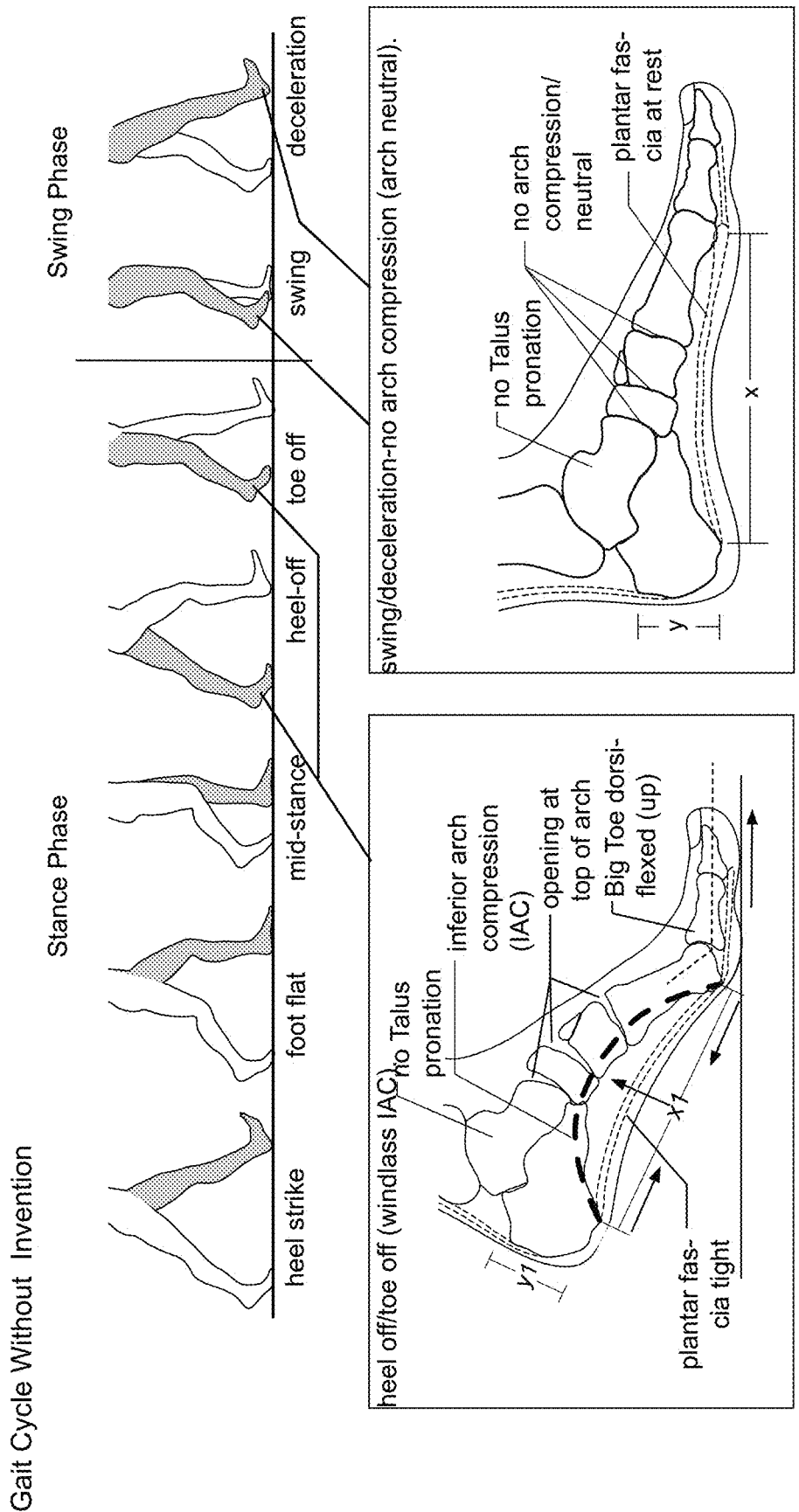
Figure 15:
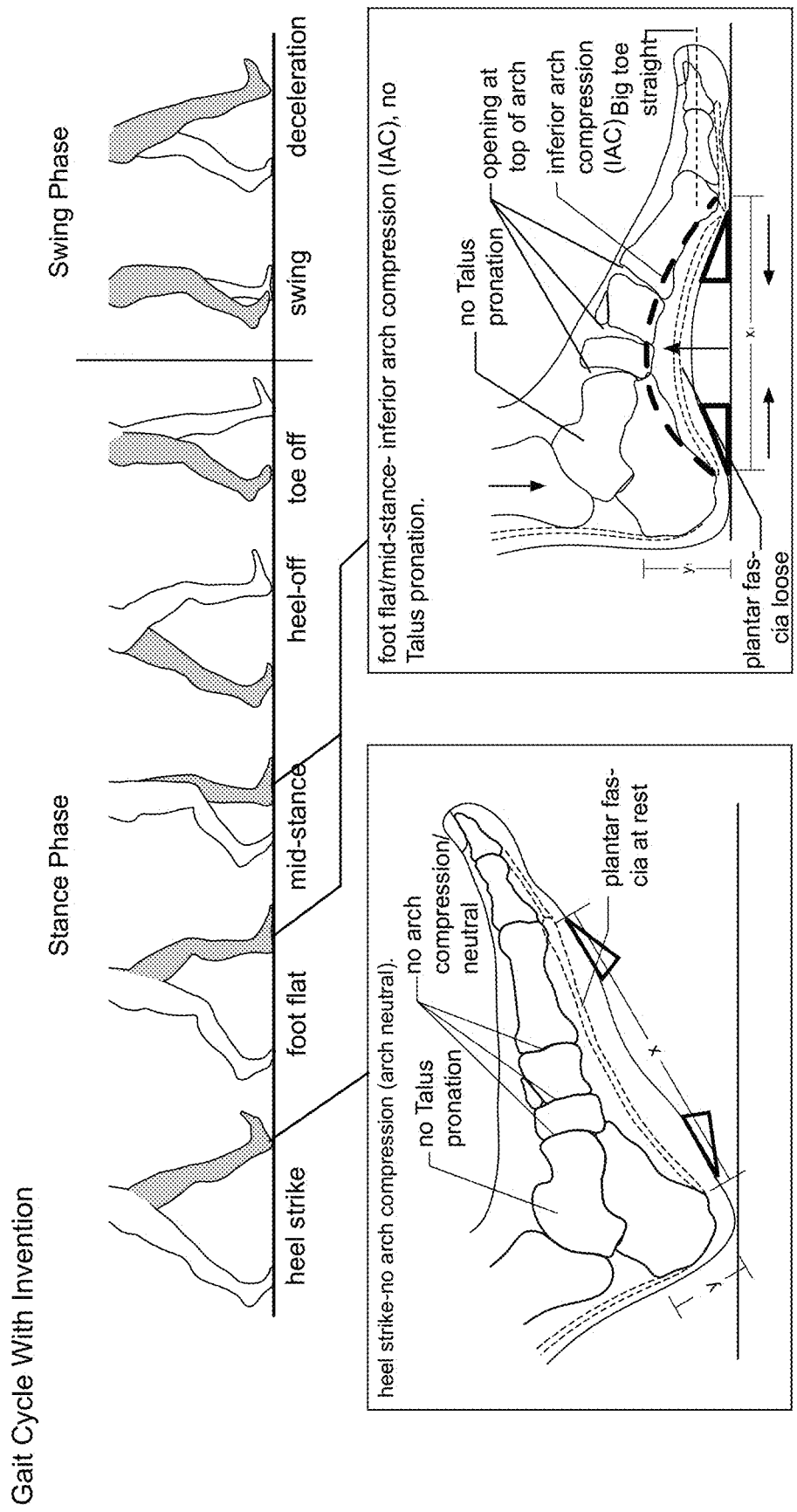
Figure 16:
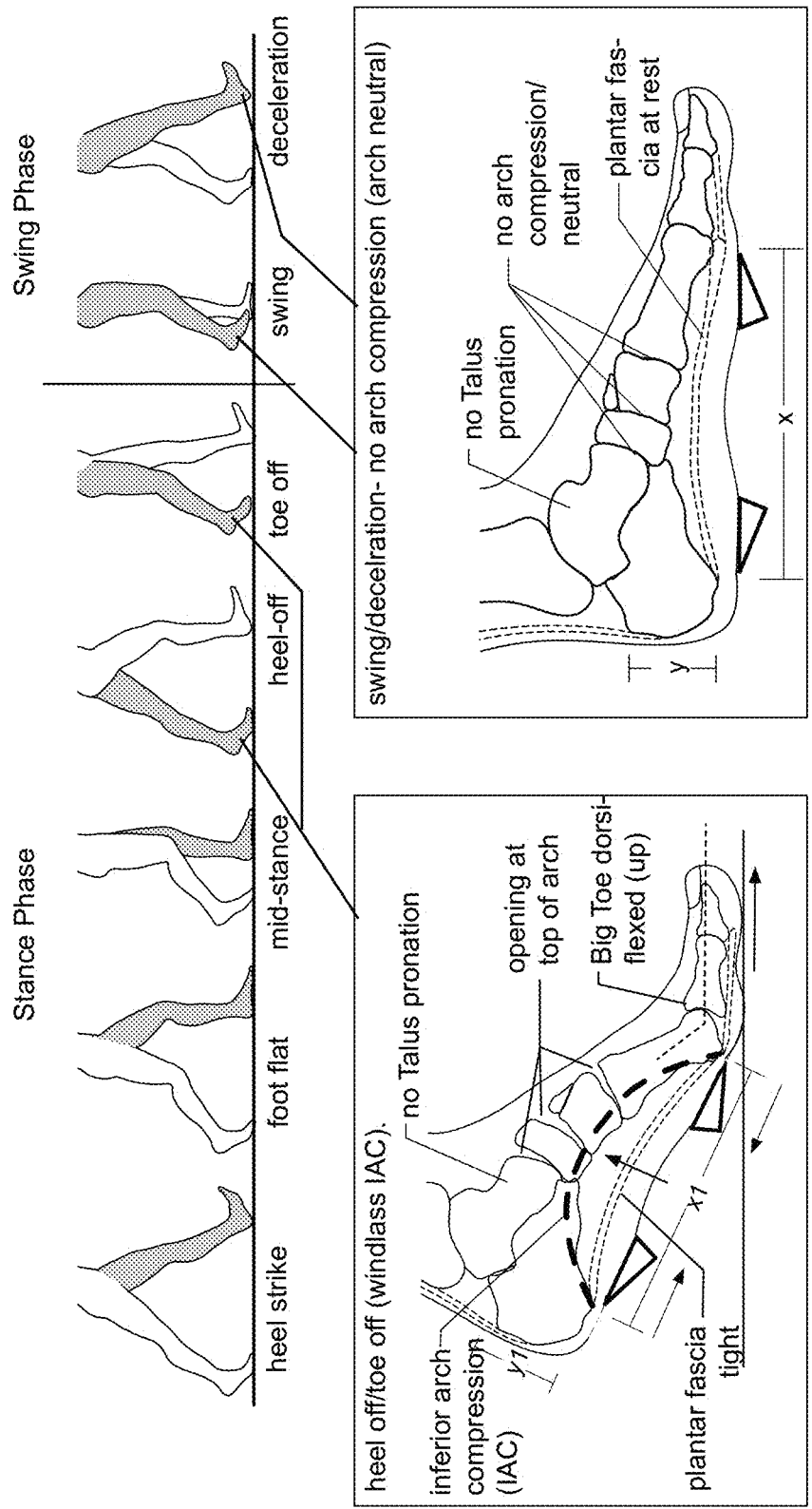

Most preferably, although not necessary, when weight is placed on the footwear causing rotation of the front end section 210 and the back end section 230, causing the shape of the underside of the outsole to change from a convex configuration to an about flat configuration (with the underside of the front end section and the underside of the back end section flat), either one or both of the front end section 210 of the outsole and the back end section 230 of the outsole also slide on the surface they contact each towards the middle of the footwear (towards each other). The combination of sliding and rotating of the front end section 210 and back end section 230 of the sole increases the bending force on the middle section 220 of the sole which in turn increases the arching action of the footwear in the middle section 220 and thus the medial arch of the user's foot. A stronger and more stable arch system is created due to the resulting forces on the base of the arch which become directed inward at the bases of the arch (at the outsole) as depicted in FIG. 10.

The sliding of the outsole 119 along the contacting surface at the places of contact 133 and 135 may occur for typical outsole materials of construction (e.g., rubber) without the need for modification. Alternatively, in another embodiment of the invention, the sliding of the outsole 119 along the contacting surface at the places of contact 133 and 135 could be improved by constructing parts of the underside of the outsole with a smooth plastic or similar material over the entire outsole or parts of it including the places of contact 133 and 135.

In the embodiment shown in FIG. 3A, the middle section 220 of the sole 114 between the places of contact 133 and 135 is shown with an insole 115, a midsole 117, and an outsole 119. Preferably, one or more of the insole 115, a midsole 117, and outsole 119 are made from an elastic material in the middle section of the sole 220 extending at least over/past the places of contact 133 and 135 in the front end section 210 and the back end section 230. In FIG. 3A, the midsole 117 is an elastic material (e.g., rubber) which bends (arches) when the footwear is placed into Position B. Alternatively, one or more plastic or metallic plates/rods could be included in the sole 114, positioned on the underside of the outsole 119, inside the outsole 119, inside the midsole 117, and/or inside the insole 115.

In the embodiment shown in FIG. 3A, the outsole 119 is configured with front end section 210 and a back end section 230 each having a wedge shaped configuration 132 and 134. The front end section 210 of the outsole 119 is located in the forefoot sole region and a part is in the midfoot sole region. The back end section 230 of the outsole 119 is located in the rear sole region and a part is in the midfoot sole region. In this embodiment, the front end section 210 of the outsole 119 is only wedged on the medial side of the footwear. Such a configuration provides for dynamic arch support primarily along the medial arch of the user's foot.

In the alternative embodiments shown in FIGS. 3B and 3C, the outsole 119 configuration is similar to the embodiment shown in FIG. 3A configured with a front end section 210 and a back end section 230 each having a wedge shaped configuration 132 and 134. The front end section 210 of the outsole 119 is located in the forefoot sole region and a part is in the midfoot sole region. The back end section 230 of the outsole 119 is located in the rear sole region and a part is in the midfoot sole region. In this embodiment, the front end section 210 of the outsole 119 has a wedge shape across the footwear in the transverse direction. Such a configuration provides for dynamic arch support along the user's medial foot arch and, more so than the embodiment shown in FIG. 3A, also along the transverse arch of the user's foot. In the embodiment shown in FIG. 3B, there is no outsole 119 in the middle section 220 of the sole 114.

In the embodiment shown in FIG. 3C, a flexible and elastic member 140 is positioned across the middle section 220 into the outsole 119 in the front end section 210 and in the back end section 230. As seen in Position B, the flattening of the bottoms of the front end 210 and the back end section 230 when weight is applied to the footwear 110 causes the elastic member 140 to bend/arch.

The elastic member 140 and/or the sole 114 in the case of an elastic sole, stores energy when bent and the energy is released when the weight is removed and the elastic member flexes back to its original form/position. When a flexible, resilient, elastic member, such as, for example, a metal strap or a plastic strap, are used, the footwear according to the invention therefore stores and releases energy during the various stages of the Gait cycle effectively assisting with walking and/or running. The energy stored is released between the mid-stance and the heel off stages of the Gait cycle causing the heel of the foot to spring up when the back end section 230 of the footwear comes up off of the ground and the stored energy is released. The user thus experiences a spring like effect causing a propulsion of the user's foot. The amount of force received is a function of the degree of inclination (convexity) of the bottom of the outsole, the elasticity of the sole (and/or elastic member), and the amount of weight (force) applied.

In the embodiment shown in FIG. 3C, metal strip 800 includes lines or gradations to see or measure the spacing between the points of contact 133 and 135. The invention includes embodiments where the user can adjust the spacing between the front end section 210 and the back end section 230 by hand, or using a wrench or a pump. Alternatively, the entire front end section 210 of the sole and/or the entire back end section 230 of the sole can be removed and replaced with a different sized component as desired for comfort and/or for a specific activity (e.g., walking, running, etc.). In yet another embodiment, as shown in FIG. 3C, magnets with similar polarity can be positioned within both the front end section 210 and the back end section 230 to increase the propulsive force for the footwear according to the invention.

Figure 4:
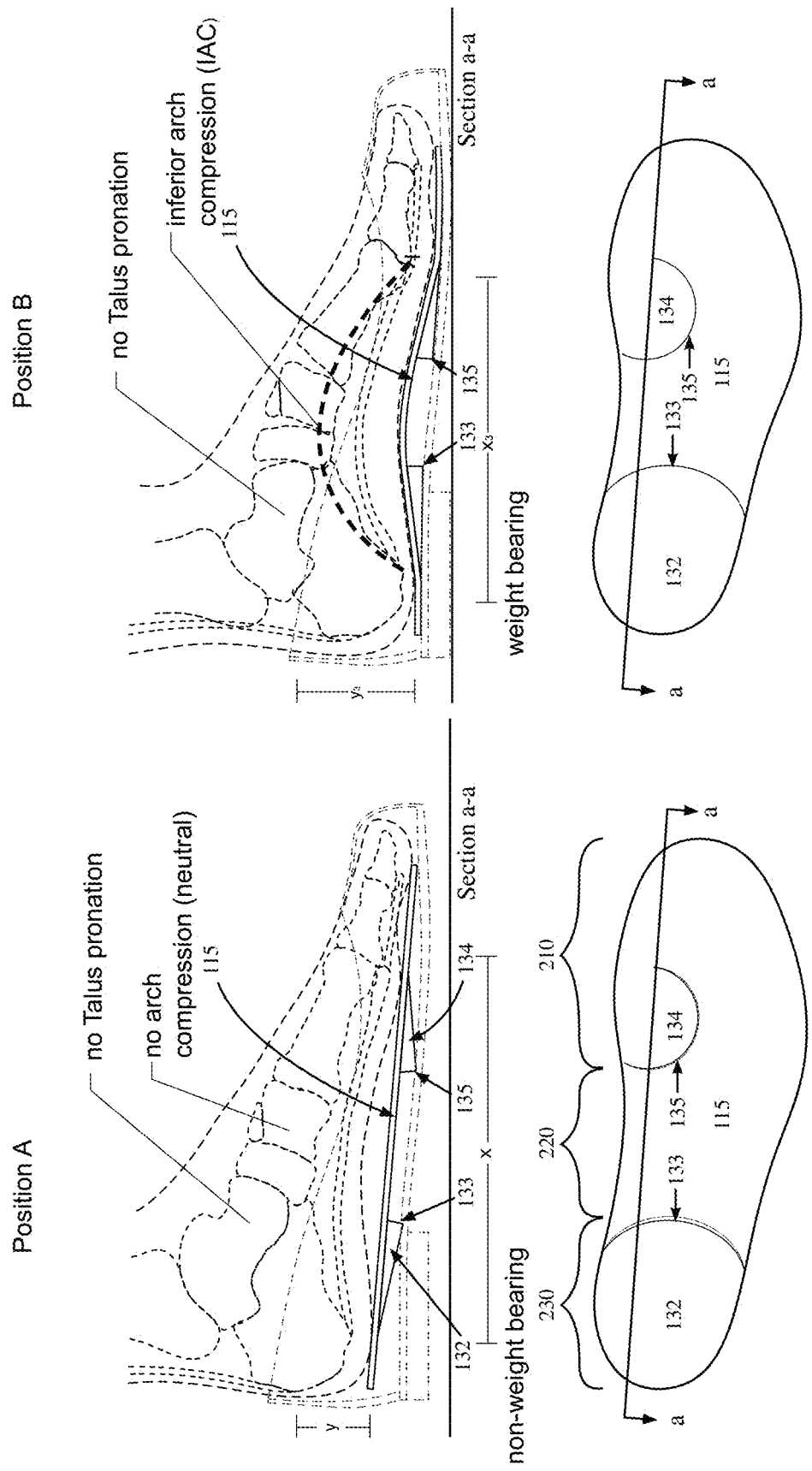
FIG. 4 shows an embodiment of the invention comprising a modified insole configured with the wedges allowing for the movement (dual rotation of the ends) of the insole within the footwear.

It is understood that the same dynamic arch effect can be achieved with a modified insole for footwear instead of the outsole. As shown in the embodiment in FIG. 4, the insole can be configured with the wedged like configuration allowing for the movement (rotation) of the front end section 210 and the back end section 230 of the insole within the footwear. The wedge shaped configuration on the underside of the insole 115 which is made of an elastic material allows the front end section 210 and the back end section 230 to rotate and slide causing the front end section 210 and back end section 230 of the insole 115 to flatten down against the midsole of the footwear. The middle section 220 of the insole bends/arches upward as shown in position B causing inferior arch compression of the user's foot and therefore a stable medial arch of the user.

Figure 5:
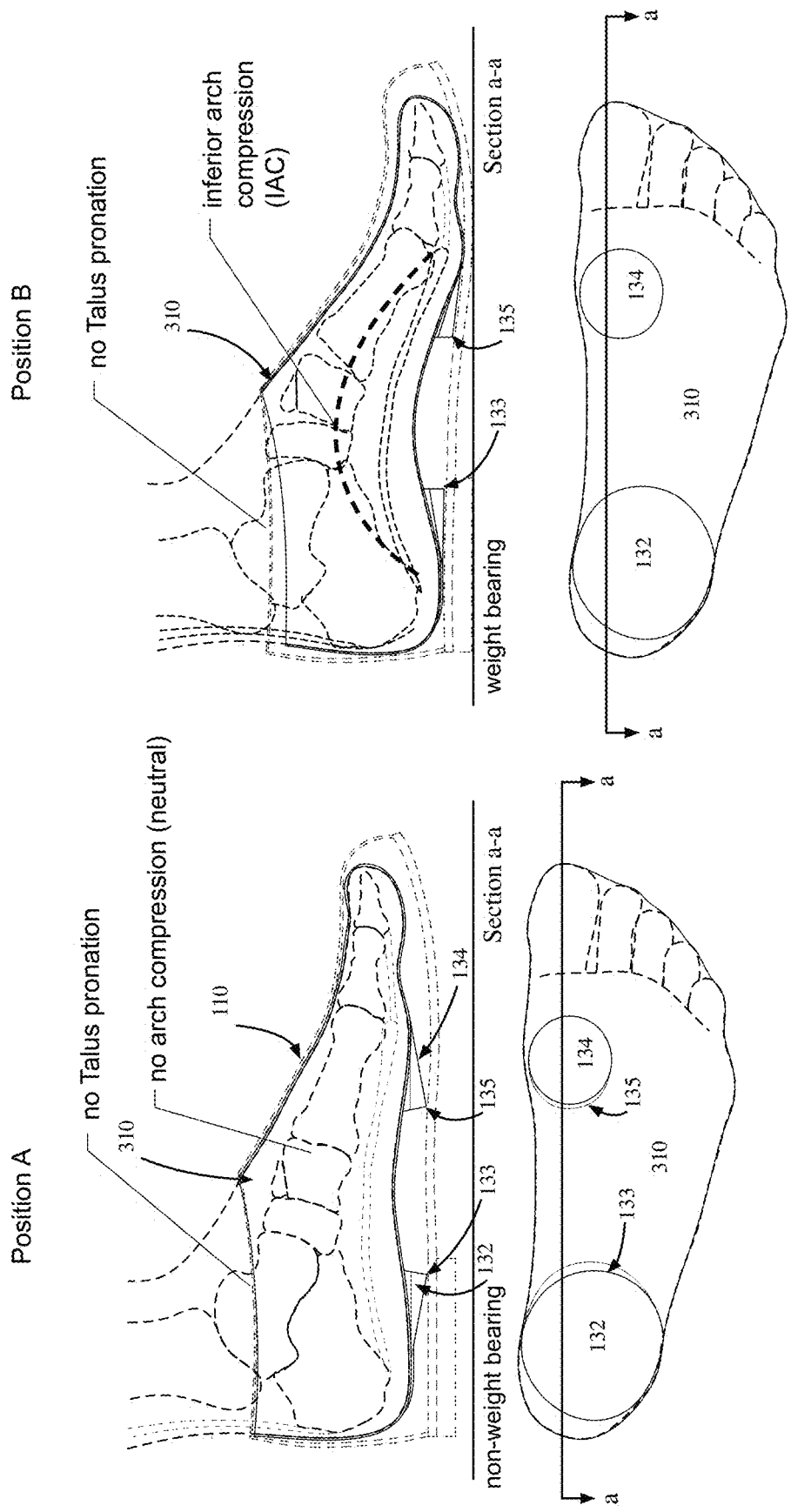
FIG. 5 shows an embodiment of the invention comprising a sock configured with wedges on the underside of the sock.

The present invention is not limited to just shoes and sneakers but also includes other forms of footwear including socks configured with wedges, pads that can be inserted into footwear or into socks, and adhesive pads that can be adhered to the user's skin. FIG. 5 shows an embodiment in a sock 310 form with wedges 132 and 134 on the underside of the sock 310. In Position A, in a non-weight bearing position, the places of contact 133 and 135 contact the inside of the shoe or sneaker with the front (at the toes) and back (at the heel) raised. When weight is applied down, as shown in position B, the front and back of the user's foot rotate about the places of contact 133 and 135 causing the user's foot to experience a modified windlass type effect without extension (dorsiflexion) of the toe and therefore relaxation rather than tightening of the plantar fascia. Splaying is counteracted as a result of the inferior compression of the user's foot along the medial arch.

Figure 6:
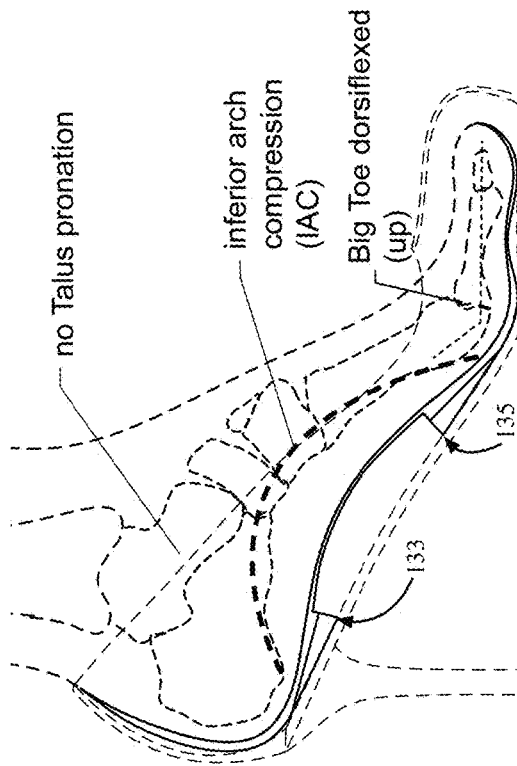
FIG. 6 shows an embodiment of the invention comprising wedge shaped pads that can be placed on the user's foot to cause the rotation of the front and back of the user's foot to create inferior compression of the foot causing a reduction in splaying.
Figure 6:
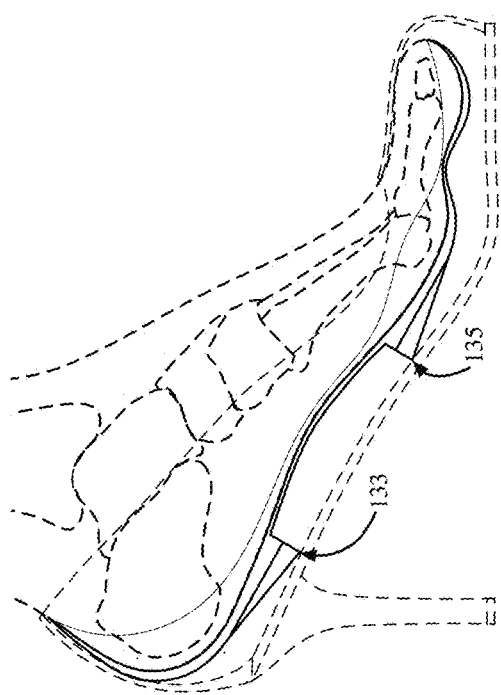
Figure 6:
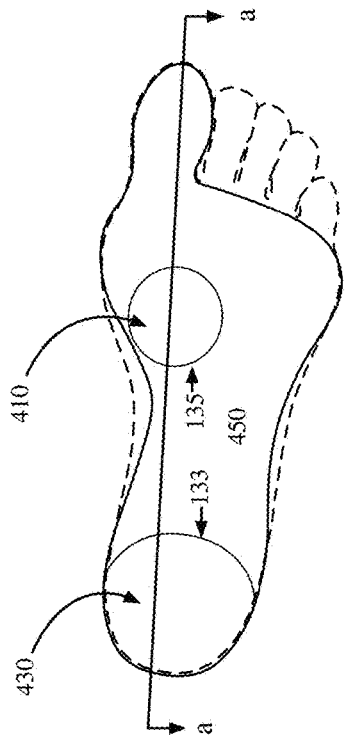
Figure 6:
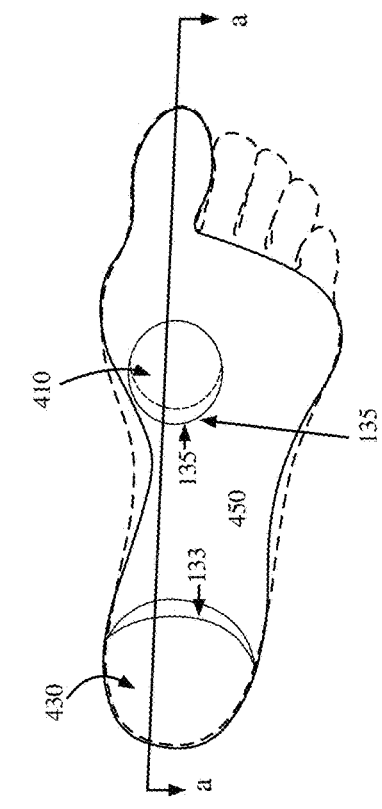

FIG. 6 shows an embodiment with wedge shaped pads 410 and 430 on an adhesive pad 450 that can be placed on the user's foot to cause the desired rotation of the front and back of the user's foot when weight is applied. When the user's foot is in Position B, a weight bearing position, in the high heel shoe, as shown in FIG. 6, the medial arch of the user's foot becomes rigid due to inferior compression causing a reduction in splaying as compared to Position B without any pads 410 and 430.

Figure 7A:
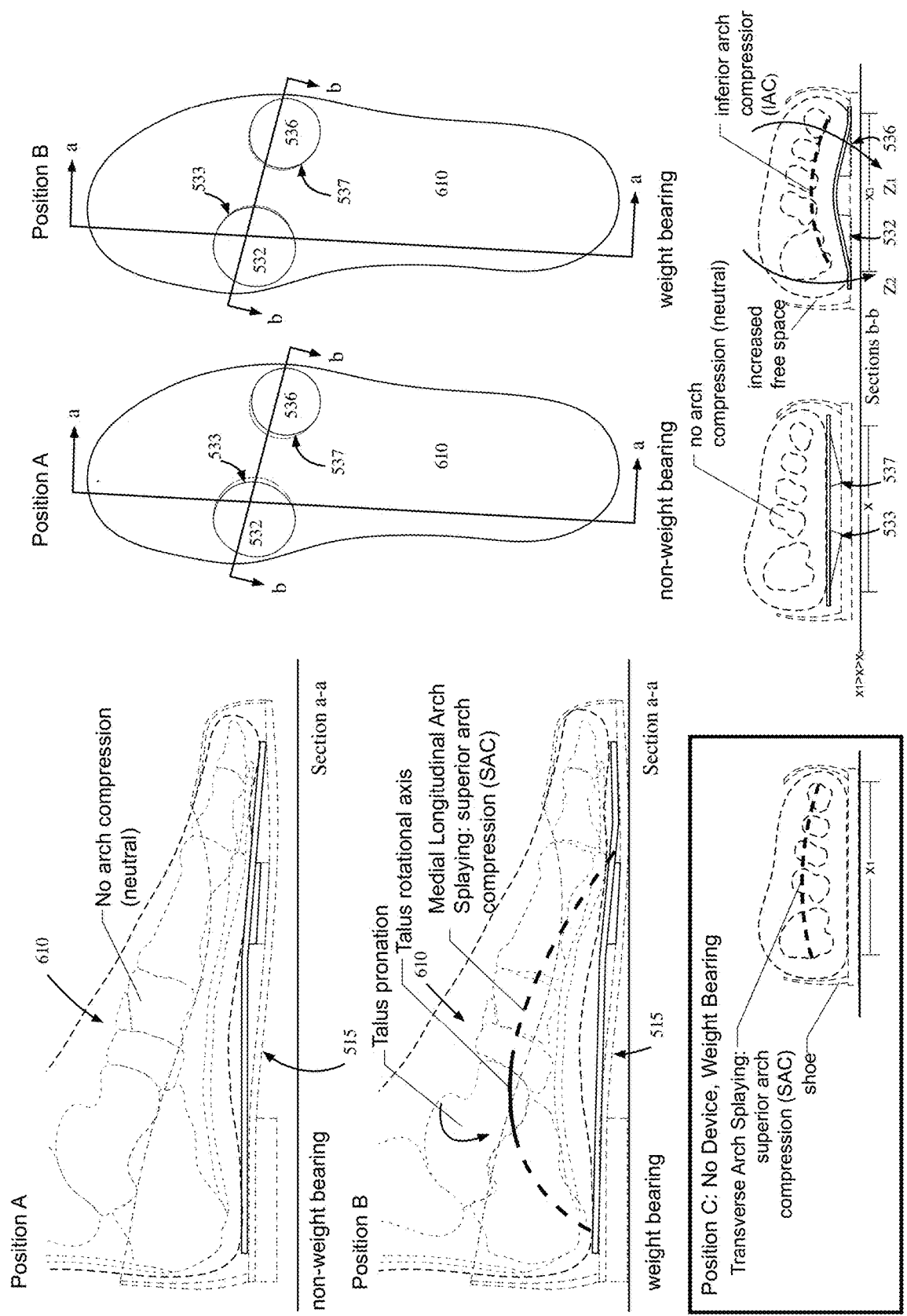
FIGS. 7A-7C show embodiments of footwear according to the invention comprising wedges positioned under the front end section (under the user's forefoot) to cause the user's foot to arch along the transverse arch when weight is applied thereby decreasing the length of the arch base.
Figure 7B:
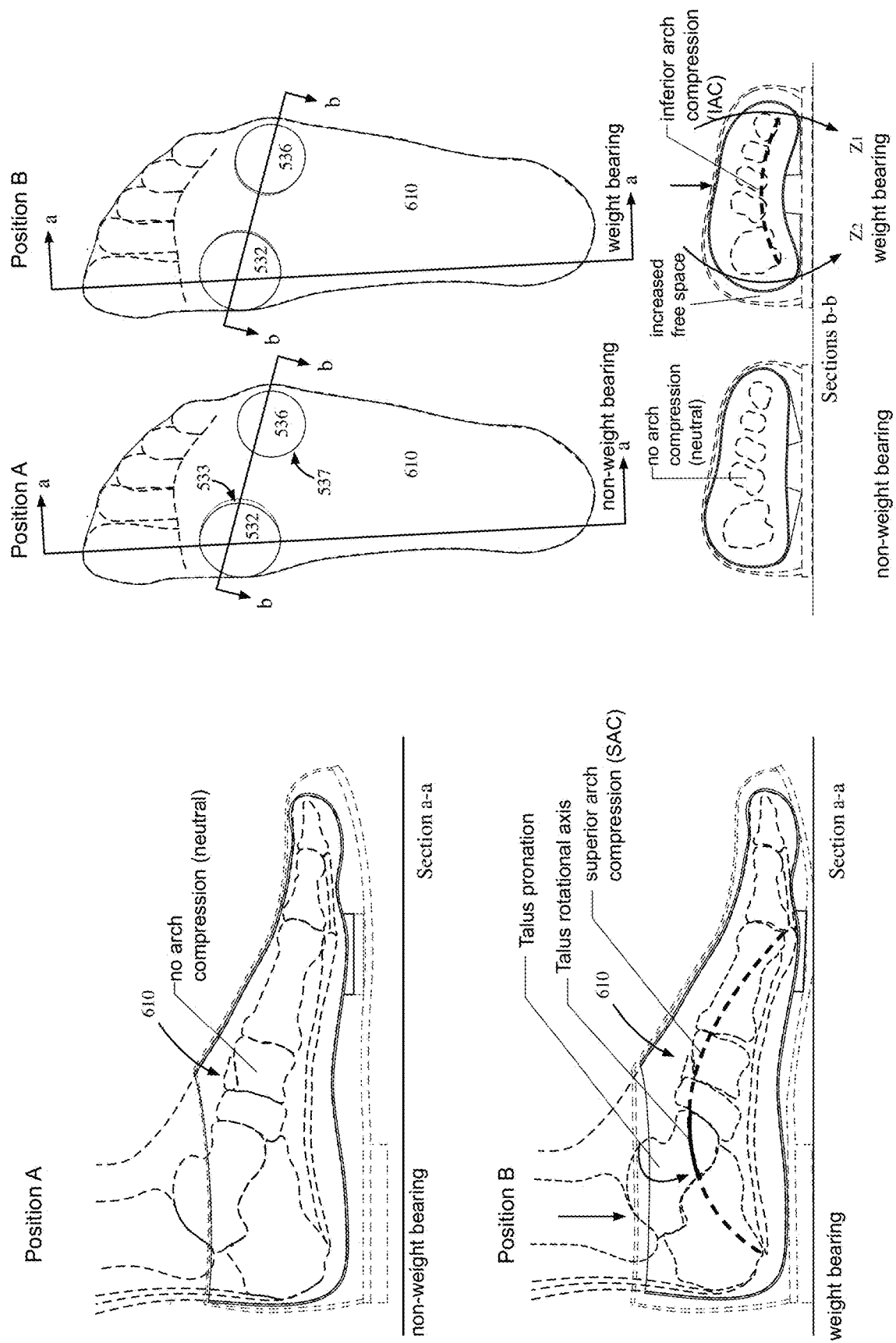
Figure 7C:
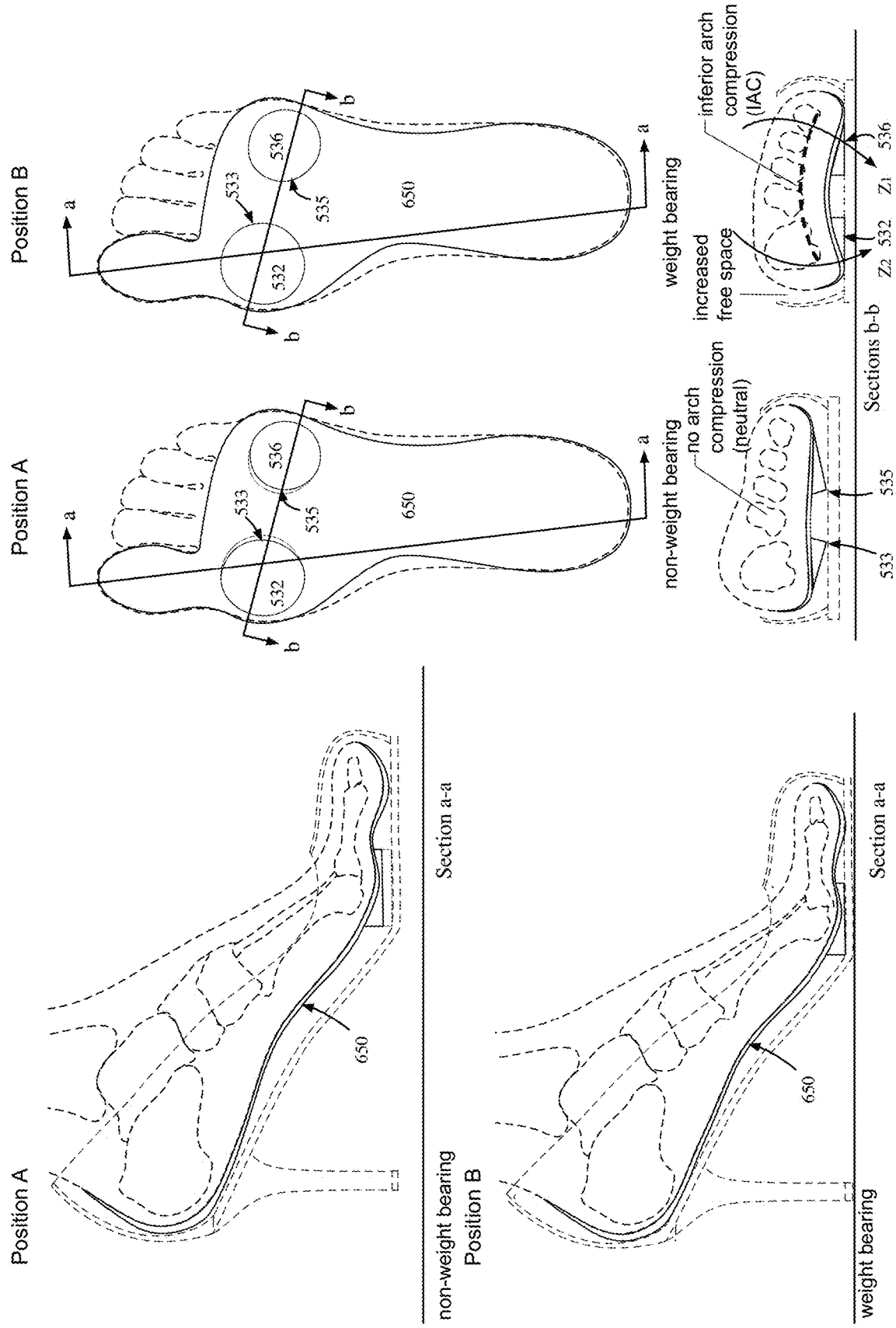

The invention also includes embodiments of footwear with wedge shaped pads positioned along the traverse arch of the user's foot. FIGS. 7A-7C show embodiments of footwear according to the invention with the wedge shaped components positioned under the user's forefoot to cause the user's foot to arch along the transverse arch when weight is applied decreasing the transverse arch base length rather than an increase with splaying.

FIG. 7A shows an embodiment in the form of an insole 515, FIG. 7B shows an embodiment in the form of a sock 610, and FIG. 7C shows an embodiment in the form of an adhesive pad 650 for the underside of the user's foot (in the form of a stick on pad that adheres to the foot). In each of the embodiments shown in FIGS. 7A-7C, the wedge like components 532 and 536 are positioned on opposing sides of the footwear (or foot) transversely in the forefoot sole region of the footwear (or on the foot). When weight is placed on the footwear, as shown in Position B, both the medial side and the lateral side of the footwear rotate around the places of contact 533 and 537 in directions $Z_2$ and $Z_1$ respectively. The direction of rotation of the medial side of the footwear is about opposite the direction of rotation of the lateral side of the footwear. The invention includes embodiments with some rotation for each the medial side and/or the lateral side also in the longitudinal direction.

The rotations of the footwear causes the sole of the user's foot (and the footwear between the places of contact 533 and 537, such as, for example, for the embodiments shown in FIG. 7A-7C) to arch raising the portion of the device (and the user's foot above) between the places of contact 533 and 537. Splaying is reduced along the transverse arch of the user's foot increasing comfort in the footwear.

Figure 8:
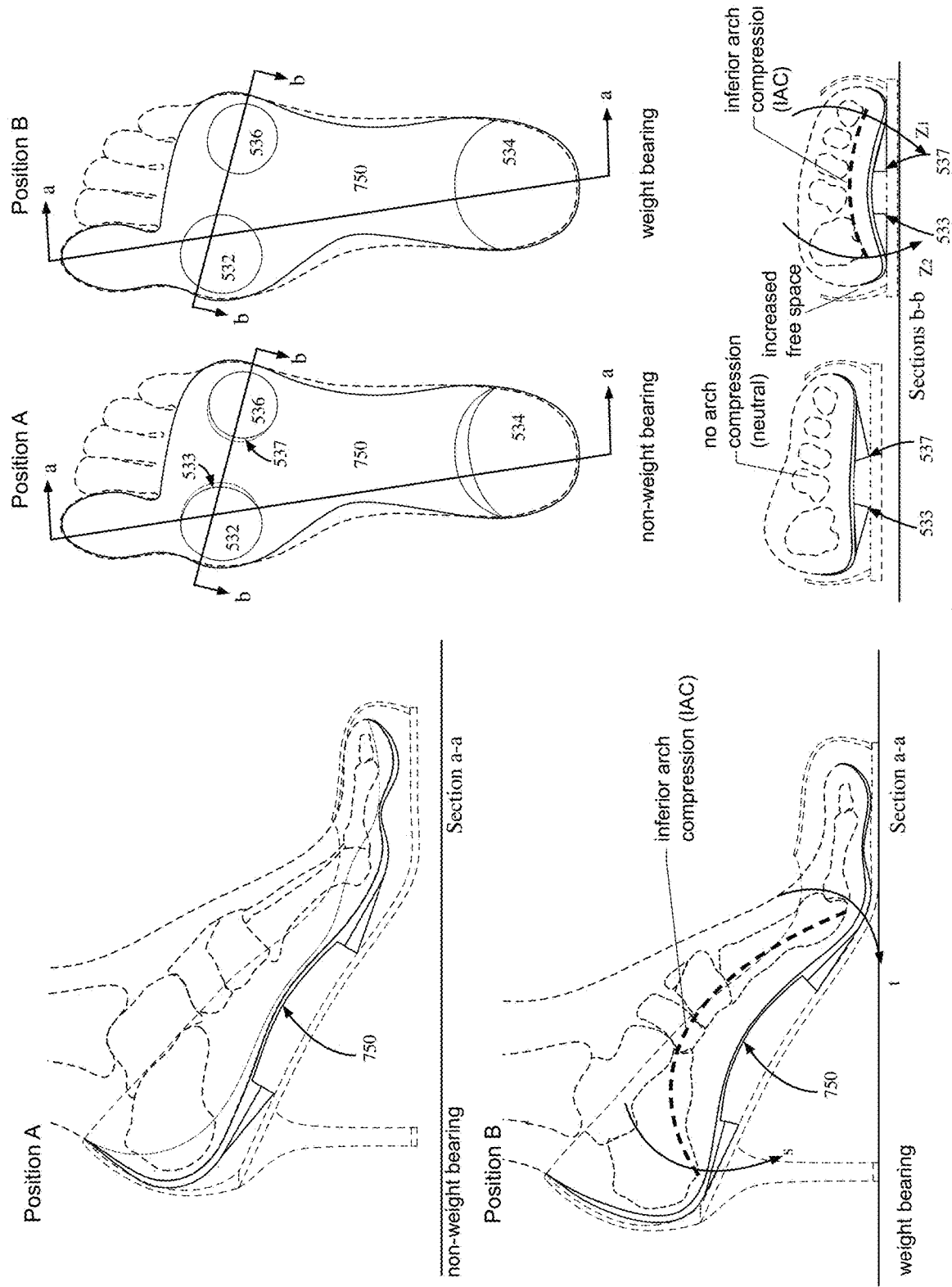
FIG. 8 shows an embodiment of the invention in the form of an adhesive foot cushion for the underside of the user's foot comprising three wedges to cause arching along all three arches, namely the medial arch, the lateral arch, and the transverse arch.

It is further understood that the invention is not limited to embodiments of footwear having the wedge shaped configuration along just one the medial arch, the lateral arch, or the transverse arch, but rather also includes combinations thereof. For example, FIG. 8 shows an embodiment of the invention in the form of an adhesive foot cushion for the underside of the user's foot comprising three wedge shaped areas that cause arching along all three arches of the user' foot, namely the medial arch, the lateral arch, and the transverse arch. A high heel shoe is shown in FIG. 8, it being understood that the invention is not limited to high heel shoes but rather includes all other forms of footwear.

The wedge like shaped part 532 and 536 of the foot cushion 750 are positioned on opposing sides of the footwear transversely in the forefoot sole region. When weight is placed on the footwear, as shown in Position B, both the medial side and the lateral side of the footwear rotate around the places of contact 533 and 537 in directions $Z_2$ and $Z_1$ respectively. The direction of rotation of the medial side of the footwear $Z_2$ is about opposite the direction of rotation of the lateral side of the footwear $Z_1$. This embodiment also includes the ability for the cushion 750 to rotate at each the medial side and/or the lateral side in the longitudinal direction. The rotations of the footwear causes the sole of the user's foot (and the footwear where there a part of the footwear between the places of contact 533 and 537) to arch raising the portion of the device (the user's foot above) between the places of contact 533 and 537. Splaying is reduced along the transverse arch of the user's foot increasing comfort in the footwear.

In combination with the wedge shaped configuration 534 located at the back end of the footwear, the wedge like configurations 532 and 536 on the underside of the footwear cause bending/arching along the medial arch and the lateral arch of the user when weight is applied as shown in position B. With the invention, arch splaying is eliminated as a result of the inferior compression of the user's foot along the medial arch, the lateral arch, and the transverse arch.

FIGS. 13-16 show how one embodiment of the invention works, the embodiment according to FIG. 3A with the wedges on the outsole along the medial arch, during the various stages of the Gait cycle.

Figure 9:
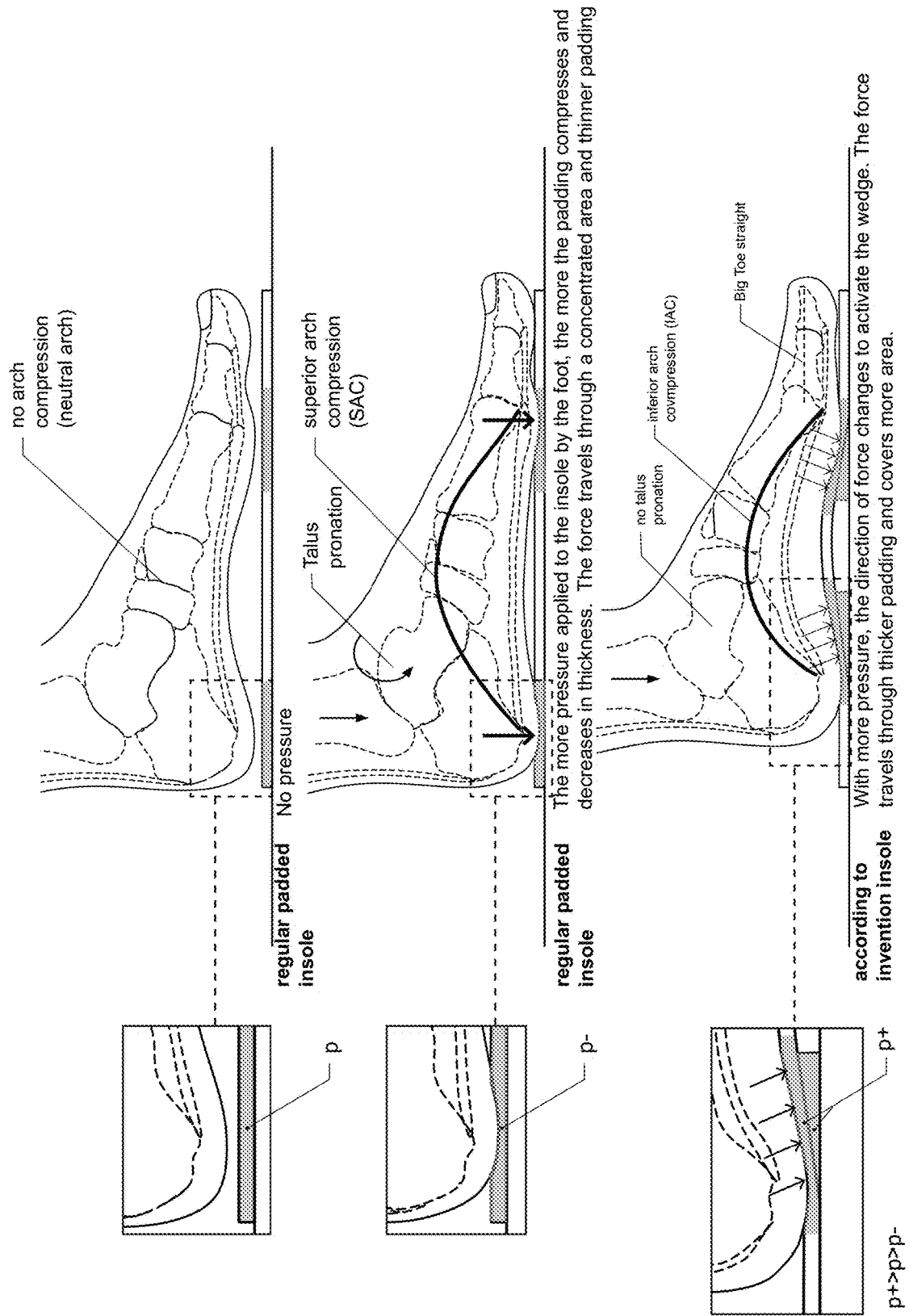
FIG. 9 includes schematics to show the benefit of the invention on foot padding.

FIG. 9 includes schematics to show the benefit of the invention on foot padding. FIG. 9 shows the human foot and the contact locations for the foot along the longitudinal direction when weight is applied on a flat surface. The padding beneath the foot is compressed at the points of contact and the more pressure applied to the insole, the more the padding compresses and decreases in thickness. The forces are concentrated at the points of contact. On the other hand, when using the invention, the weight forces are redirected and distributed over a larger area causing less compression transversing a thicker padding under the user's foot. As shown in FIG. 9, the invention helps to reduce the amount of the foot's plantar thinning of skin and natural soft tissue padding under pressure. The decreased foots soft tissue natural padding thinning preserves its inherent hydraulic for dissipation properties. Hydraulic force dissipation is a major shock absorption mechanism: ground force shock dissipation occurs in a biological system when the foot "shock absorption" mechanism of arch deformation is supplemented by force dissipation within muscles and other soft tissues of the foot and leg acting as a fluid envelope surrounding bone. Without this hydraulic force dissipation complex bones can break easily. Tired muscle loses its hydraulic properties which can lead to stress fractures.

The size, shape and physical dimensions of the human foot vary from one person to another. Accordingly, there is no single distance between the wedge shaped portions of the footwear according to the invention that works effectively for everyone. The invention thus includes footwear with spacing between the wedge shaped portions (and the places of contact) other than just for the embodiments shown in the figures and herein disclosed.

Accordingly, the invention also includes the process for measuring the bottom of one's foot and/or using molds or other similar methods to measure the bottom of a foot to determine the placement/location of wedge shaped portions (and places of contact) on footwear for the purpose of fabricating footwear according to the invention. Preferably, the places of contact for opposing wedges would be positioned inside the points of contact for the foot on either side of the medial arch, the lateral arch or the transverse arch. The process for making a sock, an insole, an outsole, an orthotic insert, and the like according to such process is part of the invention.

The present invention is unique in that when the footwear is in the flat foot phase of the Gait cycle, once the stable arch is established in a state of inferior compression with a shorter base, adding further pressure does not cause a splaying of the arch. To the contrary, adding more pressure will stabilize the arch further since now the force vectors are inward at the base of the arch. The arch base will not increase in length once inferior arch compression is achieved. Inward directed force vectors are established and resist splaying distraction force vectors. The opposite happens. Increased forces on the arch reinforce and enhance inward directed force vectors and stabilize arch further. A windlass arch and a splaying arch are mutually exclusive. A person cannot have shorter and longer plantar fascia at the same time. A user cannot have lower and higher arch height at the same time.

Another benefit of the invention is the reduction in talus pronation. The conventional teaching is that talus pronation occurs at the flat foot phase of the Gait cycle to stabilize the medial longitudinal arch. Once the talus and therefore the hind-foot pronates the arch is stable. The clinical observation of a) talus pronation followed by b) rigid arch, are indisputable. Applicant has discovered, however, that talus pronation is not the cause for a rigid foot arch. Rather, a rigid foot arch is a consequence of the splaying of the foot at the flat foot phase due to weight pressure on the arch. Arch stability is brought about by superior arch compression, not pronation which is consequential reaction to weight forces bringing it and the calcaneus into stable positions.

It is a clinical fact that the talus pronates at the flat foot phase when the splaying mechanism is active, but does not pronate at a heel-off phase when the Windlass mechanisms is activated, and the medial longitudinal arches are rigid in both states. Arch rigidity at the flat-foot phase is brought about by the splaying mechanism which generates superior arch compression with talus pronation and the rigid arch at heel-off phase is brought about by the Windlass mechanism which generates inferior compression without talus pronation. It logically follows that when there is inferior compression, as with the Windlass Arch, something does not allow for talus pronation. Applicant has discovered that the sub-talar joint has a "locking" mechanism that is activated only in a state of inferior arch compression (e.g., during a Windlass state). In the flat foot Gait phase when the splaying mechanism is activated force vector goes through the longitudinal axis of the talus in effect "unlocking" the sub-talus joint and allowing for pronation around the SAC force axis. During the swing phase when there are no arch compressive forces, the sub-talus joint is free and loose and talus falls into its default position which is neutral.

Accordingly, the footwear according to the present invention has numerous advantages including the following:

1) it creates a dynamic arch support—the invention assists and enhances foot biomechanics by a timely adaptation of foot arches from a semi-rigid neutral arch to rigid arch state and vice versa exactly when needed during all walking and running phase, allowing rigid arches unique properties of force neutralization and "shock absorption". The inventions provides a dynamic arch support as opposed to a passive arch support.

2) it provides "shock absorption" by an alternative mechanism of a "compressed spring" like effect (rather than a "stretched spring" like effect which occurs during splaying) on foot arch under weight (load) at the flat foot phase walking and running gait, therefore acting as a "shock absorber" dissipating and blunting ground forces.

3) it provides force vector realignment. It manipulates foots arches structure in such a way that it changes direction of forces (vectors) acting on foots arches. It also redirects ground forces to foot arch from heel and forefoot, therefore increasing surface area and decreasing force per unit area.

4) it brings about potential energy (PE) storage within foot's arch by an alternative mechanism. PE is stored in the foot arch deformation. "Natural" foot by a "Stretching" spring action of the splaying arch superior arch compression, at the flat foot phase of walking and running, and according to the invention by a "Compressing" spring action of the Windlass like arch inferior arch compression.

5) it assists the foot and therefore body forward propulsion. When weight is withdrawn at heel off, the splaying arch of flat foot phase releases its stored PE. Arch base decreases and arch height increases. The arch reverts to its original "neutral" state and losses its superior arch compression. Kinetic Energy (KE) is dissipated in foot's horizontal plane. This energy is wasted without any beneficial effect toward forward propulsion since force vectors at arch base are inward. In contrast inferior arch compression in the Windlass like arch according to the invention aid forward propulsion. On weight withdrawal at heel off, when the posterior wedge is released and anterior wedge is still grounded, the PE stored in arch (inferior arch compression) (or rod) is instantly released as KE whose vector forces the heel up, assisting propulsion.

6) with increased pressure, the invention increases padding. With regular shoes, higher the pressure causes thinning of foot cushioning. With the invention, force vectors are redirected in such a way that with increase pressure (force) there is an increase in the thickness and surface area the force has to go through.

7) for the invention with a rod, the rod provides an added advantage of additional energy storage in the rod. When the wedges are connected by some means (metal, rubber, magnetic, etc.), the rod stores potential energy in the rod. Deformation is in addition to the stored energy in foot's arch deformation. This stored Potential Energy can be harness toward more powerful forward propulsion or captures (ex: battery). Opposing force Magnets (+,+) can act as a Virtual Rod storing PE.

8) the invention relaxes the Plantar Fascia (9B). With the invention, the Windlass like arch at flat foot phase of walking and running the base of the Medial longitudinal arch decreases (therefore relaxing Plantar Fascia as opposed to Splaying of the foot at the FF Phase in "Natural" foot at the FF Phase where the Plantar Fascia (PF) is stretched). In contrast, a passive arch support "kinks" the plantar fascia in a manner of passively pushing up on a bowstring, especially when the Windlass effect tightens it. This is a causes of pain and discomfort.

9) it causes a "SkinnyFoot" effect. With the invention, when weight is applied, the Windlass like arch shortens the base of the arches of the foot in flat foot phase, therefore allowing for narrower, slimmer, coronal (transverse), and/or sagital (front to back), area with increased load. This essentially brings about a smaller foot profile exactly when needed at the flat foot and the push-off phases of walking and running, and allows for tighter, slimmer, shoes ("Skinny Foot"). As opposed to normal splaying of the arches under load, which causes a larger foot profile and therefore tighter shoes.

10) it eliminates the need for passive arch supports. Passive arch supports are problematic. With the invention, there is no physical contact and therefore pressure on foot's arch concavity while it provides a timely dynamic arch support exactly when needed in the Gait cycle. Passive arch support provides a filler of arch concavity; it functions as an arch stabilizes during weight bearing at the flat-foot phase of walking and running. Keeping the arch structure passively stable but NOT rigid (it remains Semi-Rigid) hinders "normal" foots biomechanics of arches splaying, its transformation from a semi-rigid to a rigid arch, which would have facilitated rigid arch unique property of neutralizing opposing ground force. Since ground forces dissipate through the passive arch support, arch plasticity is restricted and fluctuation hindered, there are no arch compressive forces either inferior (concave) or superior (convex) which would have formed a distinct rigid arch, therefore foot arch cannot exhibit solid arches force neutralizing properties and Shock absorption is diminished. Passive arch supports also have a long term deleterious effect on the foot; they passively holds the foot as if in a cast, osteoporosis, muscle and ligaments atrophy sets in, with loss of the "rubbery glue" which keeps foot arch internal integrity. Subsequently, on bare foot walking without the PAS, the foot "Hyper-Splays" usually without achieving arch rigidity (Flat Foot) and is weak and unstable. Passive arch support "Kinks" plantar fascia passively, pushing up on the bowstring plantar fascia, especially, when the tight due to the Windlass. This causes pain and discomfort. Passive arch support press on the stretched plantar fascia during flat-foot and Windlass at push-off therefore cause "Kinky" Plantar Fascia which can cause pain.

11) it provides for a functional restoration of foot arch in pathologic states and diseases.
  a. Dropped Arch—Elevate a Supple Dropped Arch and restores its functional rigidity and 'Shock absorption" capacity exactly when needed in the gait cycle.
  b. Heel Spur—Relax Plantar Fascia therefore taking pressure off heel spurs.
  c. Plantar Fasciitis—Relaxes Plantar Fascia therefore relieving tension and pressure.
  d. Morton's Neuroma—Decreases pressure on Morton's Neuroma by rounding Transverse Arch and increased shoe space via the "Skinny Foot" effect.
  e. Calluses—Force vector shift allows for redistribution of pressure points with increase padding on increase pressure and increase surface area at pressure points therefore decreases pressure point irritation and reactive callus formation.
  f. Bunions—Force vector shift allows for redistribution of pressure points with increase padding on increase pressure and increase surface area. Transverse Arch rounding and "Skinny Foot" effect also relieve pressure off the bunions (1st Metatarsal and 5th Metatarsal-Taylor).
  g. Hallux Rigidus and Arthritis MP joint Big Toe—Relaxes plantar Fascia and shifts pressure to the arch from metatarsal head therefore decreasing pressure and pull on the MP joint.

12) it helps a diabetic foot. Naturopathic foot-force vector shift causes redistribution of pressure points with increase padding on increase pressure, it redirects pressure from forefoot to dynamic arch support wedges and foot arches with increase surface area and allows Transverse and Lateral Arches rounding facilitating the "Skinny Foot" effect. These factors dissipate ground forces, distribute pressure points over a greater area and decrease foot functional volume in a shoe therefore lower or eliminate Pressure Ulcers.

13) it prevents osteoporosis—Oscillate created by the ground-reaction forces, "vibrates" foot, leg, pelvis and spine bones, stimulating them to increase in density. In addition, active muscular contraction in conjunction with passive ligaments stretching and shrinking, adds to these stimulus effects during walking, running and exercising. By contrast the impact blunting, shock absorbing shoe soles in "Regular" shoes and sneakers are "anti-vibration" denying increase bone density stimulus.

14) it avoids fluctuation and therefore conserves energy and increase power-Windlass like inferior arch compression is in effect in both the flat-foot phase (dynamic arch support mechanism) and push-off phase (Windlass mechanism) this allows for foot and leg muscle to rest conserve energy for an improved more efficient and powerful walking and running. In contrast during "Natural" walking and running fluctuation from superior arch compression at the flat-foot phase (Splaying mechanism) to inferior arch compression at push-off phase (Windlass mechanism) occurs. This Fluctuation mechanism requires energy, tires foot and leg muscles and accounts for a less efficient and less powerful walking and running.

15) it creates a Windlass like inferior arch compression, "Locks" sub-talar joint therefore preventing pronation or supination (true also for the Windlass Mechanism). The invention's inferior arch compression (similar to Windlass inferior Arch compression) "Locks" sub-talar joint while forming a rigid arch which does not allow for pronation (P), or supination (S) of hind foot relatively to fore-foot. Proof of this phenomena is clinical observation of the Windlass Mechanism during toe off and push-off phases whereas a rigid longitudinal arch with inferior compression forces is formed with the hind-foot and fore-foot in a solid "Neural" alignment without any pronation or supination.

16) it corrects foot pronation and supination anomalies and Pathology. Under load at the flat-foot phase the invention causes inferior arch compression, "locks" sub-talar joint in "Neutral" preventing and therefore correcting pathological dynamic pronation or supination.

17) it diverges plantar directed forces medially, toward big toe, achieving mechanical advantage by a longer lever arm at push off and toe off phases. Under load at flat foot phase in "Natural" gait pressure is distributed throughout the foot but mainly concentrated on the splayed medial, lateral and transverse arches. At toe off and push off forces are concentrated toward fore-foot and especially metatarsal heads. Diversion of force vectors toward medial longitudinal arch and 1st metatarsal brings about a longer lever with a mechanical advantage during walking and running.

18) it prevents heel valgus—Under load at the flat-foot phase the sub-talar joint is locked which not only prevents pronation but also heel valgus.

19) it prevents knee valgus and external rotation, therefore protecting knee from injuries. Since under load at flat foot phase the Windlass like mechanism with its inferior arch compression, "locks" sub-talar joint, prevents pronation and heel vagus, the compensatory knee valgus and external rotation does not come about. With the leg in "Neutral" the cruciates are "wound-in" and knee tight.

20) it brings about earlier "Locking" of Ankle. By preventing talus pronation and inferior arch compression shorting and "Rounding" medial longitudinal arch during flat-foot brings about earlier presentation of talus dome wider anterior articulate surface and therefore a stable ankle joint.

21) the invention can compensate for knee weakness. Earlier ankle locking allows for earlier full extension and passive locking of knee at heel strike which can compensating for knee weakness due quadriceps muscle atrophy.

22) it brings about a more efficient muscular Dynamic. Consistency of dynamic arch support and Windlass inferior arch compression, "locked" sub-talar joint. Elimination of talus pronation, and the increase in foot lever length in addition to the ankle earlier "locking" make for a stable more dynamically and efficient lower extremity therefore muscle tier less and can go a longer distance.

23) conserves legs Hydraulics and prevents stress fractures: Preservation of foot's plantar soft tissue integrity keeps its hydraulic protection in addition to its spring like effect of "shock absorption" of foots arch. Ground force shock dissipation occurred in a biological system when foot "shock absorption" mechanism of arch deformation is supplemented by force dissipation within muscles and other soft tissues of the foot and leg acting as a fluid envelope surrounding bone. Without this hydraulic force dissipation complex bones can breaks easily. Tired muscle looses their hydraulic properties which can lead to stress fractures.

Figure 18A:
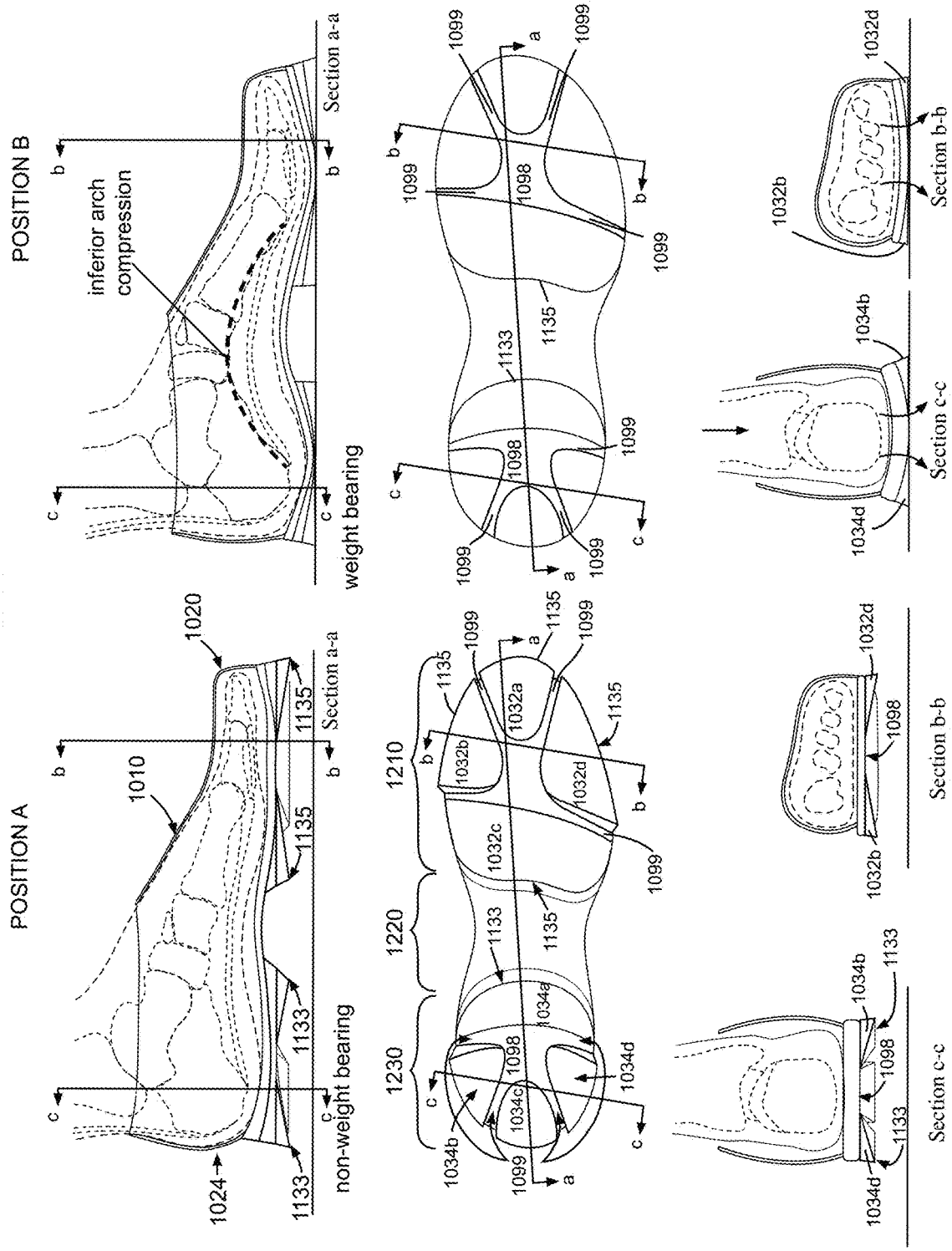
FIGS. 18A-18D show several embodiments of the invention in the form of a shoe or sneaker comprising a modified sole.
Figure 18B:
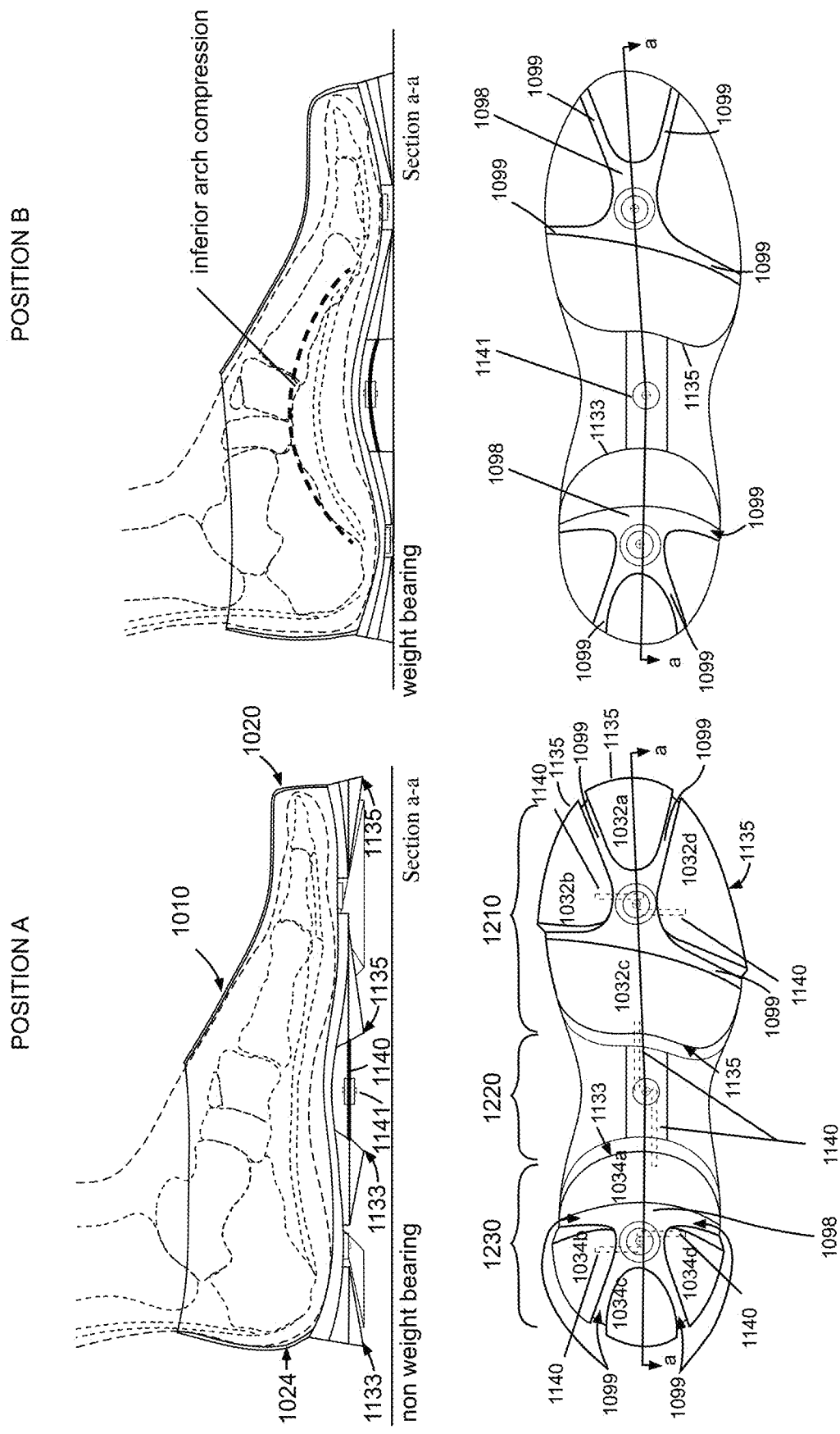

Another embodiment of the invention is disclosed in FIGS. 18A and 18B where the underside of the outsole in the front end section and/or the back end section of the footwear is concave in at least one of the longitudinal direction and the transverse direction when in a non-weight bearing position. When concave shaped in both the longitudinal direction and the transverse direction the underside of the front end section (and/or the back end section) slopes upwards around its perimeter towards an inner area within the front end section (and/or back end section) creating an about central indentation therein. The preferred location of the central indentations are under the locations where the weight of the foot (when the footwear is worn) make initial contact with the top of the insole—the contact location for the medial arch (see FIG. 3A). Preferably, there are a plurality of grooves on the underside of the outsole from the outer perimeter of the outsole to the inner area of the indentation creating segments. The resulting segments on the underside of the outsole formed between grooves bend and/or flatten when weight is applied to the footwear and the underside of the outsole at the indentations lower. The front end section and the back end section bend in opposite directions similar to the previous embodiments. Here, however, the additional segments in each section, particularly in the front and back of the footwear, limits the travel distance of the front and back of the footwear. The travel distance is limited to the height of the indentation above the respective point of contact in the front end section and the back end section. Accordingly, while this embodiment of the invention can have a generally convex shape in the longitudinal direction from the front to the back of the footwear, this embodiment does not need to be generally convex. Rather, as shown in FIGS. 18A-B, the lowest points on the underside of the outsole in a side view can be about flat when in a non-weight bearing position.

The footwear according to this embodiment of the invention creates a cushioning effect in the footwear. The kinetic energy in the movement of the outsole is converted into potential energy which is stored within the outsole due to the elastic materials of construction. When the weight is removed from the outsole, the elasticity of the outsole in the front end section and/or the back end section has a "spring-like" effect releasing the potential energy helping to propel the user.

Figure 17:
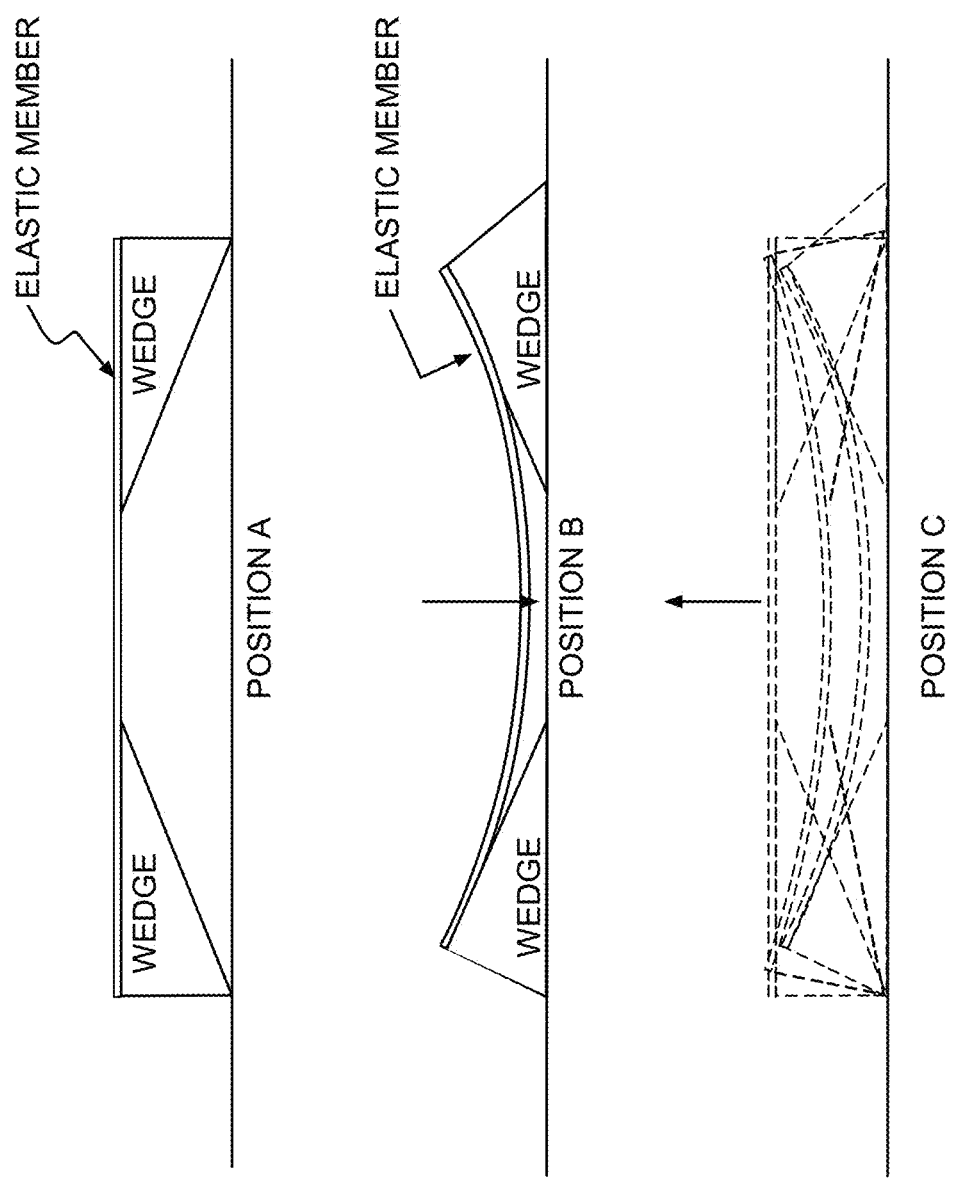
FIG. 17 shows the theory behind the embodiments of the invention with a concave shaped front end section and back end section.

FIG. 17 shows the theory behind the use of a concave shaped front end section and/or back end section and the use of an elastic member to create force. FIG. 17 shows opposing wedge-like elements with a flexible and elastic member between and connecting them in three positions, Position A, Position B, and Position C which actually shows several positions between Position A and Position B. Position A shows the structure in a non-weight bearing position. When weight is applied to the elastic member between its ends, as shown in Position B, the downward force (e.g., the weight of an individual) causes the elastic member to bend and also causes the wedges to rotate. The physical properties of the elastic member causes resistance to the bending. As more force is applied downward, the elastic member bends more storing energy in the elastic member in the form of potential energy like a spring. The elastic member resists bending until it reaches a point of equalization with the downward force or when the bottom of the elastic member reaches the surface beneath it as shown in Position B. In Position B, the wedges have rotated to a position with the hypotenuse flat on the ground and the elastic member is contacting the ground. When the weight is then removed, as shown in Position C, the elastic member releases energy in the form of an upward force as it bends back towards its initial configuration (straight) and the wedges rotate back towards their initial position on a corner (or edge). The energy is released in a spring like fashion when the weight/force is removed assisting with propulsion and an upward vector force. A stable system is created when in Position B due to the flattening of the wedges.

When incorporated into the footwear according to the present invention, the weight of the user on the footwear is used for propulsion. The weight of the user creates the downward force in the footwear at the indentation(s) which is stored as potential energy in the outsole. As the user removes weight from the footwear (e.g., put more weight on the opposite foot) the potential energy releases in the same direction the foot is traveling thereby propelling the user's foot.

FIGS. 18A and 18B show embodiments of the invention according to the theory shown in FIG. 17 comprising a front end section 1210, a middle section 1220, and a back end section 1230. Both the front end section 1210 and the back end section 1230 include a plurality of segments 1032*a-d* and 1034*a-d* separated by grooves/indentations 1099 formed between a) the outer perimeter of the underside of the outsole in the front end section and back end section, and b) an inner indentation area 1098. Each segment 1032*a-d* and 1034*a-d* includes a sloped underside, sloped upwards from the outer perimeter towards the indentation 1098. Preferably, indentations 1098 in each the front end section 1210 and the back end section 1230 are located near the center (about central) of those sections. The footwear has places of contact for the outsole on the surface it is placed on the front end section 1210 of the outsole and the back end section 1230 of the outsole identified by 1135 and 1133 respectively. The footwear is configured such that when worn and weight is placed down onto the footwear and the outsole, the outsole bends about the places of contact causing the indentations 1098 to lower and the outsole of the footwear to flatten in the front end section 1210 and the back end section 1230. The segments 1032*a-d* and 1034*a-d* each rotate causing the indentation(s) 1098 to move downward (lower) thereby storing potential energy in the outsole. The footwear according to the invention preferably has no passive medial arch support that would otherwise limit the user's foot's ability to achieve inferior arch compression along the medial arch during a flat foot position.

FIGS. 18A and 18B show the footwear according to the invention on a user's foot (shown in dashed lines) in a non-weight bearing position A and in a weight bearing position B in each a cross sectional side view, a bottom plan view, a rear view and a front view. When weight is placed on the footwear, as shown in Position B, the sole bends with the segments 1032*a-d* and 1034*a-d* flattening and when enough force/weight is applied, the segments reach a point of stabilization where they cannot rotate any further—the portion of the outsole at the indentation 1098 reaches its lowest point close to contact with the surface beneath the footwear. Each of the segments 1032*a-d* and 1034*a-d* of the outsole rotate and the inner areas of the outsole by the indentations 1098 bend downward away from the upper. The materials of construction of the outsole allow for the bending with resistance absorbing energy in the outsole and reducing impact forces on the users foot and body. As weight is lifted off of the footwear, the outsole releases energy as the elastic properties cause it to bend back to its original position. The wedges 1032*c* and 1034*a* on the underside of the footwear cause bending/arching along the medial arch of the user when weight is applied as shown in Position B. Medial arch splaying is eliminated as a result of the inferior arch compression of the user's foot along the medial arch and the transverse arch.

In the embodiment of the invention shown in FIG. 18B, elastic members 1140 are shown in the outsole in each of the front end section 1210, the middle section 1220 and the back end section 1230. The invention includes embodiments with elastic members 1140 in one or more of the front end section 1210, the middle section 1220 and/or the back end section 1230. Also shown in FIG. 18B are adjustment knobs/tension dials 1141 which can be used to increase or decrease the resistance on the elastic members 1140 creating less or more cushioning effect and creating more or less propulsive force. The present invention includes embodiments with removable and replaceable elastic members 1140 to allow for customization of the desired characteristics of the footwear. While FIG. 18B shows elastic members 1140 in only one direction in each of the front end section 1210, the middle section 1220 and the back end section 1230 (e.g., longitudinally, transversely and longitudinally, respectively), the invention includes embodiments with a plurality of elastic members in more than one direction in one or more of the front end section 1210, the middle section 1220 and the back end section 1230.

The present invention is not limited to the wedge-like shaped segments shown in FIGS. 18A and 18B solely on an outsole. The present invention also includes an insole with the wedge-like shaped configuration as shown in FIG. 18C and an insole (and/or midsole) incorporated into footwear with the wedge-like configuration as shown in FIG. 18D.

Figure 18C:
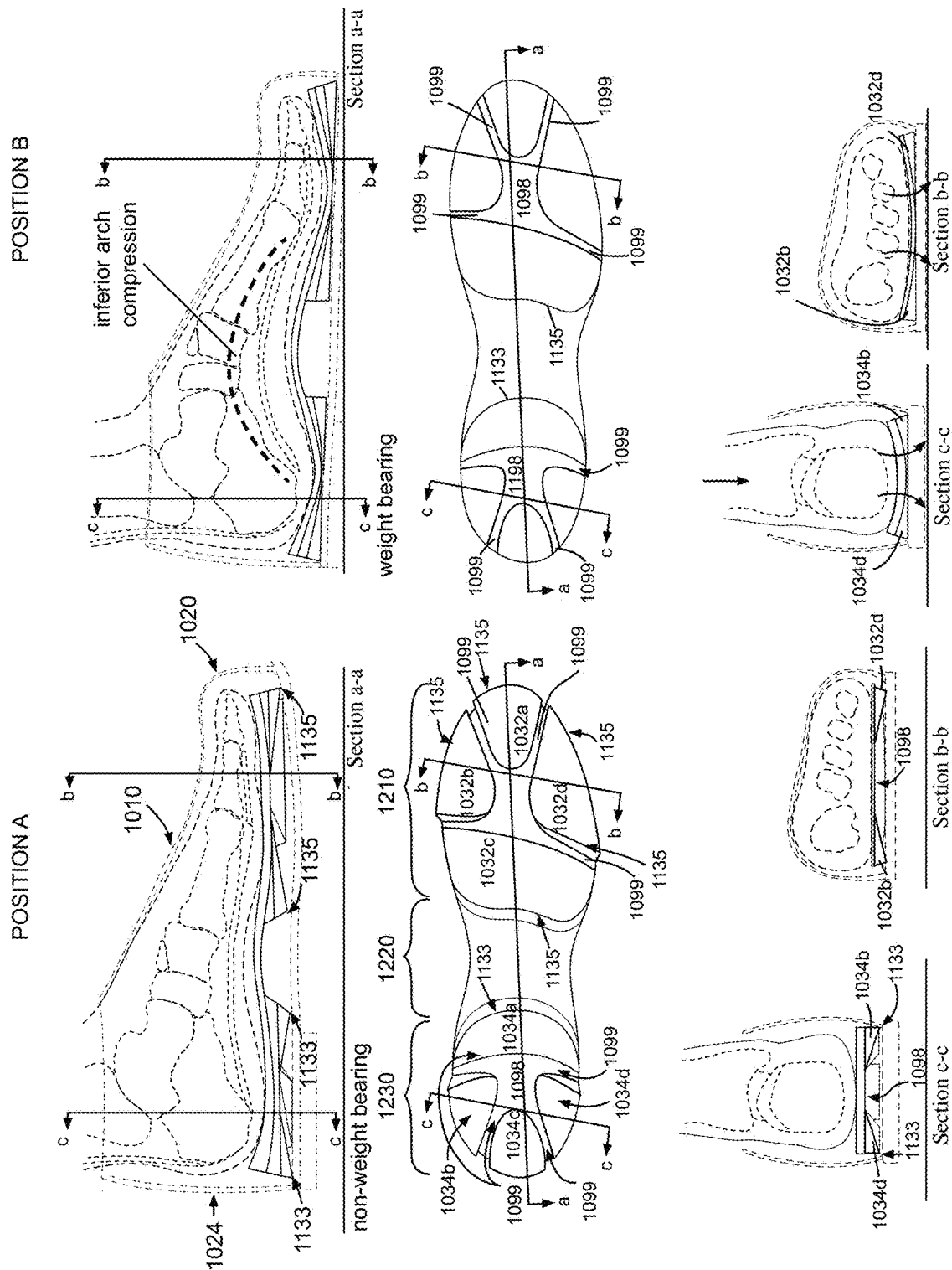

The embodiment shown in FIG. 18C is an insole comprising a front end section 1210, a middle section 1220, and a back end section 1230. Both the front end section 1210 and the back end section 1230 include a plurality of segments 1032*a-d* and 1034*a-d* separated by grooves/indentations 1099 formed between the outer perimeter of the underside of the insole and an inner indentation area 1098. Each segment 1032*a-d* and 1034*a-d* includes a sloped underside, sloped upwards (towards the upper) from the outer perimeter towards the indentation 1098. Preferably, indentation 1098 in each the front end section 1210 and the back end section 1230 are located near the center (about central) of the section. The underside of the insole in FIG. 18C has places of contact with the upper surface of the inside of the footwear (shown in dashed lines in FIG. 18C) on the front end section 1210 and the back end section 1230 identified by 1135 and 1133 respectively. When worn and when weight is placed down onto the insole inside footwear, the places of contact 1135 and 1133 slide on the inside surface of the footwear and the insole bends about the places of contact causing the front end section 1210 and the back end section 1230 to flatten as shown in Position B. Segments 1032*a-d* and 1034*a-d* each rotate causing the indentation(s) 1098 to move downward (lower toward the outsole of the footwear) thereby storing potential energy in the elastic components of the insole. Most preferably, the upper surface of the outsole and the underside of the segments segment 1032*a-d* and 1034*a-d* are both made from materials that allow the contacting surfaces to slide (glide) on each other, such as, for example, Teflon or other similar materials. The insole according to the invention preferably has no passive medial arch support that would otherwise limit the user's foot's ability to achieve inferior arch compression along the medial arch during a flat foot position.

Figure 18D:
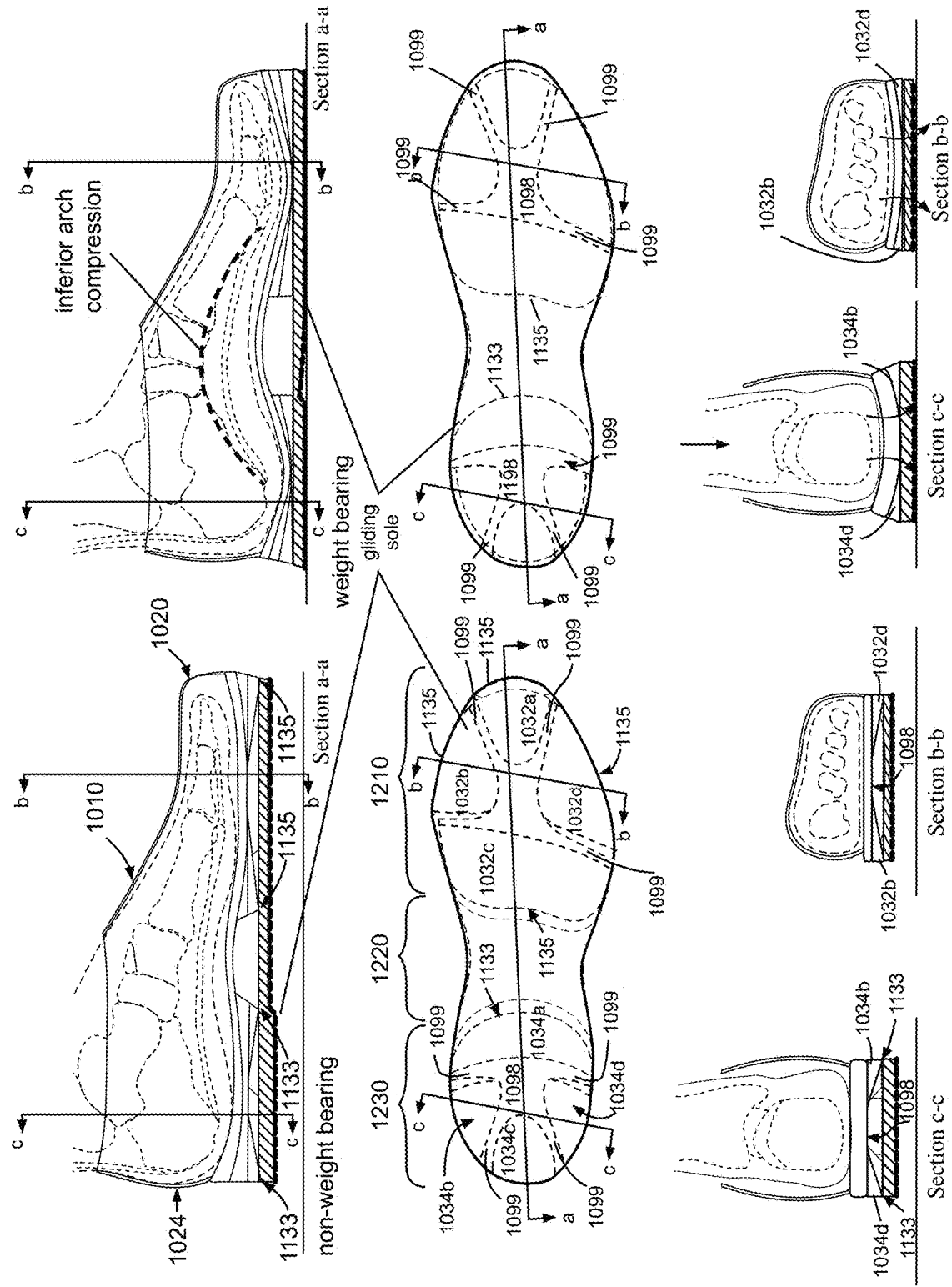

The embodiment shown in FIG. 18D is an insole (alternatively, it could be described as an insole and a midsole) forming an integral part of the footwear (as compared to the embodiment in FIG. 18C which is intended to be a removable and replaceable insole) comprising a front end section 1210, a middle section 1220, and a back end section 1230. Both the front end section 1210 and the back end section 1230 include a plurality of segments 1032*a-d* and 1034*a-d* separated by grooves/indentations 1099 formed between the outer perimeter of the underside of the segments and an inner indentation area 1098. Each segment 1032*a-d* and 1034*a-d* includes a sloped underside, sloped upwards (towards the upper surface of the insole) from the outer perimeter towards the indentation 1098. Preferably, indentation 1098 in each the front end section 1210 and the back end section 1230 are located near the center (about central) of the section. The underside of the insole in FIG. 18D has places of contact with the upper surface of the inside of the footwear (the portion of the sole shown in solids cross hatched lines in the sectional side view in FIG. 18D) on the front end section 1210 and the back end section 1230 identified by 1135 and 1133 respectively. When worn and when weight is placed down onto the insole inside footwear, the places of contact 1135 and 1133 in the midfoot sole region slide on the upper surface of the sole and the insole bends causing the front end section 1210 and the back end section 1230 to flatten as shown in Position B. Segments 1032*a-d* and 1034*a-d* each rotate causing the indentation(s) 1098 to move downward (lower toward the outsole of the footwear) thereby storing potential energy in the elastic components of the insole. Most preferably, the upper surface of the sole 1250 and the underside of the segments segment 1032*a-d* and 1034*a-d* are both made from materials that allow the contacting surfaces to slide (glide) on each other, such as, for example, Teflon, or other similar materials. The insole according to the invention preferably has no passive medial arch support that would otherwise limit the user's foot's ability to achieve inferior arch compression along the medial arch during a flat foot position.

Figure 19A:
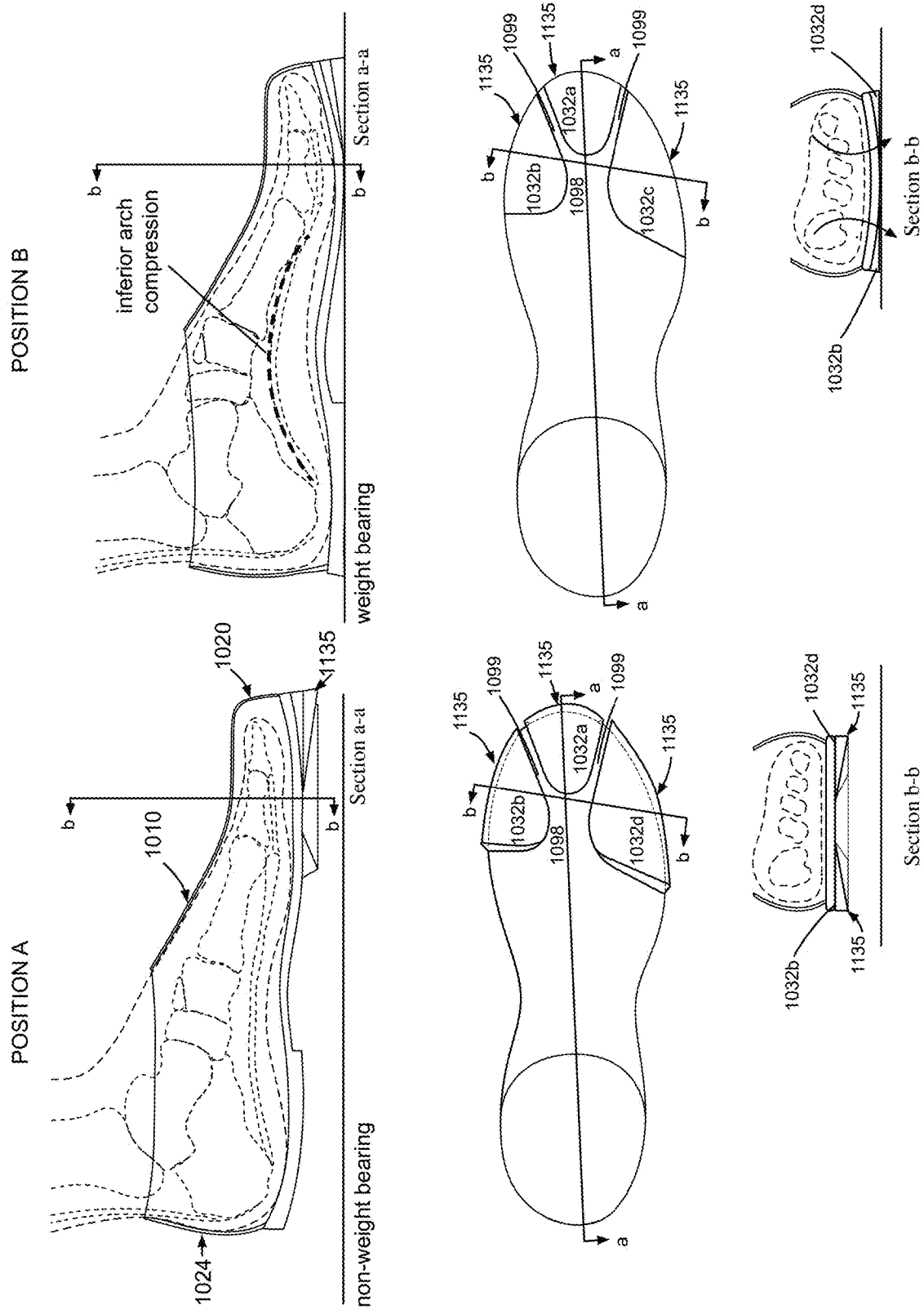
FIGS. 19A and 19B show embodiments of the invention in the form of a shoe or sneaker comprising a modified outsole.
Figure 19B:
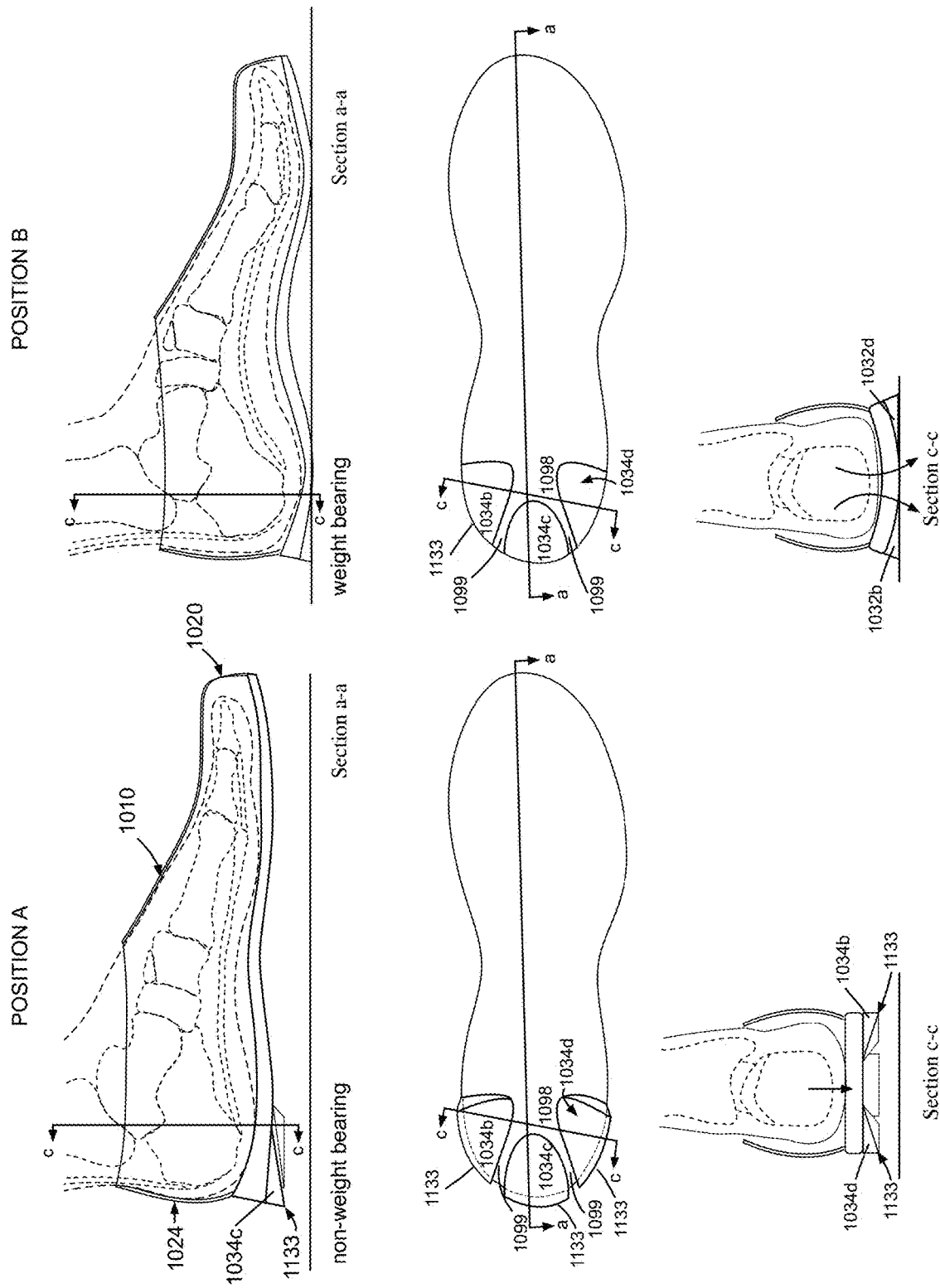
Figure 21A:
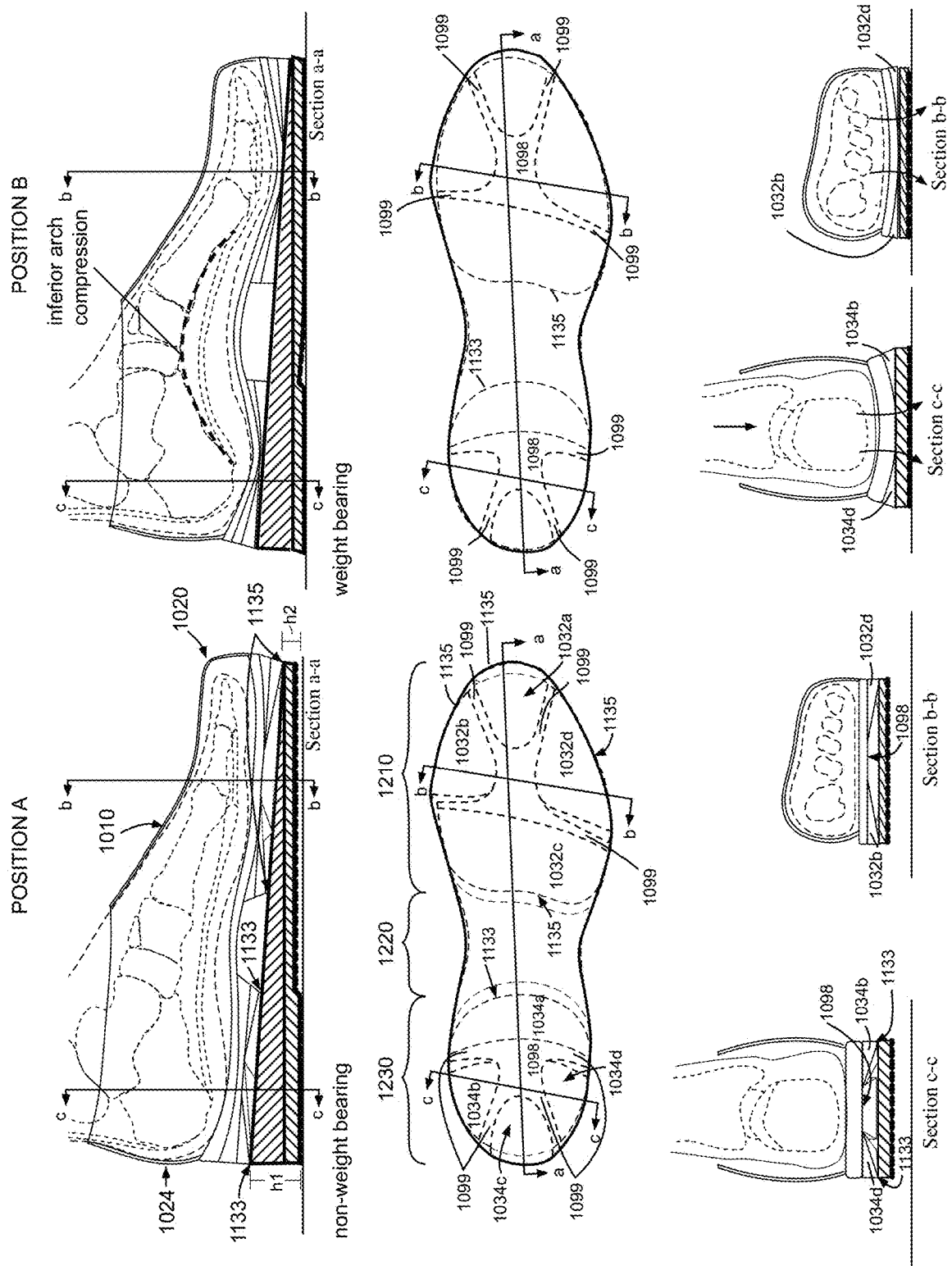
FIGS. 21A and 21B show an embodiment of footwear having sloped soles in the longitudinal direction creating a greater height for the user's heel than for the user's toes and vice versa. The footwear shown in FIG. 21A has a greater heel to toe height and the footwear shown in FIG. 21B has a lower heel to toe height.
Figure 21B:
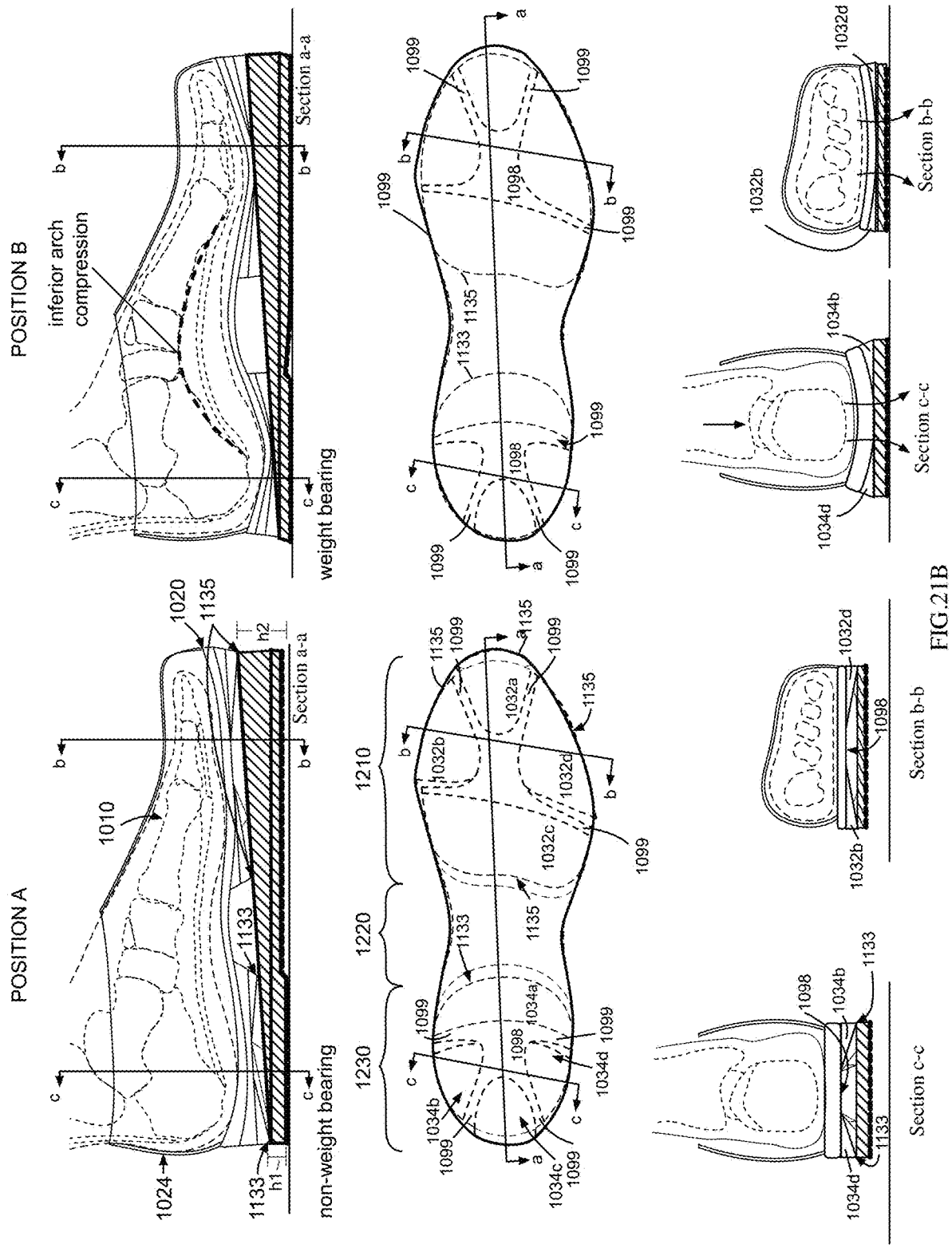

The present invention also includes the aforementioned structures incorporated into footwear having sloped soles in the longitudinal and/or lateral direction(s) as shown in FIGS. 21A and 21B. For example, as shown in FIGS. 21A and 21B, footwear having a high heel to toe height ratio ($h_1:h_2$) like the embodiment shown in FIG. 21A or a low heel to toe height ratio ($h_1:h_2$) like the embodiment shown in FIG. 21B The present invention is also not limited to embodiments of footwear with both the modified front end section 1210 and back end section 1230. The invention also includes embodiments with segments on just one of the front end section 1210 or the back end section 1230 as shown in FIGS. 19A and 19B. In such embodiments, the footwear can cushion and propel only in either the front of the footwear or the back of the footwear.

In FIG. 19A, a plurality of segments 1032*a*, 1032*b*, and 1032*d* are separated by grooves/indentations 1099 formed between the outer perimeter of the underside of the outsole and an inner indentation area 1098. Each segment 1032*a*, 1032*b*, and 1032*d* includes a sloped underside, sloped upwards from the outer perimeter towards the indentation 1098. The footwear has places of contact 1135 on the front end section 1210 of the outsole identified by the places the underside of the front end section 1210 contacts a flat surface on which it is placed. The footwear is configured such that when worn and weight is placed down onto the insole and the footwear, the sole bends about the places of contact 1135 causing the underside of the sole of the footwear to flatten in the front end section 1210. The segments 1032a, 1032b, and 1032d each rotate causing the indentation 1098 to move downward (lower) thereby storing potential energy in the sole. With the segments in a lowered/rotated/settled position, the footwear elevates the user's big toe and therefore allows for a tighter plantar fascia (which would have otherwise become looser by inferior medial arch compression) at the push-off and toe-off phases of the Gait cycle, therefore, enhancing the Windlass mechanism. The inside of the footwear (the upper side of the insole) becomes concave and contoured around the user's metatarsals.

The embodiment of the invention shown in FIG. 19B is similar to the one shown in FIG. 19A except the plurality of segments 1034b, 1034c and 1034d are located only on the back end section 1230 of the underside of the outsole instead of only the front end section.

Preferably, the segments on the outsole are made from a rubber material and the elastic members with adjustment knobs are made from a metallic or plastic material.

Accordingly, the footwear according to the present invention has numerous advantages including the following:

1. shock absorbent—spring-like effect. The heel, forefoot, sole, and arch. Storing potential energy (PE) generated by gravity (weight) and releasing it as kinetic energy (KE) at critical junction in the Gait Cycle, therefore, assisting forward propulsion.

2. Stabilizes foot's heel and forefoot—Segments (wedges) "cupping" around foot's heel and forefoot providing a buttress which anchors heel and forefoot, therefore, increasing stability. It also increases total shoe ground contact area, therefore, decreasing stress per unit area (more pressure more padding).

3. Corrects pathologic foot deformities such as heels Varus, Valgus deformity-by varying Medial and Lateral Wedge in Kinematics Heels and Kinematic Forefoot Sole or in the Gliding Sole.

4. Restores hydronic cushioning of foots heel and forefoot, by providing a solid envelop when "cupping" (hot-dog skin effect), therefore, decreasing stress concentration, therefore, preventing stress fractures.

5. Converting superior arch compression (SAC) to inferior arch compression (IAC) at the stance phase of the Gait cycle, therefore, eliminating talus pronation and heel values at the stance phase of the Gait Cycle while allowing for shock absorption and arch stability without a the need of a passive arch support.

6. Assisting forward propulsion at the heel-off phase of the Gait cycle through the upward "spring" like effect and IAC recoil action when stored gravitational potential energy (PE) is released as kinetic energy (KE) with forward force vectors.

7. Allowing stability and shock absorption if initial contact is "flat foot" rather than heel strike.

8. Customization of tibial ground angle (TGA) degrees through use of different sole heights in the back of the footwear (posterior sole "wedging") brings about increased posterior tibia displacement in a rigid sole footwear. As posterior wedge angle increases, TGA at Heel Off (HO) decreases, while AJA remains constant (essentially tibia gets closer to ground at HO). This brings about a sharper TGA (less degrees) at HO and therefore longer excursion (time, distance) between HO and PO when AJA is 90 degrees (ex: 30 degree TGA at HO to 90 degrees at PO takes longer in time and distance than 45 degrees TGA at HO to 90 degrees at PO). It allows for additional (time, distance) posterior translation (displacement) of the tibia as windlass progresses. This resists ACL deficient knee pathological anterior tibia displacement longer (time, distance) when added to an ACL deficient knee rigid sole footwear.

Figure 20:
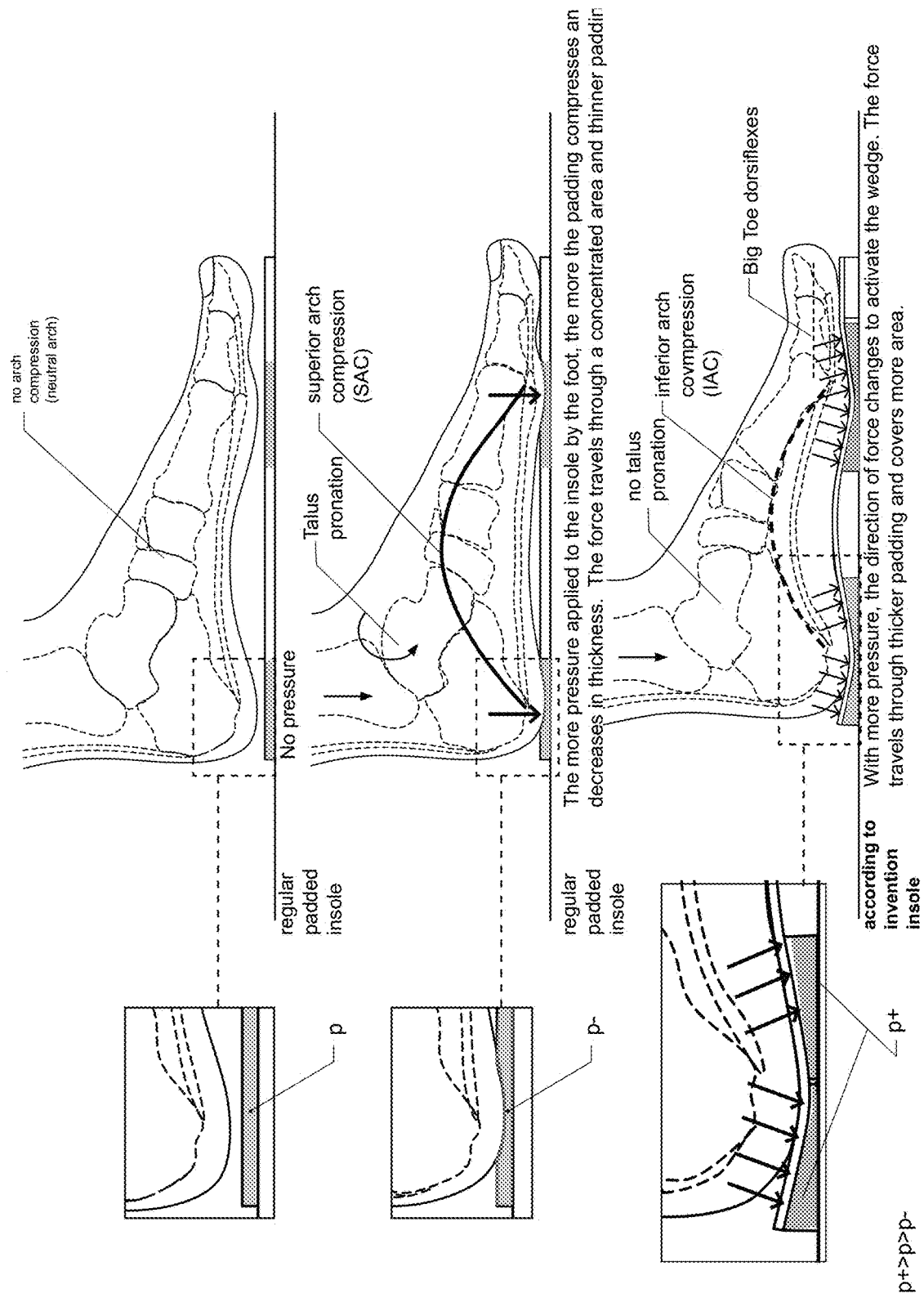
FIG. 20 includes schematics to show the benefit of the invention on foot padding.

9. Preventing diabetic foot ulcerations by reducing pressure points concentration by creating increased surface area when wedge settle, therefore less pressure per unit area as shown in FIG. 20.

10. With the segments on only the front sole section, the user's big toe is elevated when the outsole flattens, therefore, allowing for a tighter plantar fascia (which became looser by inferior arch compression) enhancing the windlass mechanism at the push-off and toe-off phases of the Gait Cycle.

Figure 22A:
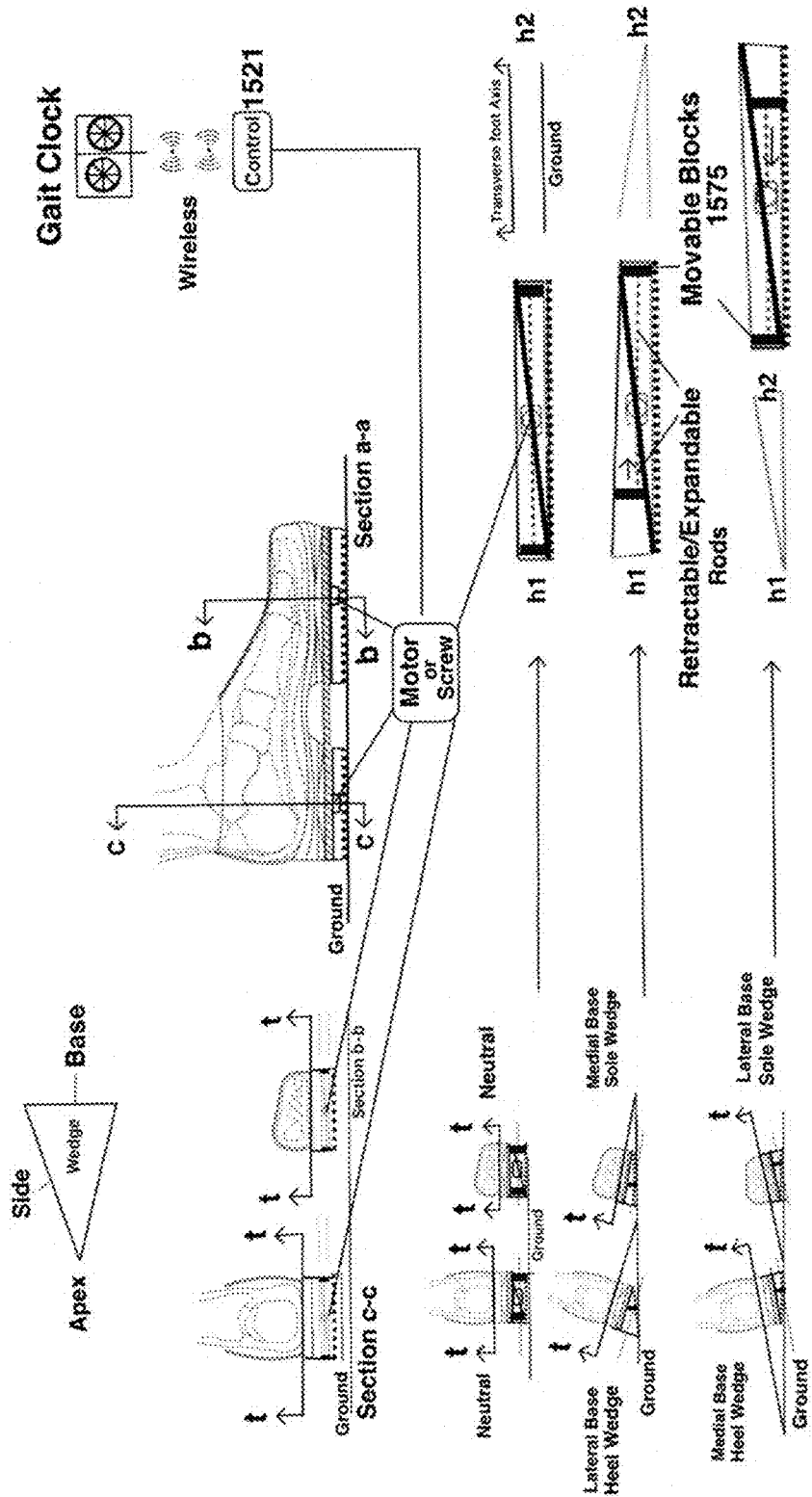
FIGS. 22A-C show footwear having a sole with variable heel and toe heights and/or variable medial side and lateral side heights allowing for adjustment of the heel to toe height ratio and/or the medial side to lateral side height ratio. Such height adjustments to either the front toe height, the back heel height, the medial side height, and/or the lateral side height can be accomplished using removable and replaceable sole segments and/or can be accomplished using adjustable height mechanisms in the sole. Adjustments to sole heights in any one or more of the aforementioned sole locations can be achieved manually such as, for example, a moveable wedge within the sole and/or using a motorized (battery operated) mechanism preferably, but not necessarily, automatically through a connection to a level gauge or Gait clock.
Figure 22B:
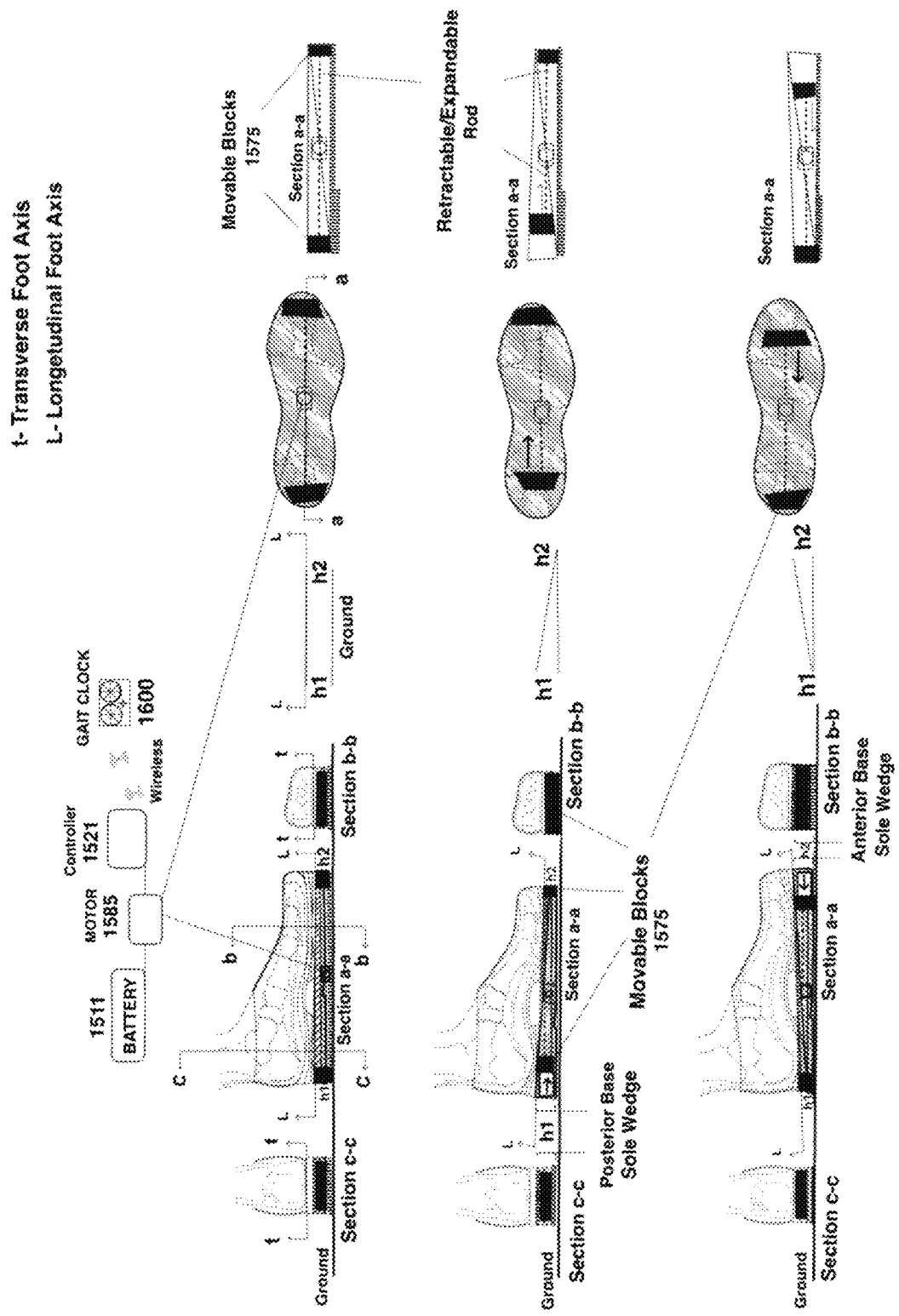
Figure 22:
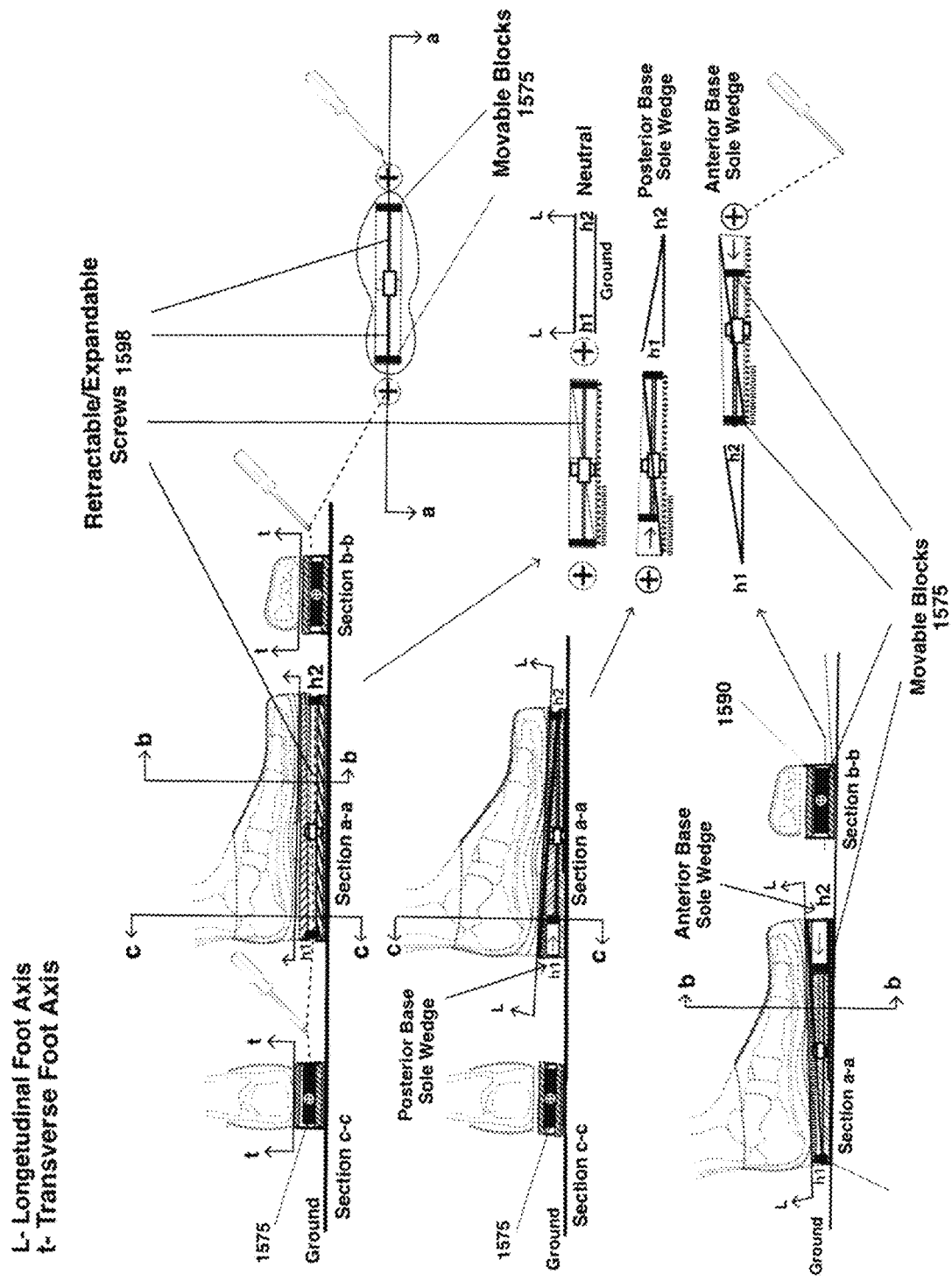

The present invention is also footwear having a sole with variable heel and toe heights and/or variable medial side and lateral side heights allowing for adjustment of the heel to toe height ratio and/or the medial side to lateral side height ratio. As shown in FIGS. 22A-C such height adjustments to either the front toe height, the back heel height, the medial side height, and/or the lateral side height can be accomplished using removable and replaceable sole segments and/or can be accomplished using adjustable height mechanisms in the sole. Adjustments to sole heights in any one or more of the aforementioned sole locations can be achieved manually such as, for example, a moveable wedge within the sole and/or using a motorized (battery operated) mechanism preferably, but not necessarily, automatically through a connection to a level gauge or Gait clock. The Z-sole configuration shown in FIGS. 22A-C allow for movement of blocks 1575 between rigid portions of a z-frame hinged in the middle to increase the height on either side by moving a block 1575 inward (towards the center of the footwear. The angle of inclination on either side of the Z-sole can be anywhere between 0 to 15 degrees, preferably 0 to 10 degrees.

It is understood that although the embodiments in FIGS. 22A-C show the block shaped structures, the invention includes flat soled footwear with the aforementioned adjustable height mechanism(s). The footwear can automatically level the user's foot depending on the angle of the underside of the outsole.

Incorporation of the Z-sole height adjustment mechanism into footwear has several advantages:

1. allows for optimal running angle titration by varying the TGA at Heel Off, therefore achieving the longest "Running Gap."

2. increasing the angle of inclination in the front end (e.g., creating an anterior wedge) gives a jumping advantage.

3. with a Gait clock coupling for biofeedback and proper angle adjustment at desired Instant Points (IP) the invention provides for desired clinical results.

4. correction of pathological gaits with appropriate inclination adjustment (wedging).

5. medial sole inclination-faster Center of Gravity shift at Heel Off (HO), the transit point, when body center of gravity (BCOG) shift from one side (ex:right) to the other side(ex: left) is initiated. A sole wedge with a medial base brings about additional force vectors directed toward body midline therefore accelerating BCOG shift.

6. automated Uneven Ground adjustment with Ground leveler feedback and automated power inclination adjustment.

The utility and functionality of a sole height adjustment mechanism according to the invention is best understood through application. An individual's maximum running speed, for example, can be improved (optimized) through an analysis of a particular individual's biomechanics and incorporation and use of the sole height adjustment mechanism.

Figure 23:
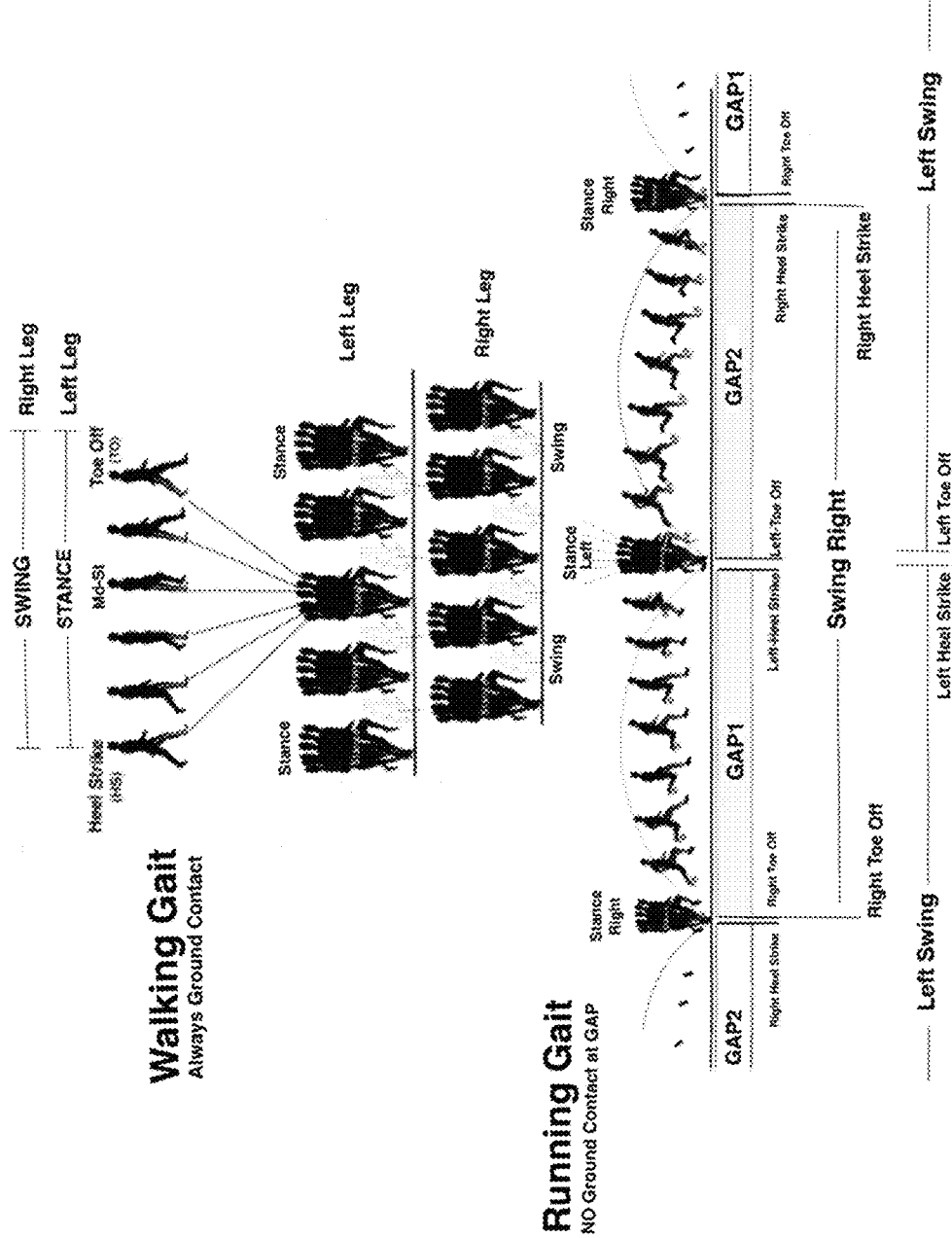
FIGS. 23 and 23a show the various phases of the Gait Cycle during walking and during running with a time gap between the "toe off" for one foot and the "heel strike" for the other.

During the fastest walk (e.g., race walking) the instantaneous point (IP) of toe off (TO) in the Gait Cycle in one foot (extremity) occurs exactly (coincides) with the instantaneous point (IP) of heel strike (HS) of the other foot (extremity). This positioning of the feet can be seen in FIGS. 13-16 which show different phases of the Gait Cycle during walking. When one foot lifts off the ground from the toe (designated "toe off") the other foot connects to the ground with the heel ("heel strike") which is an instantaneous point. As defined herein, when an individual moves fast enough to cause a time gap between the "toe off" for one foot and the "heel strike" for the other, meaning the person is not in contact with the ground at all for at least some period of time between TO and HS, the person is running. Put another way, running is defined herein as occurring when TO for one foot (extremity) and HS for the other is separated by a time interval. That time interval is designated as a GAP during which both extremities are off the ground as shown in FIG. 23. There are two GAPs during a single running Gait Cycle. GAP1 occurs post TO of one foot (extremity) (e.g., right foot) and ends with HS of the second foot (extremity) (e.g. left foot). GAP2 occurs post TO of the second foot (e.g., left foot) and ends with HS of the first foot (e.g., right foot) as seen in FIG. 23.

A runner's speed depends on the individual's anatomy and muscle power. Running speed power generation can be divided into two separate and distinct components, namely, "Ground speed" and "Air speed". "Ground speed" occurs between HS and TO, e.g., during the Stance Phase. "Air speed" is the combined GAP1 and GAP2 speed and is part of the Swing Phase for each foot (extremity). Muscle derived power generation can vary in accordance with each individual's muscle bulk strength and body anatomical variations. Training and exercise can increase muscle power. An individual's anatomy is genetically inherited and therefore static. "Ground speed" therefore has a maximum limit, since there exists a finite power generation and static biomechanics which limits an individual's performance.

To achieve the widest GAP distance (ft) and therefore the fastest run, the longest possible "Air Time" (seconds) is the goal, thus the greatest Air Speed.

Figure 24:
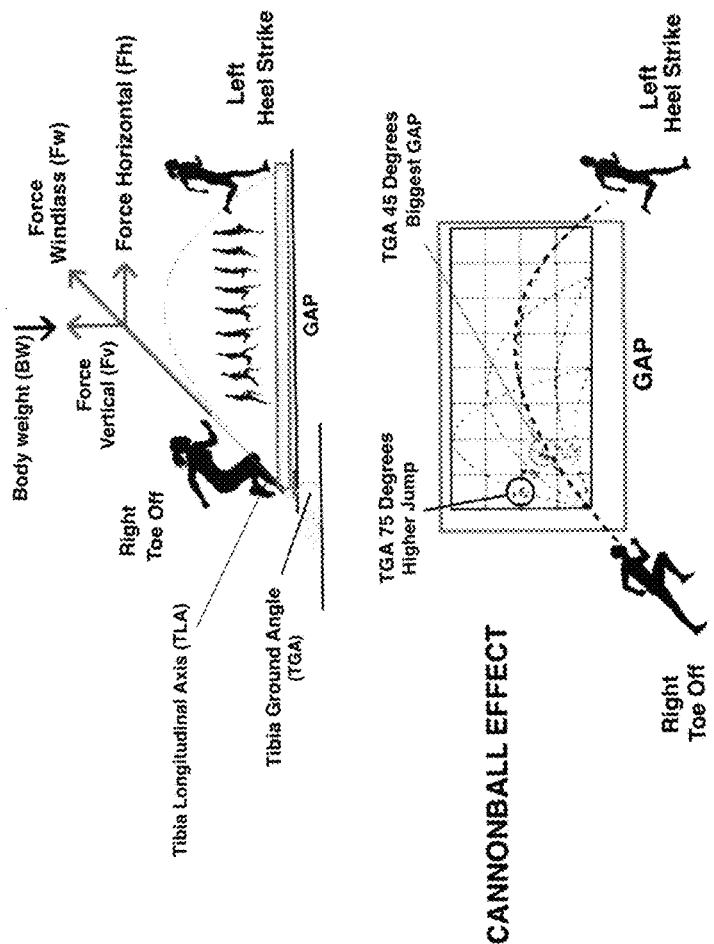
FIG. 24 shows the effect of ground angle on the distance traveled for an object moving at a set speed and its relationship with the running GAP.
Figure 25:
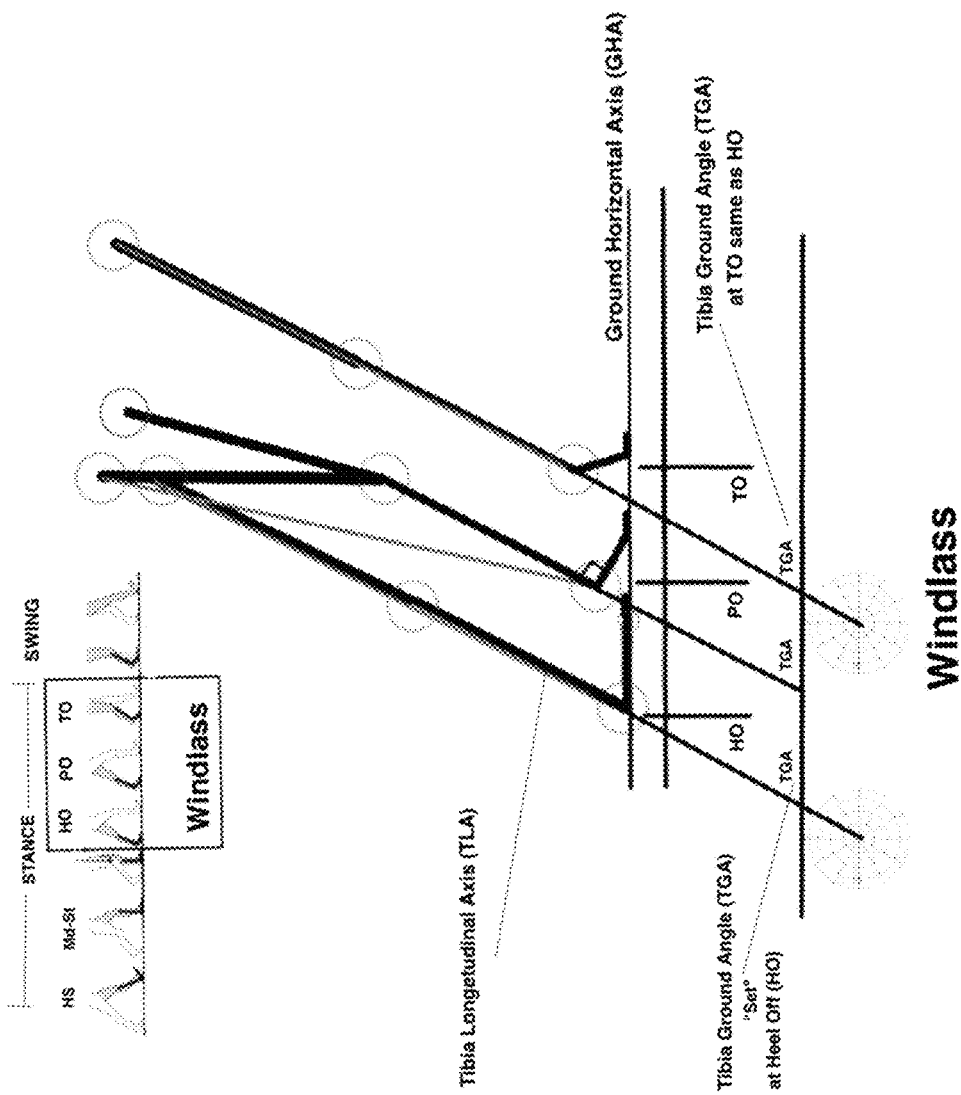

The Cannon Ball effect dictates that the most advantageous GAP distance (feet) for an object is achieved at a projectile angle of 45 degrees as shown in FIG. 24. Applying this logic to running means that during the running Gait Cycle, a 45 degree tibial ground angle (TGA) is most advantageous as it generates the largest GAP "Air Time" (sec) therefore spanning the biggest distance possible in the time interval between Toe Off (TO) of one extremity and Heel Strike (HS) of the other, generating the fastest possible run (Theoretical and actual) with the same power input. Since TGA is "Set" at heel off (HO) and remains constant (same) until toe off (TO) (see FIG. 25), an individual's running speed can be improved by adjusting the sole inclination to achieve a 45 degree TGA at TO. So by analyzing the actual TGA for an individual while running (e.g., using video or manual exam), if an individual's TGA is less than 45 degrees or greater than 45 degrees, the individual's speed can be improved by adjusting the sole inclination to get closer to 45 degrees TGA. This allows the horizontal component of the speed force (Fh) of one extremity to act longer since it is limited by the time (seconds) when the contralateral (other) extremity hits ground at HS secondary to gravitational pull (Cannonball Effect).

Figure 26:
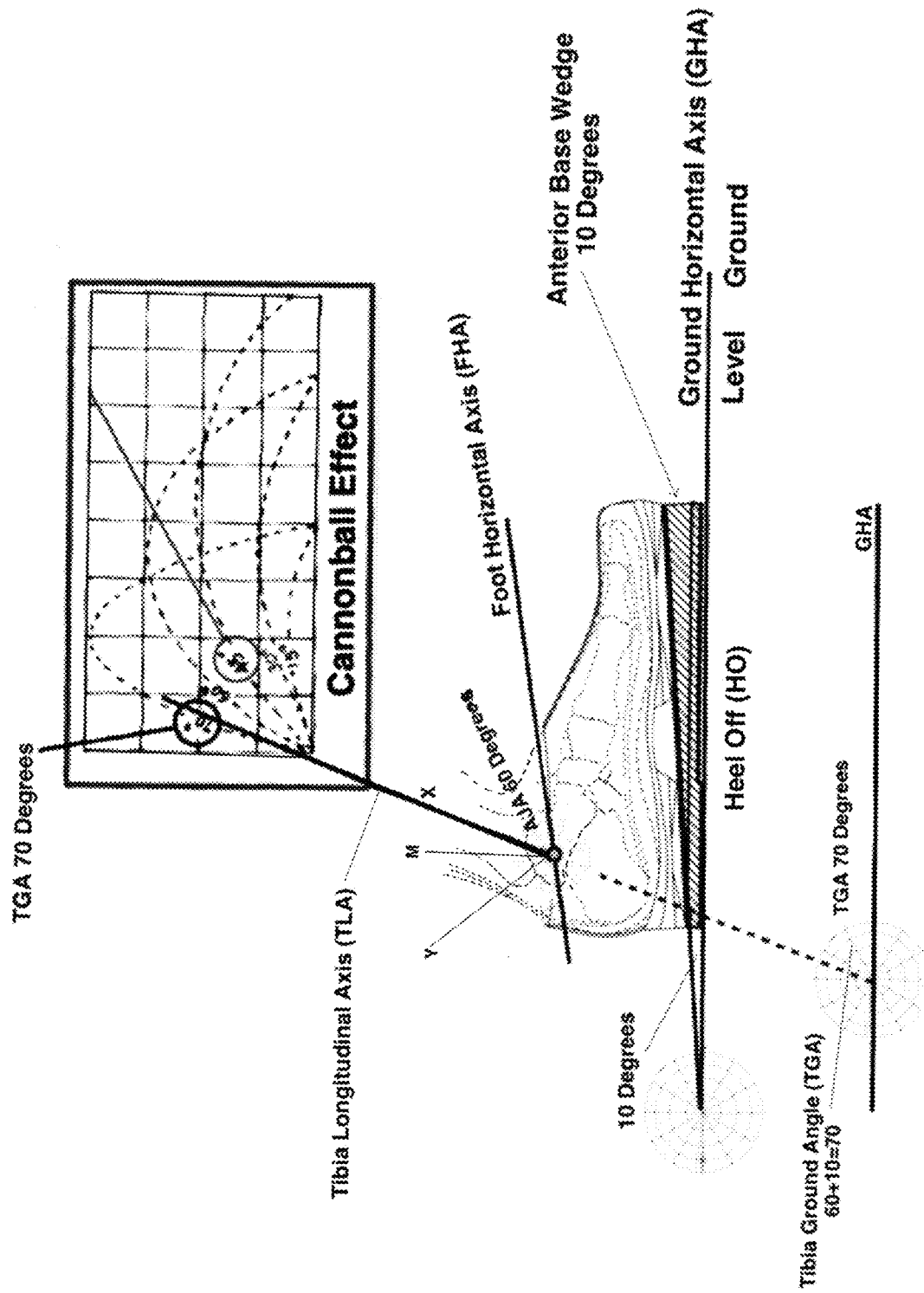

An upward inclined (uphill) anterior base wedge increases TGA at HO and therefore leg muscle generated power (Fw) projectile angle at TO—see FIG. 26. A downward (downhill) posterior wedge decreases TGA at HO and therefore projectile vector angle at TO—see FIG. 27.

For each individual runner, TGA angle at HO and therefore TO varies in accordance with one's style/form of running and anatomy. The form/style of running can be manipulated through practice and training but certain anatomical (physical) restrictions cannot be altered through practice or training.

Figure 28A:
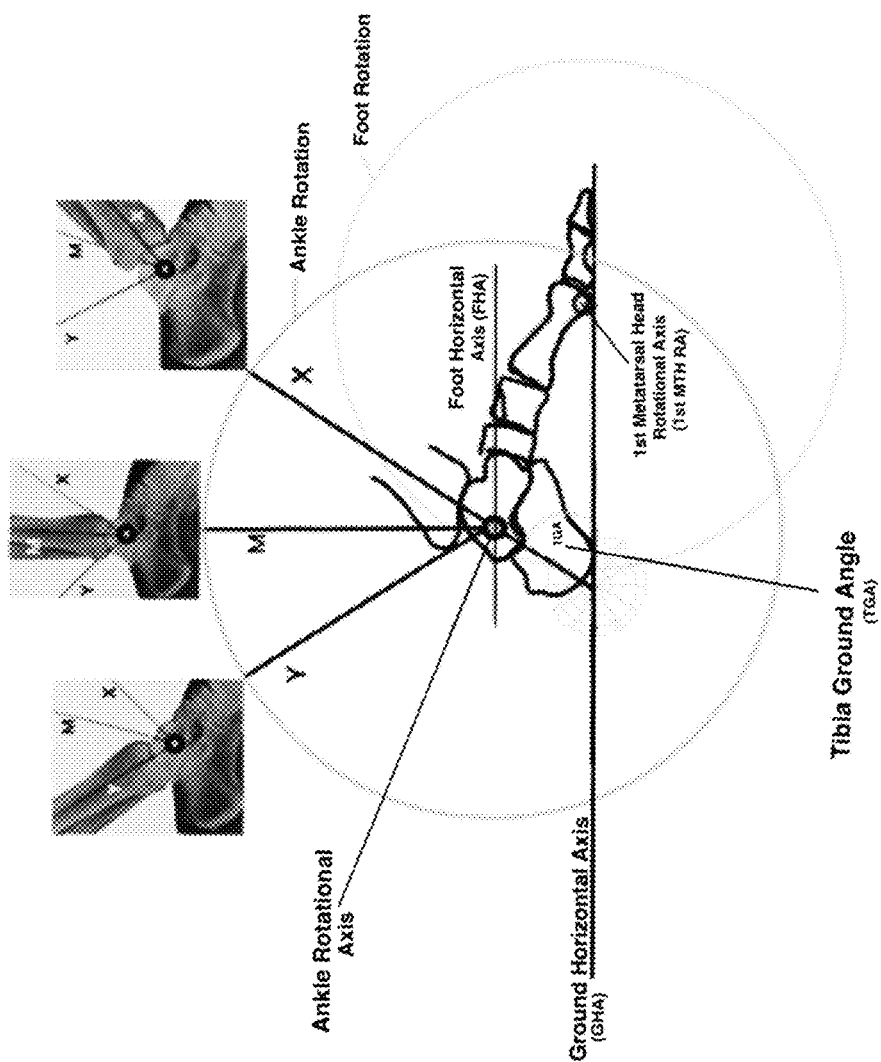
FIG. 28a shows the bones of a foot on the ground displaying the defined terms used in the description of the invention, including, Ground Horizontal Axis (GHA), Foot Horizontal Axis (FHA), Ankle Joint Rotational Axis (AJRA), and the 1st Metatarsal Rotational Axis.
Figure 28B:
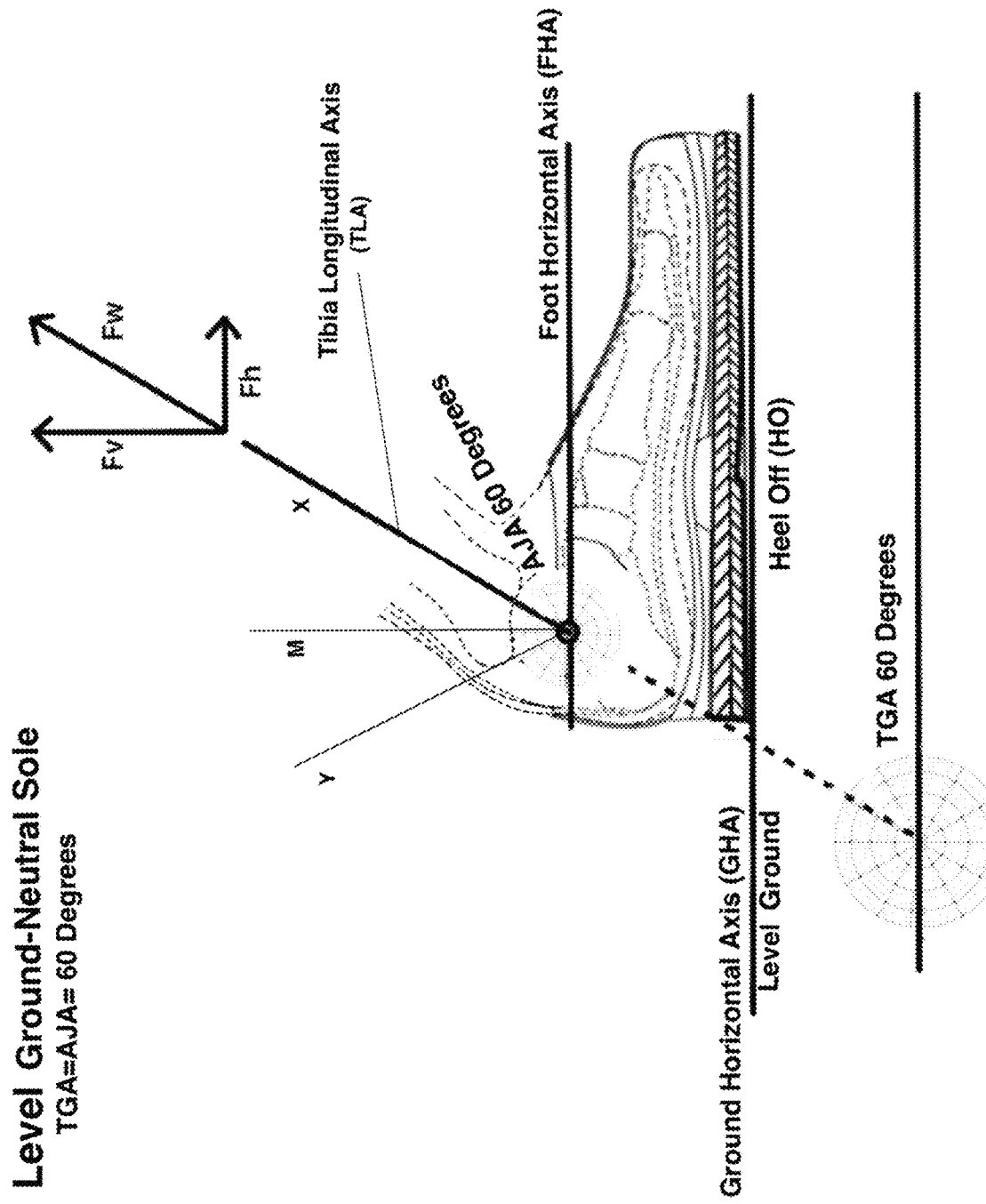
FIG. 28b shows the TGA, AJA, and the force vectors for a foot inside an article of footwear without any height adjustment.

The ankle joint is a uni-directional joint. It acts in a two dimensional plain (the Sagittal plane), with an ankle joint rotational axis (AJRA) at the talus dome center (with anatomical variations). See FIG. 28a. As used herein, Ground Horizontal Axis (GHA) is the Horizontal Axis of a "leveled" straight ground (theoretical-measured with a leveler). As used herein, Foot Horizontal Axis (FHA) is an axis parallel to GHA which transverses (goes through) Ankle Joint Rotational Axis (AJRA). Ankle Joint Angle (AJA) (degrees) is the angle created by the intersection of the Tibia Longitudinal Axis (TLA) and Foot Horizontal Axis (FHA). See FIG. 28b. An individual's ankle joint range of motion (ROM)(in degrees) is restricted by the Talus Dome and the distal Tibia articulation anatomy. Ankle joint ROM and therefore Talus Dome excursion, can be evaluated/determined by a straight forward simple clinical test (manual exam) as shown in FIG. 28a: Terminal (end) foot dorsiflexion (upward) designates impingement of distal anterior Tibia articulation on anterior Talus Dome articulation (Point X); Terminal foot Planate-Flexion (down) designates impingement of distal posterior Tibia articulation on posterior Talus Dome articulation (Point Y). This is the effective Ankle Range of Motion (Point X to Point Y). Standing upright on level ground creates a right angle (90 Degrees) between Horizontal Foot Axis (HFA) and Tibia Longitudinal Axis (TLA) which meet at designated point (M) which correlates with Ankle Joint Rotational Axis (AJRA).

Figure 23A:
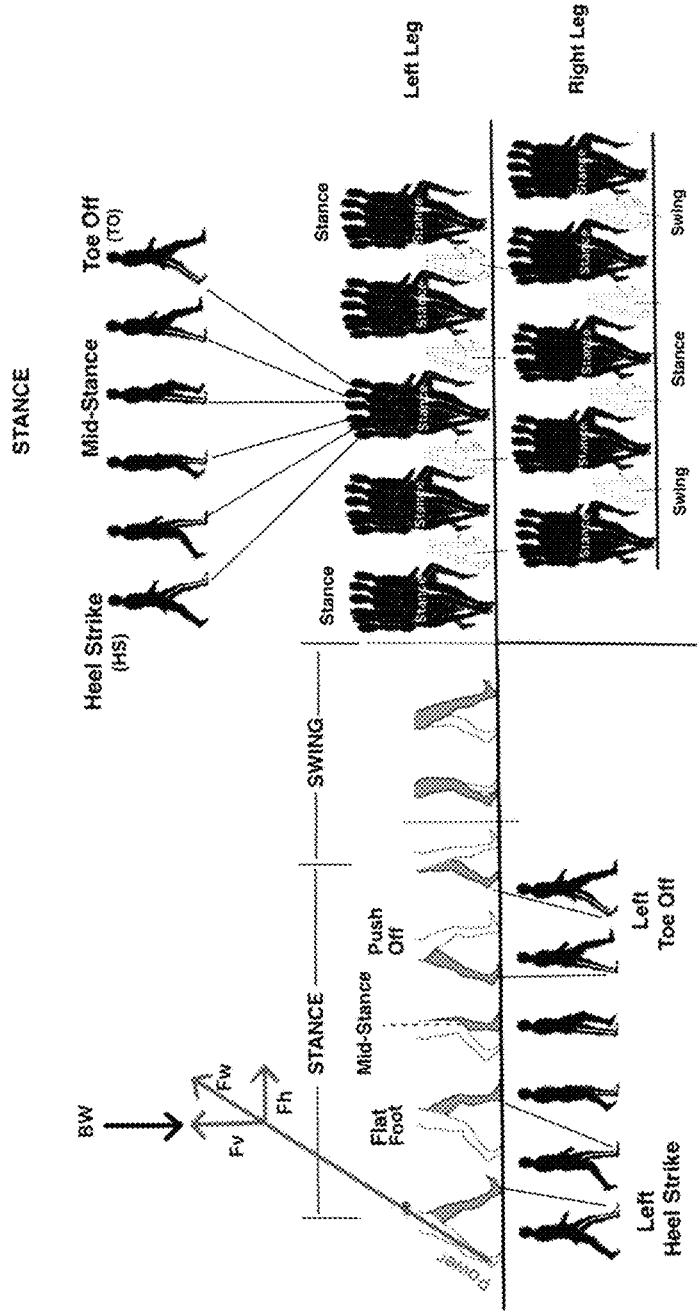

In the human Gait Cycle, the WindLass Phase (HO, PO, TO) follows the Stance Phase. See FIG. 23a. The WindLass Phase and therefore the WindLass mechanism is initiated at the instant point (IP) Heel Off (HO), a point in time when maximum anterior excursion of Tibia on Talus Dome is reached (Point X). It progresses to the Instant Point (IP) Push Off (PO) when Ankle Joint Angle (AJA) reaches 90 Degrees and ends at toe off (TO), the instant point the big toe ends contact with ground.

Tibial Ground Angle (TGA) (degrees) is defined as the angle generated by Tibia Longitudinal Axis (TLA) and a "leveled" (actual or theoretical measured with a leveler) straight ground (regardless of what the actual ground inclination is), the Ground Horizontal Axis (GHA). At Heel Off (HO), standing on a straight "leveled" ground (actual), Foot Horizontal Axis (FHA) and Ground Horizontal Axis (GHA) are parallel and TGA (degrees) and AJA (degrees) correlate (they are the same). They diverge as WindLass (HO, PO, TO) progresses. During WindLass, the foot's first metatarsal head (MTH) ground interface acts as the rotational axis of a circle whose rotational radius (RR) is a straight line connecting Ankle Joint Rotational Axis (AJRA) (M) and first MTH rotational axis—see FIG. 29.

Clinical observation of the Human Gait Cycle WindLass Phase (Time interval HO through PO terminating with TO) demonstrate a constant (same) Tibial Ground Angle (TGA) throughout, with it "set" (fixed) at Heel Off (HO) instant point (IP). For a given individual that TGA could be 45 degrees, higher than 45 degrees or lower than 45 degrees.

Figure 29:
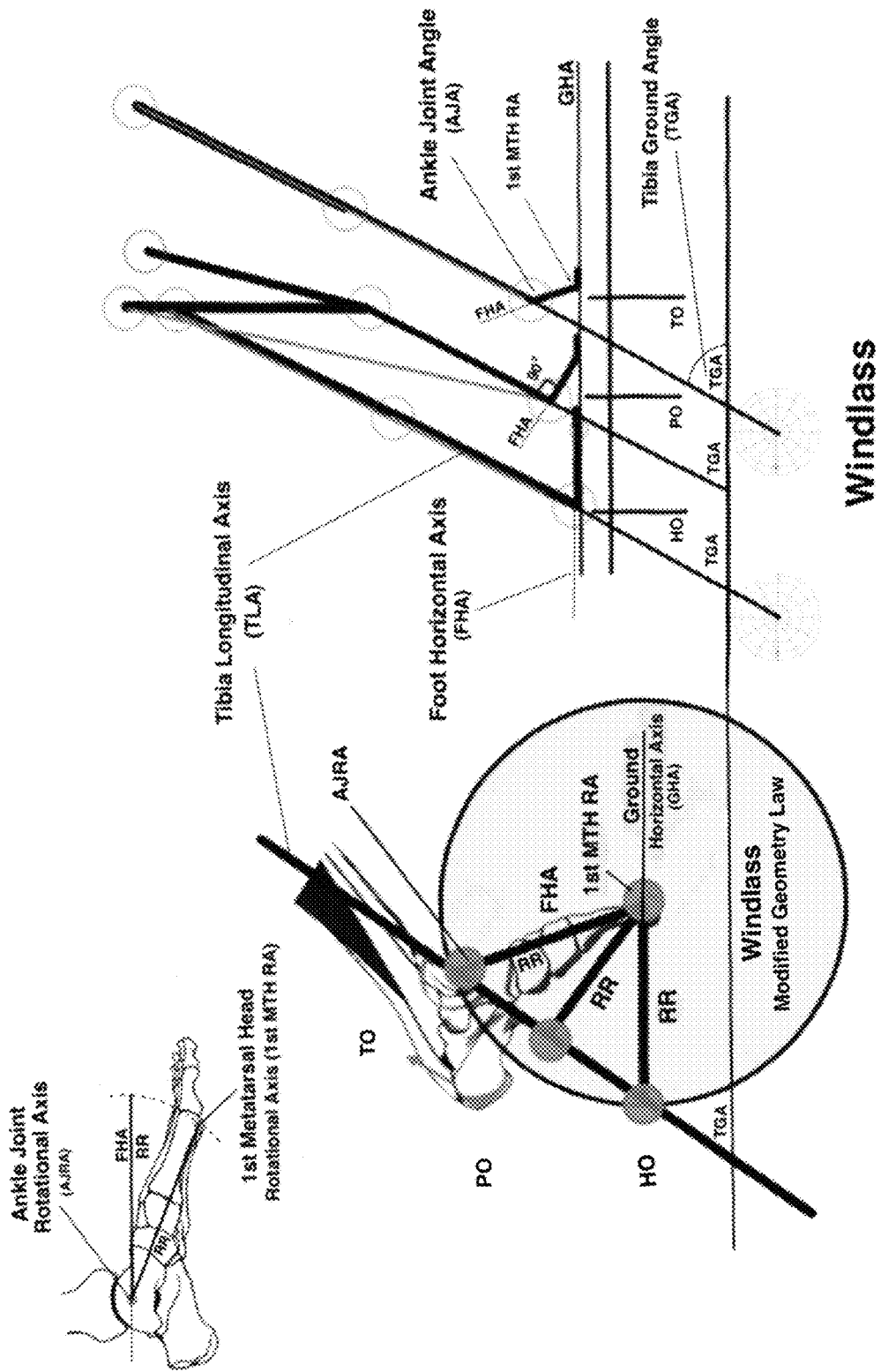
FIG. 29 shows the geometry and rotation, during Windlass, about a rotational axis at the 1st Metatarsal Head Rotational Axis (1St MTH RA). Tibial Ground Angle (TGA) (degrees) is defined as the angle generated by Tibia Longitudinal Axis (TLA) and a "leveled" (actual or theoretical measured with a leveler) straight ground (regardless of what the actual ground inclination is), the Ground Horizontal Axis (GHA). At Heel Off (HO), standing on a straight "leveled" ground (actual) Foot Horizontal Axis (FHA) and Ground Horizontal Axis (GHA) are parallel and TGA (degrees) and AJA (degrees) correlate (they are the same). They diverge as WindLass (HO, PO, TO) progresses.
Figure 29B:
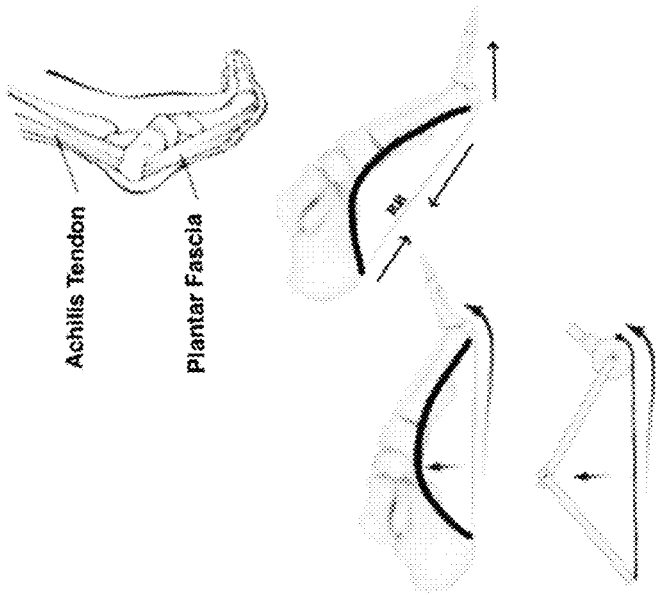
FIG. 29b shows that the Windlass mechanism of a foot decreases (shortens) the effective rotational radius (variable RR) between Heel Off (HO) Push Off (PO) and Toe Off (TO), therefore preventing posterior (to left) translation of the tibia as would have occurred with the Geometry Law and a constant (R). This action defined as the Modified Geometry Law, allows for a constant Tibia Ground Angle (TGA) during Windlass (HO, PO, TO) with no anterior or posterior translation (only superior, upward motion of tibia).
Figure 29B:
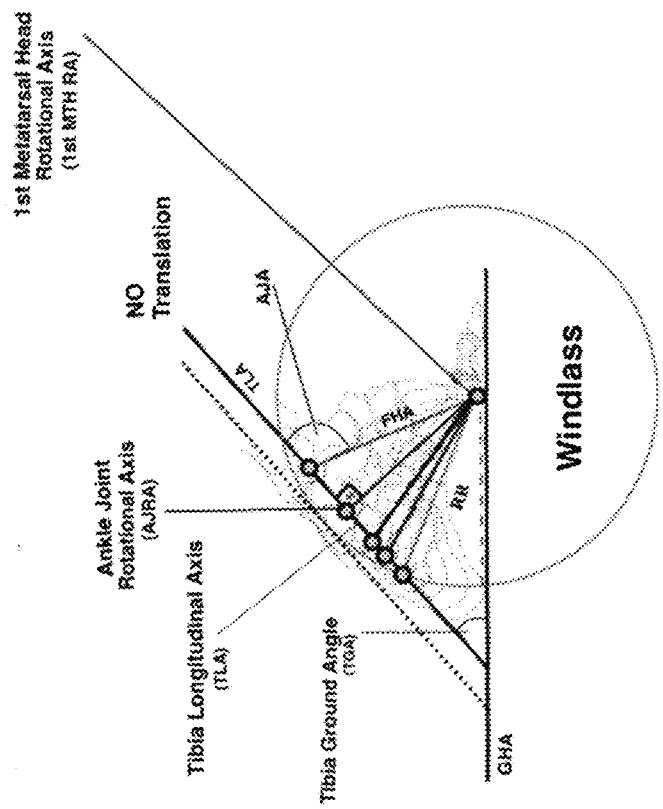
Figure 29C:
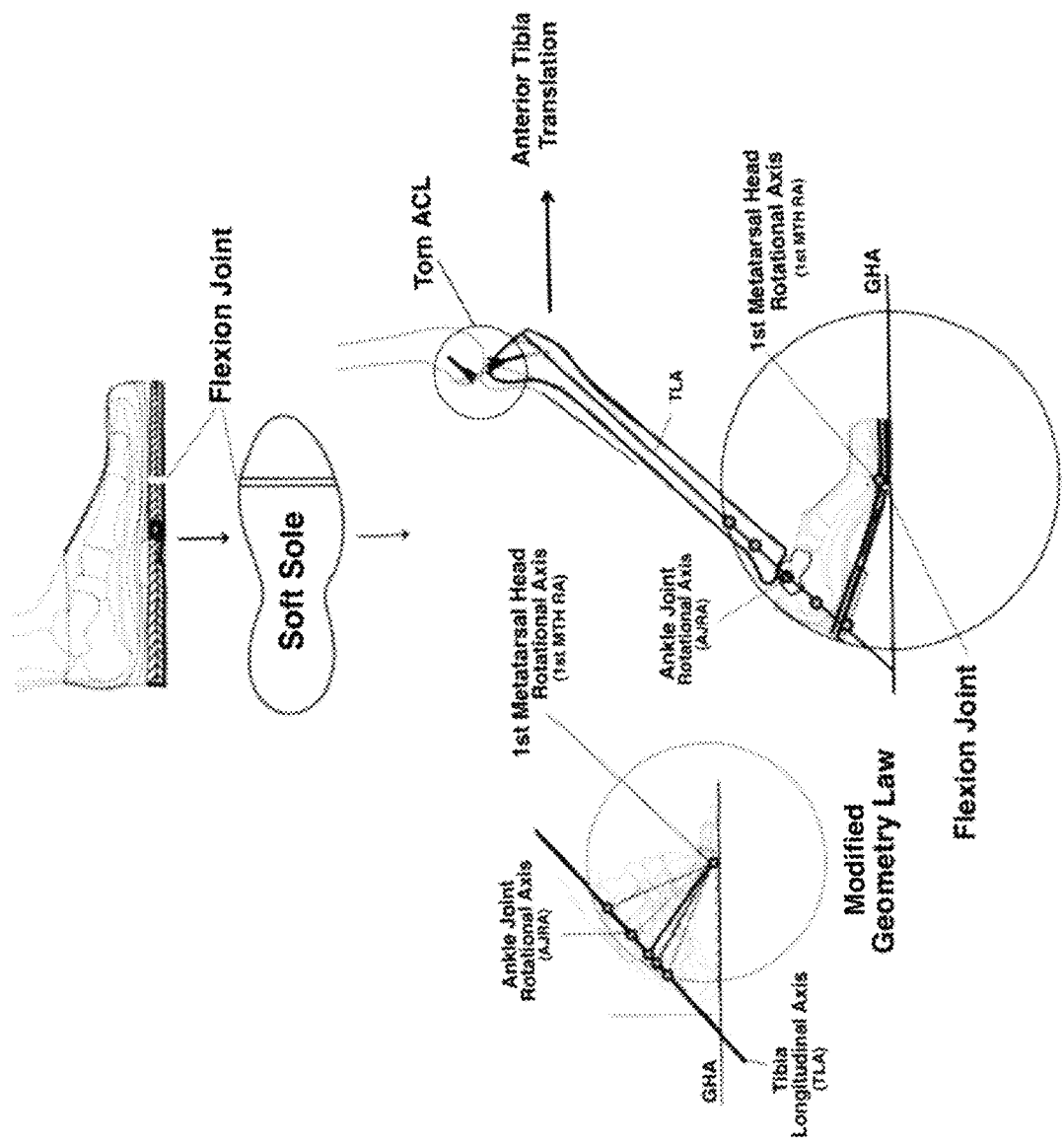
FIG. 29c shows the clinical effect of the Modified Geometry Law occurring with a soft shoe sole (most athletic footwear) which allows rotation at 1st Metatarsal joint rotational Axis (1st MTH RA), activating the Windlass mechanism and therefore a variable rotational radius (RR). An AJA of 90 degrees or larger brings about forward (anterior) displacement of the tibia with respect to the femur and in an anterior cruciate ligament (ACL) deficient knee exacerbating the pathological anterior tibia displacement bringing about greater instability with the clinical effect of leg giving way. An AJA is less than 90 Degrees keeps tibia "stationary"—there is NO posterior (backward) or anterior (forward) translation of tibia and therefore no resistance to the ACL deficient knee instability, allowing for the pathological anterior tibia (forward) translation, causing an unstable knee with the clinical effect of leg giving way.
Figure 29D:
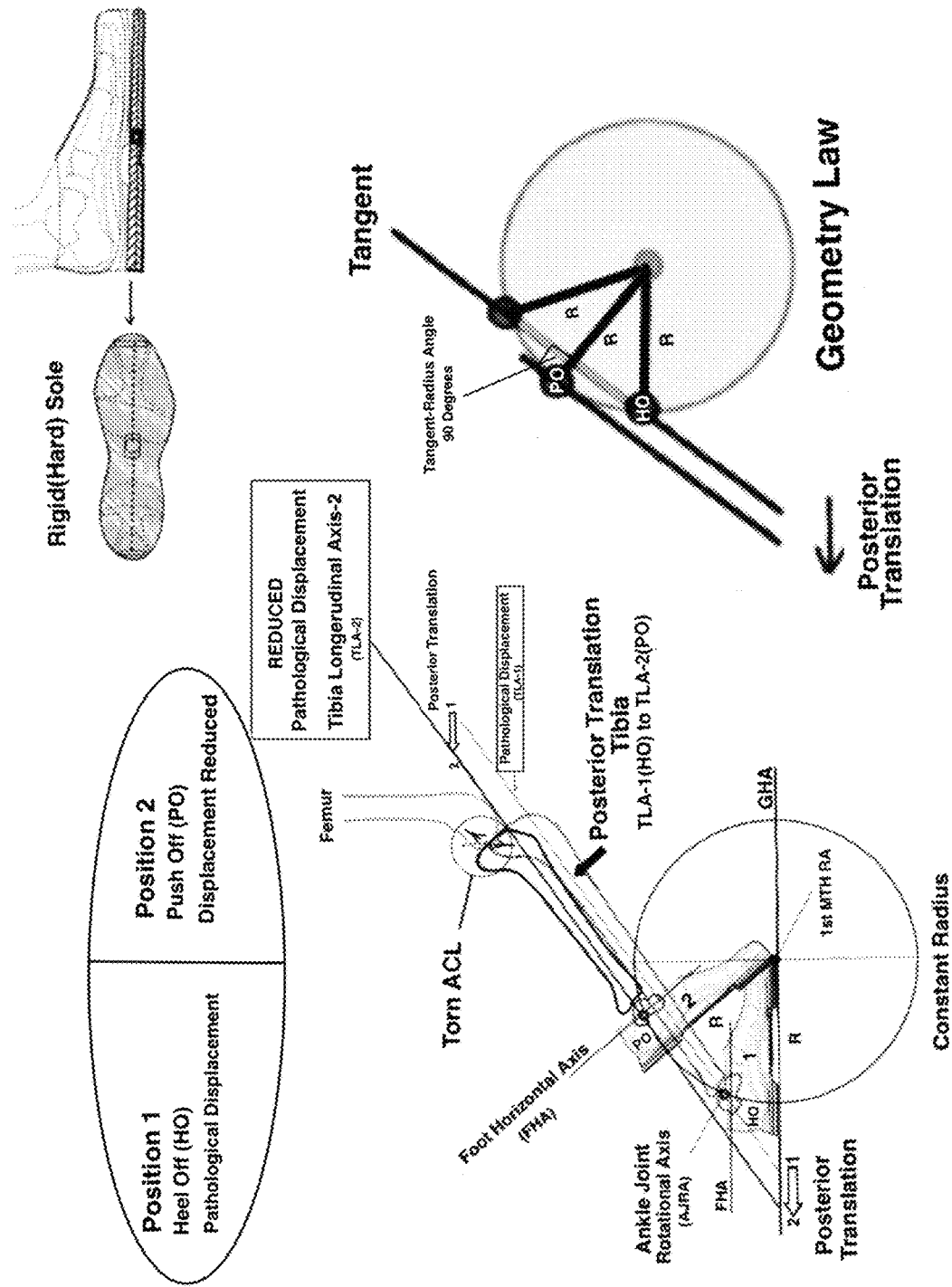
FIG. 29d shows backward (posterior) displacement of the tibia in relation to the femur with a solid shoe sole at AJA less than 90 degrees. A solid shoe sole brings about the Geometry Law with a constant rotational radius (R) which prevents the Windlass mechanism. It allows for posterior (backward) tibia translation, therefore restraining the pathological anterior tibia translation of the ACL deficient knee, stabilizing it and preventing leg giving way. This bio mechanical action is the restraining action an ACL stabilization knee brace attempts to do with rigid hinges (mostly unsuccessfully).
Figure 30:
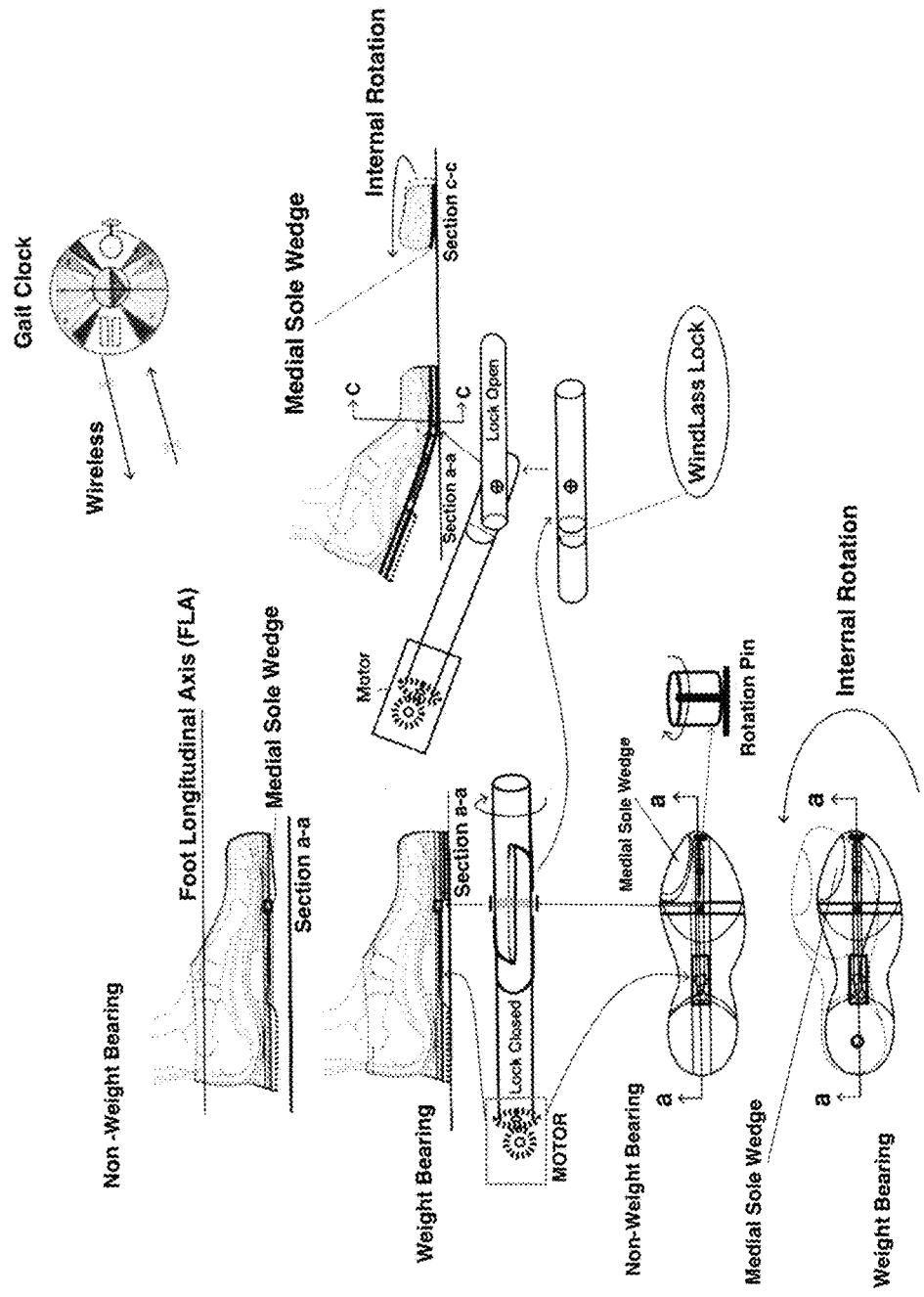
FIG. 30 shows an adjustable rigidity shoe sole governed by a locking mechanism (Windlass lock) which could be mechanically adjusted (via a screwdriver) or via a motor controlled wirelessly by a Gait Watch (clock). A 90 degree rotation of the Windlass lock alternates shoe sole at flexion point, allowing for either the Windlass mechanism and therefore the Modified Geometry law with a variable radius (RR), or a rigid sole state enabling the Geometry Law with a constant radius (R).

Classic geometry dictates that a tangent to a circle is 90 degrees to the radius of a circle at point of contact. If the radius represents Foot Horizontal Axis (FHA) and the Tangent the Tibia (TLA), as AJA increases (larger than 90 degrees), as with foot plant-flexion (down), Tibia Horizontal Axis (THA) and therefore Tibia translates (moves) anteriorly (forward). See FIG. 29a. When Ankle Joint Angle (AJA) is less than 90 Degrees and a constant (same) Tibia Ground Angle (TGA) is maintained (a scenario which occurs per our clinical observation in the HO to TO time interval), classic geometry rules dictate that the tibia will translate (move) posteriorly—that is, if the point for the ankle joint were to travel around the circle (see FIG. 29a). However, clinical observation of tibial translation (displacement) during WindLass (HO, PO, TO) does not correlate with the expected classic geometric results of posterior translation of Tibia (THA). It demonstrates no translation at all, not posterior or anterior, only an upward movement of tibia along its longitudinal axis. This discrepancy between theoretical geometry and actual data can be reconciled by applying the bio-mechanical effect of the WindLass mechanism on the foot's Longitudinal Arch. As the big toe extends (goes up) and AJA increases during WindLass (HO to TO) with progressive foot planate flexion (down), effective shortening of the plantar fascia occurs with progressive decreases in length of the Longitudinal Arch base and therefore the foot's rotational radius (RR). This timely decrease in RR accounts for the clinical observation of a "stable" TGA with only superior translation (along the tibial axis) and no anterior or posterior (AP) translation. This is defined as the Modified Geometry Law as seen in FIG. 29b. In essence the tibia stayed stationary with only an upward displacement along the tibial axis in the Phase Interval (PI), time interval, initiated by Heel Off (HO) and ending at Toe Off (TO) when the big toe dislodges from the ground (end of the WindLass period). Even though Ankle Joint Angle (AJA) increases during the WindLass Period, the Tibial Ground Angle (TGA) remains constant (same). Thus, Tibial Ground Angle (TGA) is set (fixed) at Heel Off (HO) when distal Tibia anterior articulation impinges on the Talus Dome anterior edge at the termination of the Stance Phase of the Gait Cycle (Point X). During the WindLass Phase (HO, PO, TO), the TGA stays constant (same) even though AJA increases as foot plater flexes (down) till the foot dissociates from ground at TO (FIG. 29).

Individual anatomical variations as Talus Dome span and radius, bone size, volume and length, dictate a distinct individual AJA and therefore a unique individual TGA at Heel Off (HO). The Talus Dome span (Ankle joint ROM) and AJA (degrees) at HO are fixed by an individual's anatomy, whereas the Tibial Ground Angle (TGA) is not.

The angle generated by the Tibia (THA) and Ground Horizontal Axis (GHA-always "leveled") at HO varies depending on Foot Horizontal Axis (FHA) inclination which can be varied according to the present invention. On a straight "leveled" ground FHA is parallel with Ground Horizontal Axis (GHA) and AJA equals TGA at HO. However, with an inclined ground or foot, TGA can be more (incline uphill) or less (incline downhill) then the anatomically "set" AJA at HO.

Figure 28C:
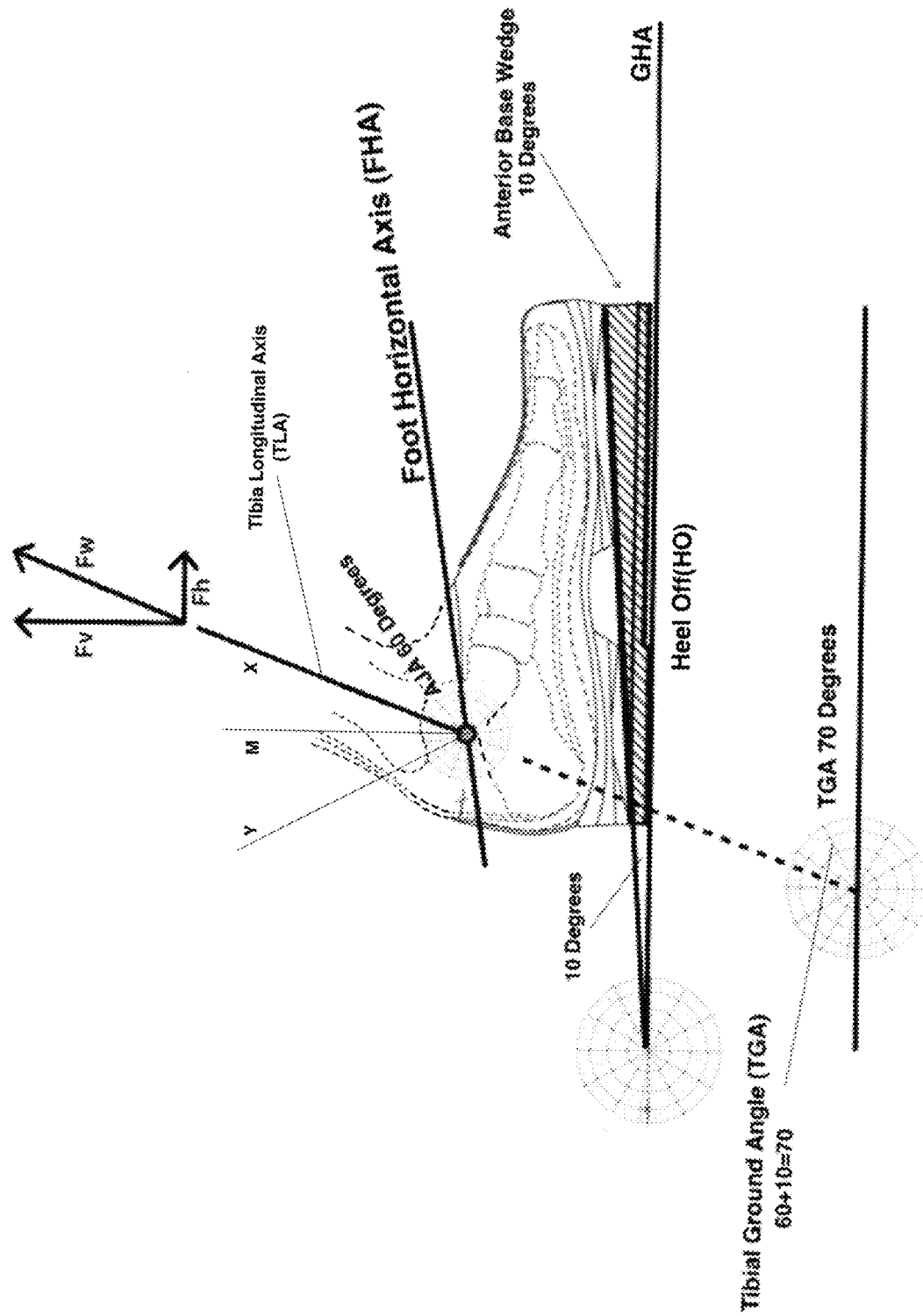
FIG. 28c shows an article of footwear according to the present invention with an anterior wedge to create an upward incline in the anterior of the footwear, the front end, whereby TGA is greater than AJA at HO.
Figure 28D:
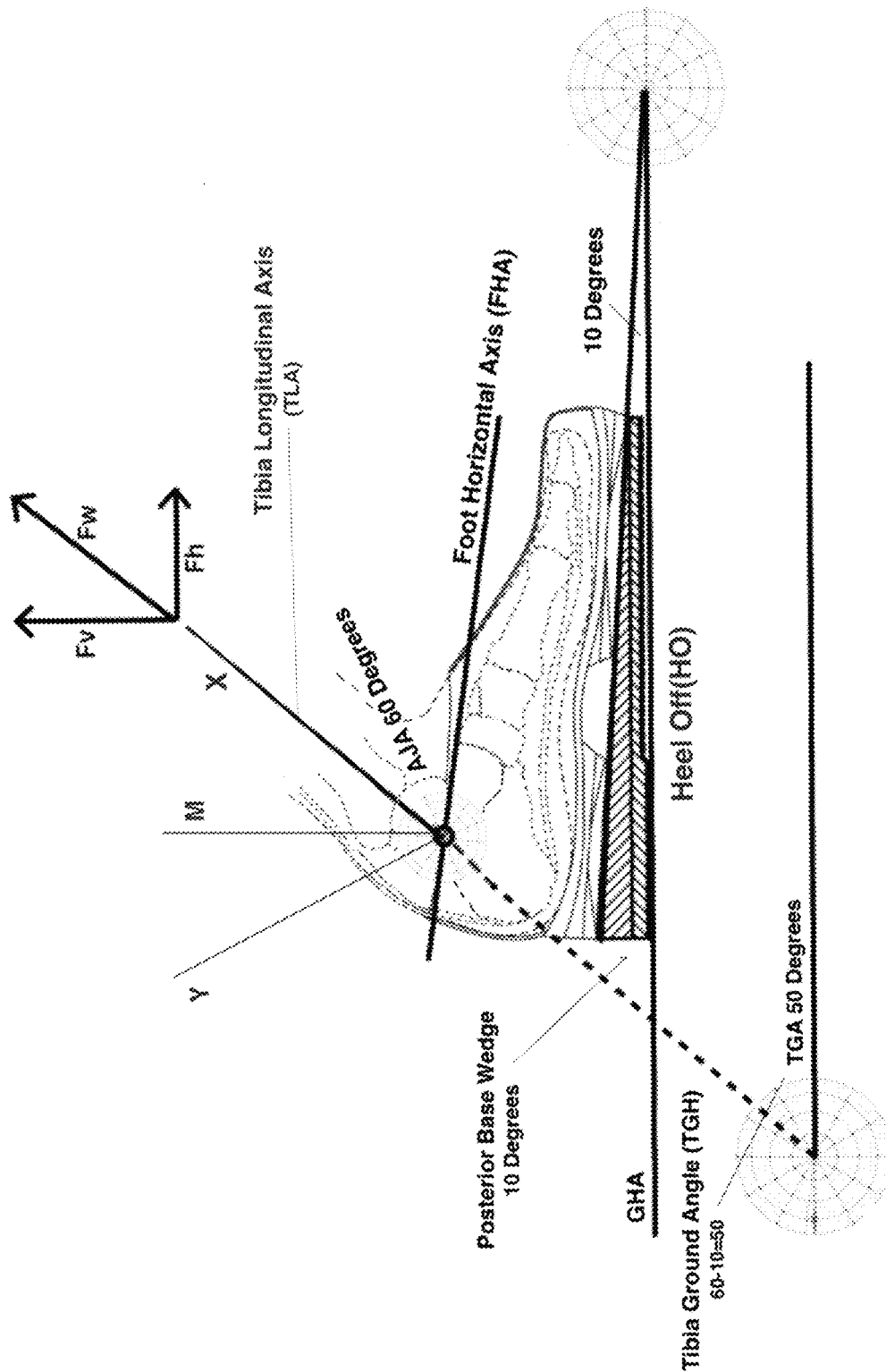
FIG. 28d shows an article of footwear according to the present invention with a posterior wedge to create a downward incline in the posterior of the footwear, the back end, whereby whereby TGA is less then AJA at HO.

An upward incline in the anterior of the footwear, the front end, (e.g., an anterior sole wedge) generates an "uphill" inclination whereby TGA is greater than AJA at HO—see FIG. 28c. A downward incline in the posterior of the footwear, the back end (e.g., a posterior sole wedge) generates a "downhill" inclination whereby TGA is less then AJA at HO—see FIG. 28d. This "manipulation" of TGA at HO has multiple applications, clinical (medical) and athletic performance enhancement. Use of inclinations through wedges according to the invention and/or a mechanical inclination mechanism in the footwear allows for titration of TGA to a desired TGA angle(s). For example, the inclination can be adjusted to achieve exactly 45 degrees at Heel Off (HO) and therefore (TO), generating the largest possible GAPs (air time) and therefore the fastest run with the same power force vector (Fw). See FIGS. 28b, 28c, and 28d.

Figure 31:
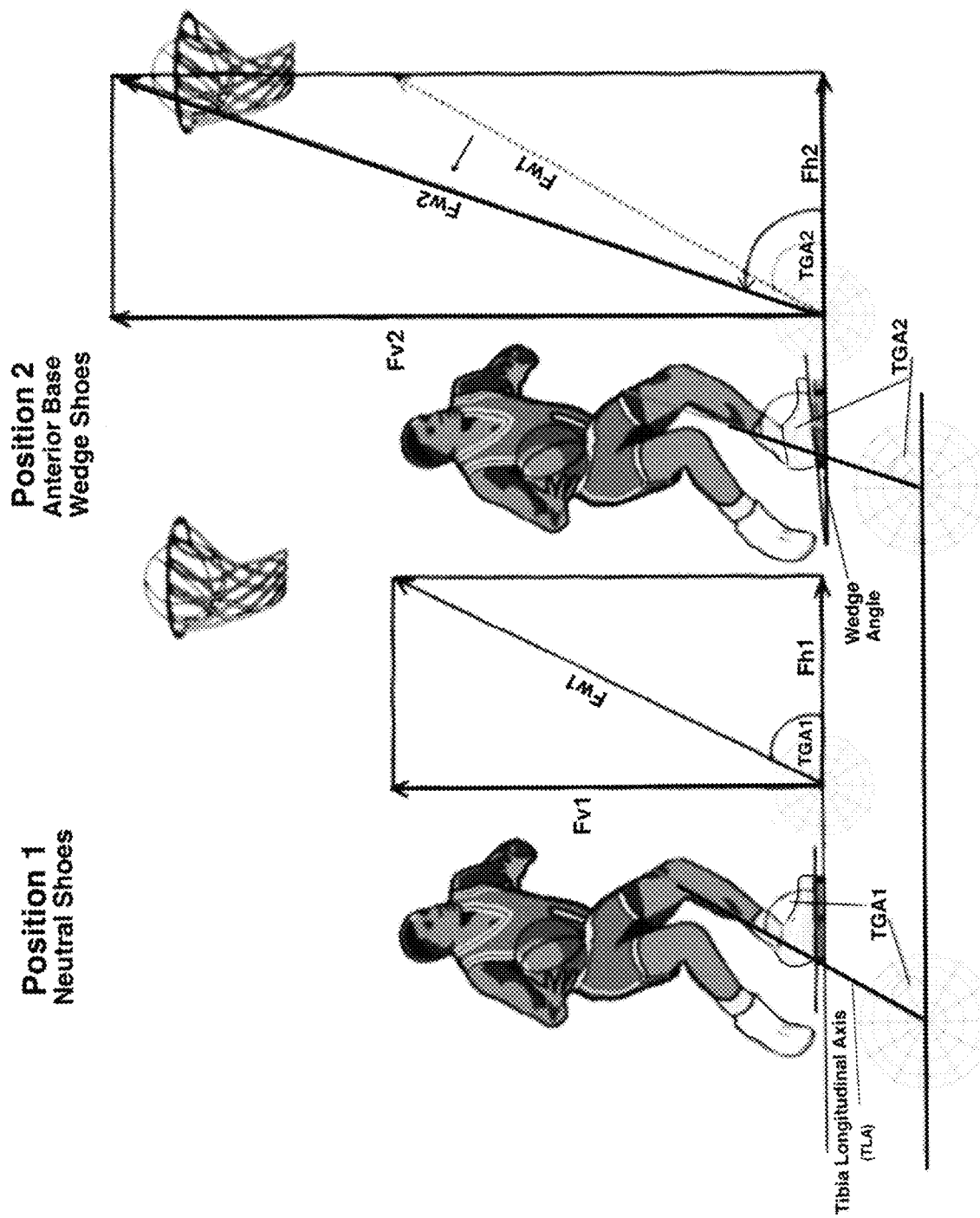
FIG. 31 shows footwear according to the invention to assist a basketball player with jumping higher. An increase in TGA at Heel Off (HO) and therefore Toe Off (TO), using an anterior wedge, will increase the Vertical Force Vector (Fv) and bring about a higher jump with the same Power Force Vector (Fw).

Running the fastest possible may not always be the desired result all the time. In some sports, e.g., basketball, where jumping height is desired, it may be desirable to increase the maximum height the person can jump. According to the present invention, that can be accomplished using sole inclination. An increase in TGA at HO, and therefore TO, will increase the Vertical Force Vector (Fv) and bring about a higher jump with the same Power Force Vector (Fw). See FIG. 31. Using a mechanically adjustable sole to adjust the angle of inclination, the present invention allows a user to adjust the footwear to the desired outcome at the desired time.

Figure 27:
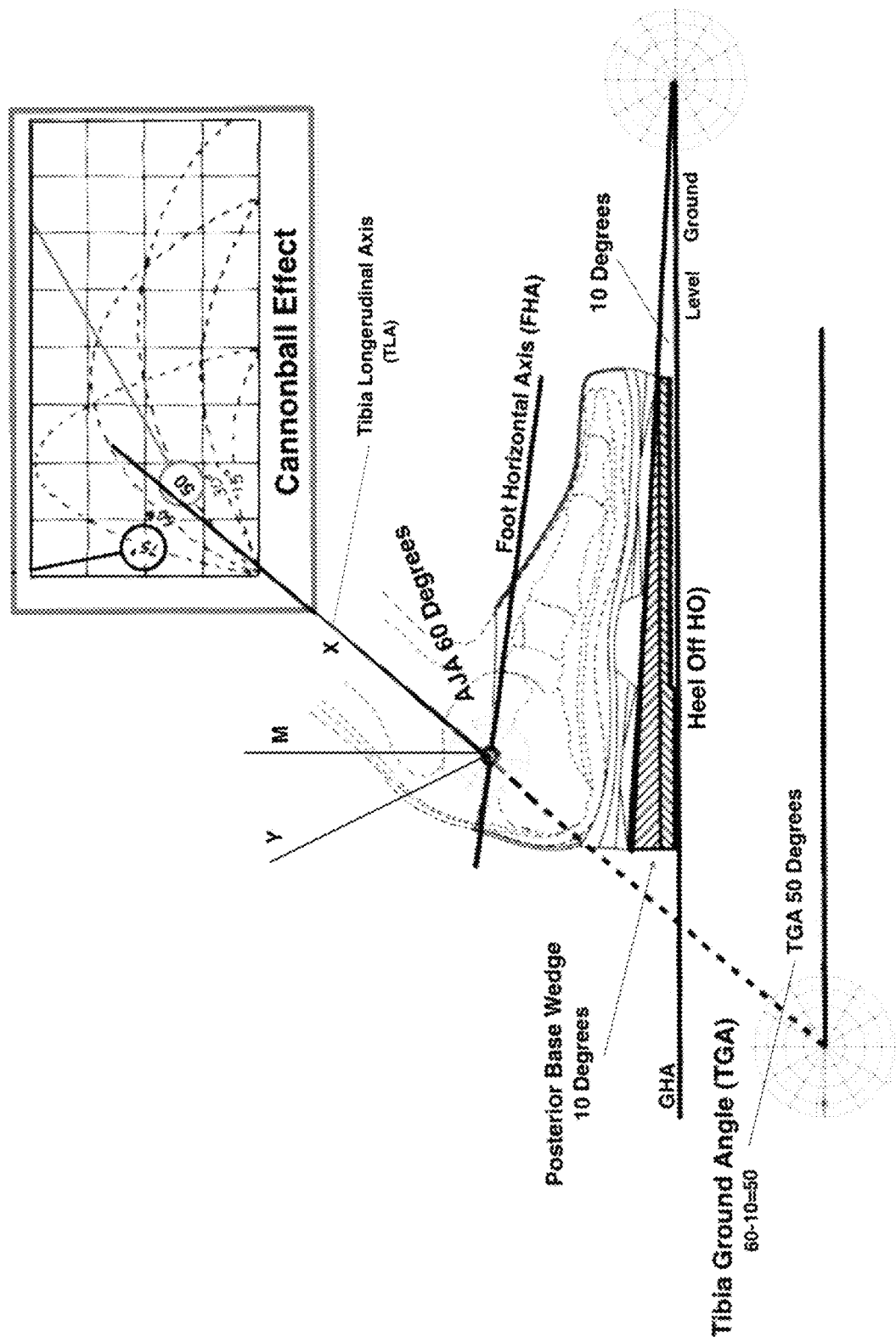

As shown in FIGS. 26 and 27, wedges to create sole incline can be built into the sole of the footwear to create the desired result, e.g., a 45 degree TGA when running. FIG. 26 shows an anterior wedge whereas FIG. 27 shows a posterior wedge on the outsole. The outsole could be made with removable and replaceable sole wedges to change the angle of inclination to the desired angle before placing the footwear on without any adjustability while wearing the footwear. Alternatively, as shown in FIGS. 22A-22C, the sole of the footwear is mechanically adjustable.

FIG. 22C shows a sole with a mechanically adjustable height mechanism according to the present invention along the longitudinal axis using a screwdriver to move one or more spacing blocks 1575 slidably positioned between two semi-rigid sections 1590 in the sole. The semi-rigid sections 1590 can be in the same shape as the sole (as seen from a top view) or they can be smaller shaped, including bars or rods or the like. Preferably there are two spacing blocks (one at each end of the sole) sandwiched between a pair of semi-rigid sections. When a block 1575 is moved closer to the middle of the sole, the block pushes the semi-rigid sections apart thereby increasing the angle of inclination. As seen in FIG. 22C, the height of the sole at the back end of the sole is h1 and the height at the front end is h2. When block 1575 in the front end of the sole is moved towards the center of the sole, as shown in the bottom of FIG. 22C, height h2 increases which in turn increases the TGA for the user. Blocks 1575 can be movably connected to a screw drive 1598, a worm gear, or the like. Modified embodiments, included in the scope of the invention include a retractable and/or expandable screw connected to the blocks 1575. The TGA of the user can be decreased by sliding block 1575 in the back end of the sole towards the center of the sole using the screwdriver thereby increasing height h1.

FIG. 22B shows a similar structure in the sole to create a longitudinal angle of inclination anterior and/or posterior except the device in FIG. 22B uses a motor 1585 connected to a battery 1511 and a controller 1521 with wireless capability. As shown in FIG. 22B, the controller 1521 can receive instruction on how to adjust the slidable blocks 1575 and thus the angle of inclination from a wireless device 1600, e.g., a smart phone or computer, etc. FIG. 22B shows a Gait Clock 1600 which could be a computer model containing time-based instructions for adjusting the individual's sole based on desired results (e.g., running faster, jumping higher, etc.). Accordingly, the invention includes near instantaneous, continuous, time based adjustment(s) of the blocks 1575 and the sole heights h1 and h2. FIG. 22B also shows a flexible rod connected to the block 1575 so that the sole according to the invention can bend.

FIG. 22A shows another similar structure according to the present invention to create angles of inclination laterally across the sole in the anterior and/or posterior regions using motors 1585 connected to a battery (not shown) and controller 1521 with wireless capability. As shown in FIG. 22A, the controller 1521 can receive instructions on how to adjust the heights h1 and h2, the angles of inclination, from a wireless device 1600, e.g., a smart phone or computer, etc. FIG. 22A shows a Gait Clock 1600 which could be a computer model containing time-based instructions for adjusting the individual's sole height(s) based on desired results (e.g., running faster, jumping higher, etc.). It is understood that the present invention includes soles and footwear with adjustment mechanisms in both the longitudinal and lateral directions.

I claim:

1. A sole for an article of footwear capable of adjusting a height of at least one of a front of the sole and a back of the sole, said sole comprising:
   a pair of semi-rigid plates positioned and stacked vertically in said sole and spaced apart within said sole;
   two blocks inside said sole each block positioned between said pair of semi-rigid plates and slidably connected to said semi-rigid plates between said semi-rigid plates, each block slidably connected to a screw rod that is attached to a screw adjustment fitting positioned at a perimeter of said sole;
   wherein when said screw adjustment fitting is rotated, said screw rod rotates causing said block attached to said screw rod to slide in a longitudinal direction along said sole changing said height of a front of said sole or said height of a back of said sole.

2. The sole according to claim 1, wherein said increase or decrease in said height of a front or said height of a back creates an angle of inclination for said sole.

3. The sole according to claim 2, wherein said angle of inclination is from the group consisting of an upward angle in a longitudinal direction of said sole from back to front and a downward angle in a longitudinal direction of said sole from back to front.

4. The sole according to claim 3, further comprising two blocks between a pair of semi-rigid plates located in a front end section of said sole, each of said blocks slideably connected to a screw rod that is attached to a screw adjustment fitting positioned at a perimeter of said sole, said blocks slidable in a lateral direction in said sole.

5. The sole according to claim 3, further comprising two blocks between a pair of semi-rigid plates located in a back end section of said sole, each of said blocks slideably connected to a screw rod that is attached to a screw adjustment fitting positioned at a perimeter of said sole, said blocks slidable in a lateral direction in said sole.

6. A system for footwear to adjust a height of a front of said sole and a height of a back of said sole, said system comprising:
   an article of footwear comprising a sole, said sole comprising a battery connected to both a motor and a controller having a wireless receiver, said controller connected to said motor, said motor connected to at least one pair of blocks slidably connected between a pair of semi-rigid plates by a rod;
   a transmitter connected to a processor to wirelessly send commands to said controller causing said motor to slide at least one block, said processor collecting real time data from at least one sensor located on a user of said footwear; and
   wherein said height of a front or said height of a back is increased or decreased by sliding a block in a longitudinal direction within said sole; and
   wherein said a processor calculates the distance to move said block and sends a wireless signal to said motor to adjust an angle of inclination for said sole and a tibial ground angle for said user of said footwear.

7. The system according to claim 6, further comprising two blocks and a second motor located in the back end section of said sole, said two blocks slidable in a lateral direction.

8. The system according to claim 6, wherein said sensor is at least one from the group consisting of an accelerometer, a speed sensor, and a position sensor.

* * * * *